US012692441B2

(12) United States Patent
Laut et al.

(10) Patent No.: US 12,692,441 B2
(45) Date of Patent: Jul. 28, 2026

(54) LIQUID-CRYSTAL MEDIUM

(71) Applicant: Merck Patent GmbH, Darmstadt (DE)

(72) Inventors: Sven Christian Laut, Shanghai (CN); Sabine Schoen, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 8 days.

(21) Appl. No.: 17/501,520

(22) Filed: Oct. 14, 2021

(65) Prior Publication Data

US 2022/0119711 A1 Apr. 21, 2022

(30) Foreign Application Priority Data

Oct. 19, 2020 (EP) .................................... 20202548

(51) Int. Cl.

*G02F 1/1333* (2006.01)
*C09K 19/02* (2006.01)
*C09K 19/34* (2006.01)
*C09K 19/54* (2006.01)
*G02F 1/137* (2006.01)

(52) U.S. Cl.

CPC ...... *C09K 19/3491* (2013.01); *C09K 19/0208* (2013.01); *C09K 19/3402* (2013.01); *C09K 19/54* (2013.01); *G02F 1/13706* (2021.01); *C09K 2019/3425* (2013.01)

(58) Field of Classification Search

CPC ............ C09K 19/3491; C09K 19/0208; C09K 19/3402; C09K 19/54; C09K 19/3098; C09K 19/30; C09K 19/34; C09K 19/42; C09K 2019/3425; C09K 2019/3408; G02F 1/1333; G02F 1/13706

See application file for complete search history.

(56) References Cited

U.S. PATENT DOCUMENTS 3,814,700 A 6/1974 Aviram
4,077,900 A 3/1978 Pohl et al.
4,136,053 A 1/1979 Steinstrasser et al.
4,237,026 A 12/1980 Eidenschink et al.
5,993,691 A 11/1999 Pausch et al.
6,027,665 A 2/2000 Pausch et al.
6,146,720 A 11/2000 Pausch et al.
6,342,279 B1 1/2002 Tarumi et al.
6,522,380 B2 2/2003 Lee et al.
7,656,490 B1 2/2010 Baur et al.
9,512,102 B2 * 12/2016 Reiffenrath .......... C07D 333/76
9,688,915 B2 * 6/2017 Furusato .............. C09K 19/126
11,884,862 B2 * 1/2024 Goetz .................. C09K 19/542
2006/0066793 A1 3/2006 Ohmuro et al.
2013/0182202 A1 7/2013 Graziano et al.
2014/0138581 A1 5/2014 Archetti et al.
2015/0166890 A1 6/2015 Archetti et al.
2015/0252265 A1 9/2015 Archetti et al.
2017/0362506 A1 * 12/2017 Hirschmann ......... G02F 1/1362
2018/0086980 A1 * 3/2018 Manabe ............. C09K 19/3444
2019/0338187 A1 * 11/2019 Manabe ............. C09K 19/3491
2019/0345389 A1 * 11/2019 Hirschmann .......... C09K 19/32
2020/0181493 A1 * 6/2020 Laut ....................... C09K 19/12

FOREIGN PATENT DOCUMENTS

| | | | | |
|---|---|---|---|---|
| DE | 2209127 | A1 | 9/1973 | |
| DE | 2240864 | A1 | 2/1974 | |
| DE | 2338281 | A1 | 2/1974 | |
| DE | 2321632 | A1 | 11/1974 | |
| DE | 2450088 | A1 | 4/1976 | |
| DE | 2637430 | A1 | 2/1978 | |
| DE | 2853728 | A1 | 7/1980 | |
| DE | 19528106 | A1 | 8/1996 | |
| DE | 19509410 | A1 | 9/1996 | |
| DE | 19528107 | A1 | 9/1996 | |
| DE | 19528104 | A1 | 2/1997 | |
| DE | 19824137 | A1 | 7/1999 | |
| EP | 0588568 | A2 | 9/1993 | |
| EP | 0667555 | A1 | 2/1995 | |
| EP | 0673986 | A2 | 3/1995 | |
| EP | 3228681 | A1 | 10/2017 | |
| EP | 3434751 | A1 | 1/2019 | |
| EP | 3617293 | A2 | 3/2020 | |
| EP | 3666853 | A1 | 6/2020 | |
| GB | 1376115 | | 12/1974 | |
| GB | 1418441 | | 12/1975 | |
| GB | 1427390 | | 3/1976 | |
| JP | 07181439 | A | 7/1995 | |
| WO | 9110936 | A1 | 7/1991 | |
| WO | 9623851 | A1 | 8/1996 | |
| WO | 9628521 | A1 | 9/1996 | |
| WO | 2019076899 | A1 | 4/2019 | |
| WO | 2019228938 | A1 | 12/2019 | |
| WO | WO 2020/083807 | A1 * | 4/2020 | ............ C09K 19/30 |

OTHER PUBLICATIONS

Jung et al., "Analysis of Optimal Phase Retardation of a Fringe Field-Driven Homogeneously Aligned Nematic Liquid Crystal Cell", Jpn. J. Appl. Phys., vol. 43, No. 3, 2004, pp. 1028-1031.
Soref, R.A., "Field Effects in Nematic Liquid Crystals Obtained with Interdigital Electrodes", Journal of Applied Physics, vol. 45, No. 12, Dec. 1974, pp. 5466-5468.
Extended European Search Report for European Application No. 21202788.2, dated Apr. 4, 2022, 7 pages.

* cited by examiner

*Primary Examiner* — Geraldina Visconti
(74) *Attorney, Agent, or Firm* — Buchanan Ingersoll & Rooney PC

(57) ABSTRACT

Liquid-crystalline (LC) media having positive dielectric anisotropy and liquid-crystal displays (LCDs) containing these media, especially displays addressed by an active matrix and in particular to LC displays of the TN, PS-TN, STN, TN-TFT, OCB, IPS, PS-IPS, FFS, HB-FFS PS-FFS, SA-HB-FFS, polymer stabilised SA-HB-FFS, positive VA or positive PS-VA type.

14 Claims, No Drawings

LIQUID-CRYSTAL MEDIUM

CROSS-REFERENCE TO RELATED APPLICATIONS

This is a U.S. non-provisional application filed under 35 U.S.C. § 111(a), claiming priority under 35 U.S.C. § 119(a) of European Patent Application No. 20202548.2, filed Oct. 19, 2020, the entire disclosure of which is incorporated by reference herein in its entirety.

FIELD

The present invention relates to liquid-crystalline (LC) media having positive dielectric anisotropy and to liquid-crystal displays (LCDs) containing these media, especially to displays addressed by an active matrix and in particular to LC displays of the TN, PS-TN, STN, TN-TFT, OCB, IPS, PS-IPS, FFS, HB-FFS PS-HB-FFS, SA-HB-FFS, polymer stabilised SA-HB-FFS, positive VA or positive PS-VA type.

BACKGROUND

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is generated substantially perpendicular to the substrates and the liquid-crystal layer.

Besides these modes, there are also electro-optical modes that utilise an electric field which is substantially parallel to the substrates or the liquid-crystal layer. For example, WO 91/10936 describes a liquid-crystal display in which the electric signals are generated in such a way that the electric fields have a significant component parallel to the liquid-crystal layer, and which has since then become known as in-plane switching (IPS) display. The principles of operating such a display are described, for example, by R. A. Soref in Journal of Applied Physics, Vol. 45, No. 12, pp. 5466-5468 (1974).

IPS displays contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

EP 0 588 568, for example, describes various possibilities for the design of the electrodes and for addressing an IPS display. DE 198 24 137 likewise describes various embodiments of such IPS displays.

Liquid-crystalline materials for IPS displays of this type are described, for example, in DE 195 28 104.

Furthermore, so-called “fringe-field switching” (FFS) displays have been reported, see, inter alia, S. H. Jung et al., Jpn. J. Appl. Phys., Vol. 43, No. 3, 1028, 2004, which contain two electrodes on the same substrate, one of which is structured in a comb-shaped manner and the other is unstructured. A strong, so-called “fringe field” is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy and an alignment layer, usually of polyimide, which provides planar alignment to the molecules of the LC medium.

Liquid-crystal displays of the IPS and FFS electro-optical mode are in particular suitable for use in modern desktop monitors, TV sets and multimedia applications. The liquid-crystalline media according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

A further improvement has been achieved by the so-called HB-FFS mode. One of the unique features of the HB-FFS mode in contrast to the traditional FFS technology is that it enables higher transmittance which allows operation of the panel with less energy consumption.

Liquid-crystal compositions which are suitable for LCDs and especially for FFS and IPS displays are known from, for example, JP 07-181 439 (A), EP 0 667 555, EP 0 673 986, DE 195 09 410, DE 195 28 106, DE 195 28 107, WO 96/23 851 and WO 96/28 521. However, these compositions have certain disadvantages. Amongst other deficiencies, most of them result in disadvantageously long addressing times, have inadequate values of the resistivity and/or require excessively high operating voltages. Both an improvement in the operating properties and also in the shelf life are desirable.

FFS and IPS displays can be operated as active-matrix displays (AMD) or passive-matrix displays (PMD). In the case of active-matrix displays individual pixels are usually addressed by integrated, non-linear active elements such as, for example, thin-film transistors (TFTs), while in the case of passive-matrix displays individual pixels are usually addressed by the multiplex method as known from the prior art.

Typical applications of in-plane switching (IPS) and fringe field switching (FFS) technologies are monitors, notebooks, televisions, mobile telephones, tablet PCs, etc.

Both the IPS and the FFS technology have certain advantages over other LCD technologies, such as, for example, the vertical alignment (VA) technology, e.g. a broad viewing angle dependency of the contrast.

Further liquid-crystal compositions which are suitable for LCDs and especially for FFS and IPS displays are described in EP 3 228 681 A1, EP 3 434 751 A1 and EP 3 666 853 A1.

SUMMARY

There is still a need in the art for further liquid-crystalline media and the use thereof in displays having high transmission, a good black state and a high contrast ratio, especially in FFS and IPS applications giving good low-temperature stability and fast addressing times.

An object of the present invention is therefore to provide liquid-crystalline media, in particular for FFS, HB-FFS and IPS displays, but also for TN, positive VA or STN displays, and in particular for active-matrix displays like those addressed by TFTs, which do not exhibit the disadvantages indicated above or only do so to a lesser extent and which preferably have high specific resistance, low threshold voltage, suitable dielectric anisotropy, a good low temperature stability (LTS), fast response times and low rotational viscosities, enable high brightness and high transmittance, and which in addition exhibit favourable reliability and stability.

It is a further object of the present invention to provide displays with a high contrast ratio, a high transmittance in one optical state, fast addressing times and a favourable stability, in particular at low temperatures and at high temperatures. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above object and eventually provide additional advantages.

A first aspect of the present invention provides a liquid-crystal medium having a positive dielectric anisotropy, in particular having a dielectric anisotropy of +0.5 or more, and comprising one or more compounds selected from the group of compounds of formulae I-1, I-2 and I-3

I-1

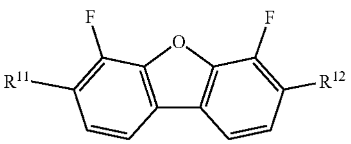

I-2

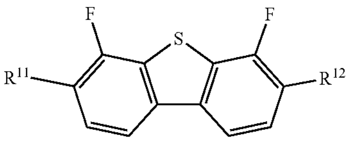

I-3

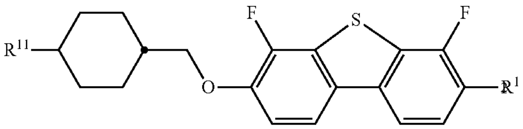

in which $R^{11}$ and $R^{12}$ identically or differently, denote H, an alkyl or alkoxy radical, in particular a straight-chain or branched alkyl or alkoxy radical, having 1 to 15 C atoms, in which one or more $CH_2$ groups in these radicals are optionally replaced, independently of one another, by —C≡C—, —$CF_2O$—, —$OCF_2$—, —CH=CH—,

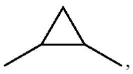,
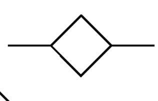,
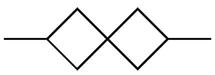,
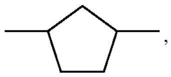,
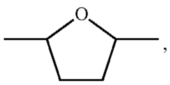,

—O—, —C— or —O—CO— in such a way that O atoms are not linked directly to one another, and in which one or more H atoms may be replaced by halogen, and one or more stabilizers.

In a preferred embodiment the liquid-crystal medium comprises at least two different stabilizers.

It has favourably been recognized that a high brightness in displays like those of the HB-FFS mode can be obtained by using liquid-crystalline media having positive dielectric anisotropy and also having an increased dielectric constant $\varepsilon_\perp$ perpendicular to the longitudinal axes of the liquid-crystalline molecules. This provision can advantageously be achieved by adding a limited amount of liquid-crystalline compounds with negative dielectric anisotropy, which have high $\varepsilon_\perp$ properties, to the liquid-crystalline medium whilst maintaining a positive dielectric anisotropy of the entire medium.

However, the addition of compounds with high $\varepsilon_\perp$ may have some drawbacks. For example, this addition can lead to higher values of the rotational viscosity $\gamma_1$, and consequently to higher values of the ratio $\gamma_1/K_{22}$ of the rotational viscosity $\gamma_1$ and the elastic constant $K_{22}$ for twist deformation, which leads to higher response times. Since $K_{22}$ is approximately proportional to the elastic constant $K_{11}$ for splay deformation, where the value of $K_{22}$ is typically about half the value of $K_{11}$, this can suitably be determined by measuring $\gamma_1$ and $K_{11}$. It has also been recognized that the reliability, in particular the voltage holding ratio (VHR), of such mixtures, especially HB-FFS mixtures, may be affected compared to conventional FFS mixtures.

Surprisingly, the media according to the invention advantageously show a relatively high value of $\varepsilon_\perp$ and at the same time enable a decrease of the rotational viscosity and the ratios of $\gamma_1/K_{22}$ and $\gamma_1/K_{11}$, and enable fast response times in displays using liquid-crystalline media as described and claimed herein. In addition, the displays that make use of the media according to the invention favourably exhibit a particularly high contrast and excellent reliability. In this respect, the addition of the one or more stabilizers to the medium can advantageously contribute to obtaining an improved reliability and stability, in particular with respect to light, especially UV light, and heat, also under extreme load. This stabilizing effect can surprisingly be even further improved by adding at least two different stabilizers to the liquid-crystal media as described and claimed herein.

According to the invention, liquid-crystalline media which show a moderately positive dielectric anisotropy and at the same time an increased dielectric constant $\varepsilon_\perp$ perpendicular to the longitudinal axes of the liquid-crystalline molecules may be provided, which favourably can maintain a low rotational viscosity and a low value of the ratio $\gamma_1/K_{11}$. This enables the provision of liquid-crystal displays, especially of the HB-FFS, FFS and IPS modes, with high brightness and transmittance and short response times.

Another aspect of the invention therefore relates to a liquid-crystal display, in particular an electro-optical liquid-crystal display, containing the liquid-crystal medium according to the invention, preferably a TN, PS-TN, STN, TN-TFT, OCB, IPS, PS-IPS, FFS, HB-FFS, PS-HB-FFS, SA-HB-FFS, polymer stabilised SA-HB-FFS, positive VA or positive PS-VA display, more preferably a FFS, HB-FFS, IPS, PS-HB-FFS or PS-IPS display.

The liquid-crystalline media according to the invention are suitable for mobile applications and TFT applications, such as, for example, mobile telephones and PDAs. Furthermore, the liquid-crystalline media according to the invention are particularly suitable for use in FFS, HB-FFS and IPS displays based on dielectrically positive liquid crystals.

The liquid-crystal media according to the present invention are especially suitable for use in liquid-crystal displays of the FFS, HB-FFS and IPS modes, based on dielectrically positive liquid crystals, and polymer stabilised variants thereof, in particular for large size TV applications.

A further aspect of the present invention relates to the use of the liquid-crystal medium according to the invention in electro-optical switching applications, in particular to the use of the liquid-crystal medium in TN, PS-TN, STN, TN-TFT, OCB, IPS, PS-IPS, FFS, HB-FFS, PS-HB-FFS, SA-HB-FFS, polymer stabilised SA-HB-FFS, positive VA and positive PS-VA displays, in light shutters, in switchable windows, or for 3D applications.

DETAILED DESCRIPTION

Without limiting the present invention thereby, in the following the invention is illustrated by the detailed description of the aspects, embodiments and particular features, and particular embodiments are described in more detail.

Herein, halogen denotes F, Cl, Br or I, preferably F or Cl, and more preferably F.

In the present invention, all atoms also include their isotopes. In particular, one or more hydrogen atoms (H) may be replaced by deuterium (D), which is particularly preferred in some embodiments; a high degree of deuteration enables or simplifies analytical determination of compounds, in particular in the case of low concentrations.

Herein, an alkyl radical and/or an alkoxy radical is taken to mean straight-chain or branched alkyl. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetra-decyl, pentadecyl, methoxy, octyloxy, nonyloxy, decyloxy, undecyloxy, dodecyloxy, tridecyloxy or tetradecyloxy.

Herein, oxaalkyl preferably denotes straight-chain 2-oxapropyl (=methoxy-methyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Herein, alkenyl, i.e. an alkyl radical in which one $CH_2$ group has been replaced by —CH═CH—, may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

Herein, an alkyl or alkenyl radical which is at least monosubstituted by halogen, is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Herein, a mono- or polyfluorinated alkyl or alkoxy radical having 1, 2 or 3 C atoms or a mono- or polyfluorinated alkenyl radical having 2 or 3 C atoms is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH{=}CF_2$ or $CH{=}CF_2$, very particularly preferably F or $OCF_3$, furthermore $CF_3$, $OCF{=}CF_2$, $OCHF_2$ or $OCH{=}CF_2$.

Preferably, in the formulae I-1, I-2 and I-3 $R^{11}$ and $R^{12}$ denote, identically or differently, an alkoxy radical having 1 to 7 C atoms, more preferably a straight-chain alkoxy radical having 1 to 7 C atoms.

The compounds of formula I-1 are preferably selected from the group of compounds of the formulae I-1-a to I-1-e I-1-a

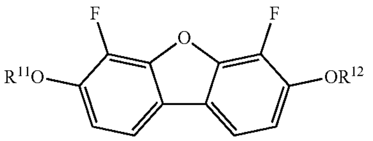

I-1-b

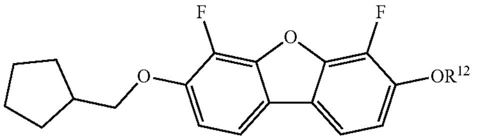

I-1-c

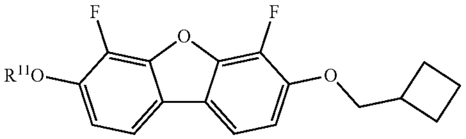

I-1-d

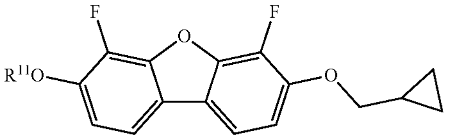

I-1-e

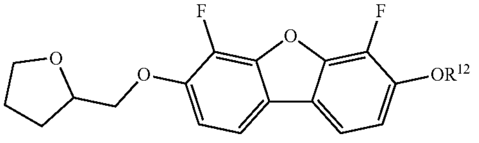

in which $R^{11}$ and $R^{12}$, identically or differently, denote alkyl having 1 to 7 C atoms, preferably ethyl, n-propyl, n-butyl or n-pentyl.

The compounds of formula I-2 are preferably selected from the group of compounds of the formulae I-2-a to I-2-e I-2-a

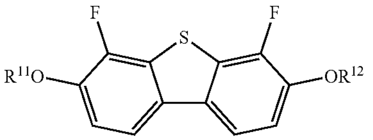

I-2-b

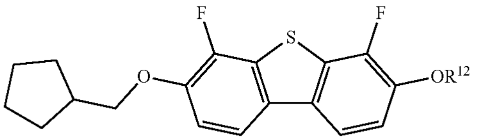

-continued

I-2-c

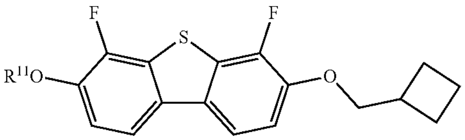

I-2-d

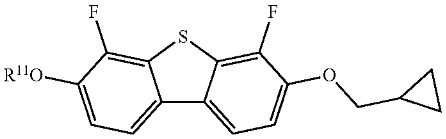

I-2-e

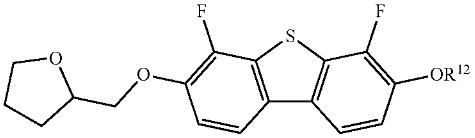

in which $R^{11}$ and $R^{12}$, identically or differently, denote alkyl having 1 to 12 C atoms, preferably alkyl having 1 to 7 C atoms.

The compounds of formula I-3 are preferably selected from the group of compounds of the formulae I-3-a to I-3-j I-3-a

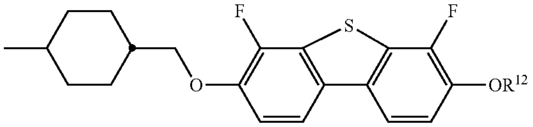

I-3-b

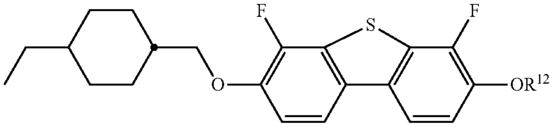

I-3-c

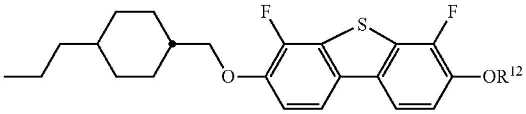

I-3-d

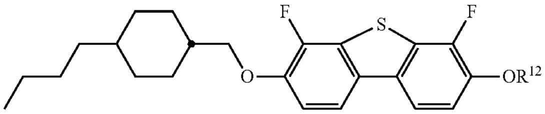

I-3-e

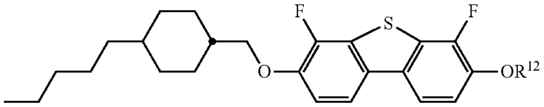

I-3-f

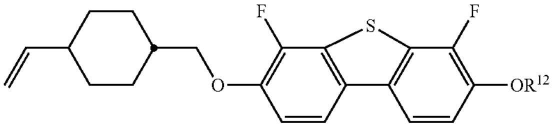

-continued

I-3-g

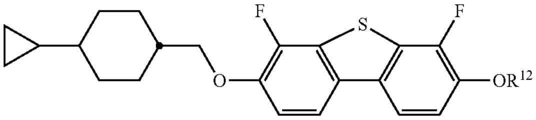

I-3-h

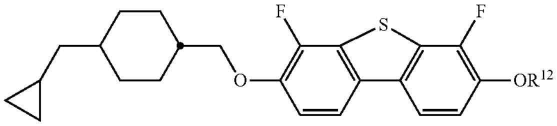

I-3-i

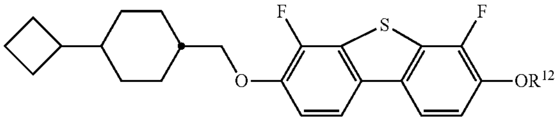

I-3-j

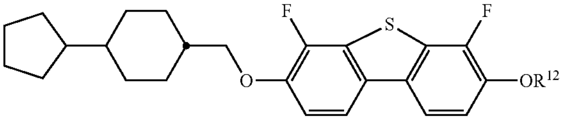

in which $R^{12}$ denotes alkyl having 1 to 7 C atoms, preferably ethyl, n-propyl or n-butyl.

In a preferred embodiment the one or more compounds selected from the group of compounds of formulae I-1, I-2 and I-3 are selected from the group of compounds I-A to I-P

I-A

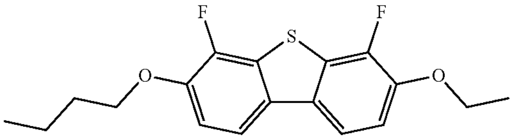

I-B

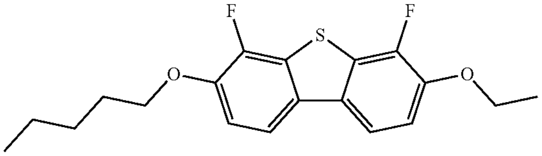

I-C

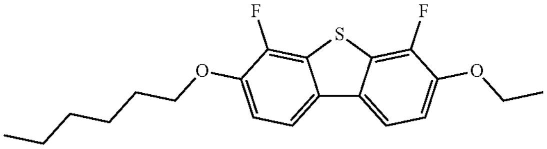

I-D

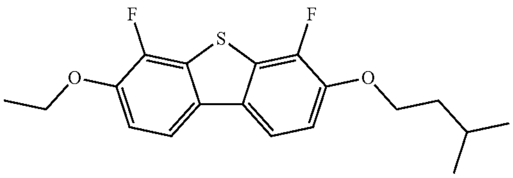

-continued

I-E

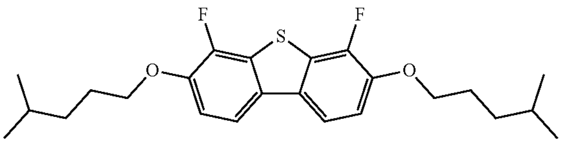

I-F

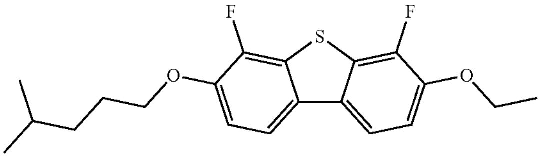

I-G

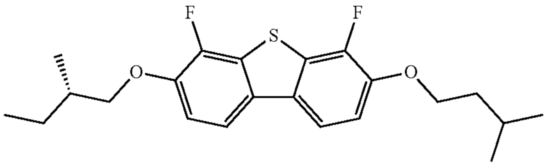

I-H

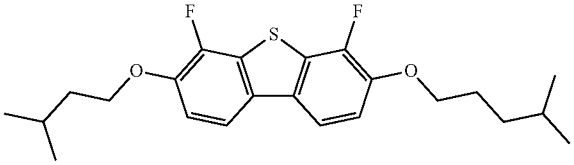

I-I

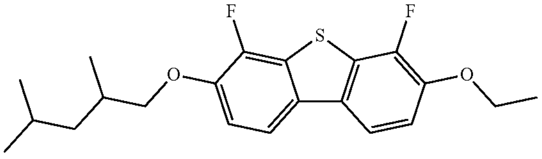

I-J

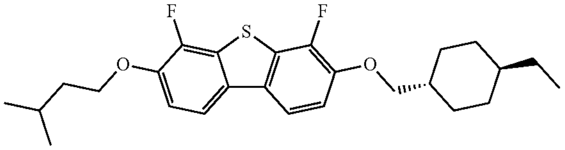

I-K

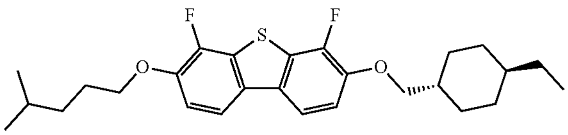

I-L

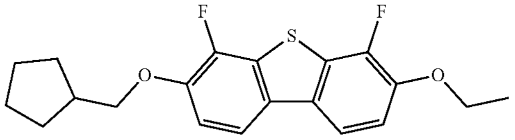

I-M

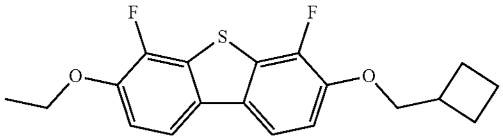

-continued

I-N

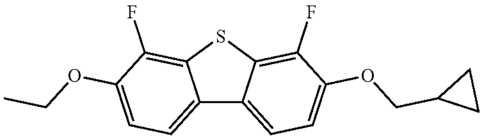

I-O

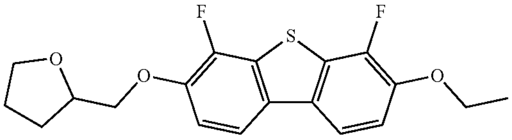

I-P

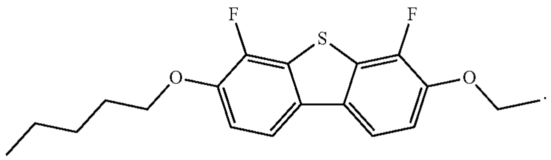

Preferably, the one or more compounds selected from the group of compounds of formulae I-1, I-2 and I-3 and in particular the further preferred compounds thereof are contained in the liquid-crystal medium in a total amount of 20% by weight or less, more preferably 15% by weight or less and even more preferably 10% by weight or less. It is preferred that the total amount of the one or more compounds selected from the group of compounds of formulae I-1, I-2 and I-3 and in particular the further preferred compounds thereof contained in the liquid-crystal medium is in the range of from 2.5% by weight to 15% by weight, more preferably from 5% by weight to 10% by weight and in particular from 6% by weight to 8% by weight.

In an embodiment the liquid-crystal medium comprises two or more compounds selected from the group of the compounds of the formulae I-1, I-2 and I-3.

In a preferred embodiment the liquid-crystal medium comprises at least one compound of formula I-2, in particular at least one compound of formula I-2-a. It is particularly preferred that the medium comprises two or more compounds of formula I-2, in particular two or more compounds of formula I-2-a.

In another embodiment the liquid-crystal medium comprises at least one compound of formula I-1.

In a further embodiment the liquid-crystal medium comprises at least one compound of formula I-3.

In a particular embodiment at least one of the groups $R^{11}$ and $R^{12}$ in formulae I-1, I-2 and/or I-3 is a branched alkyl or alkoxy radical. In this embodiment it is especially preferred that the liquid-crystal medium contains one or more compounds selected from compounds I-D to I-K.

In a preferred embodiment the liquid-crystal medium further comprises one or more compounds of formula II

II

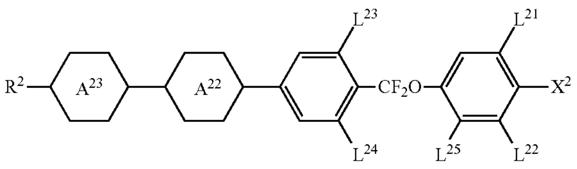

in which $R^2$ denotes alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, in which optionally one or more $CH_2$ groups, independently of one another, may be replaced by

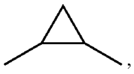,
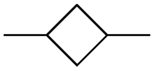,
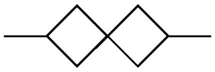,
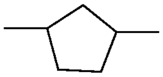 or
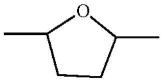,
 and

and are independently of each other

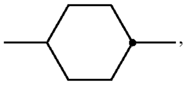,
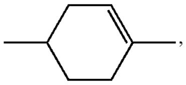,
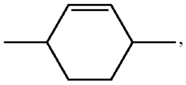,
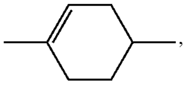,
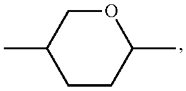,
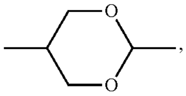,
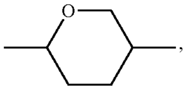,
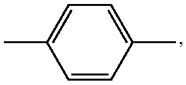,
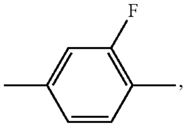,
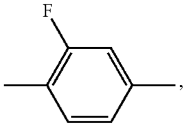,
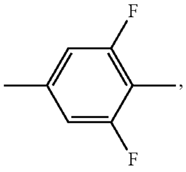, or
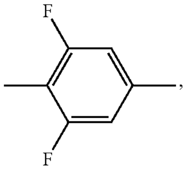, $L^{21}$, $L^{22}$, $L^{23}$ and $L^{24}$ independently of each other, denote H or F, $L^{25}$ denotes H or $CH_3$, preferably H, and $X^2$ denotes halogen, halogenated alkyl or alkoxy with 1 to 3 C atoms or halogenated alkenyl or alkenyloxy with 2 or 3 C atoms.

The medium preferably comprises the one or more compounds of formula II in a total amount of 5% by weight or more, more preferably 10% by weight or more, even more preferably 15% by weight or more and in particular 20% by weight or more.

In formula II $L^{21}$ and $L^{22}$ or $L^{23}$ and $L^{24}$ are preferably both F.

In another preferred embodiment in formula II all of $L^{21}$, $L^{22}$, $L^{23}$ and $L^{24}$ denote F.

The compounds of formula II are preferably selected from the group of compounds of formulae II-a to II-h II-a

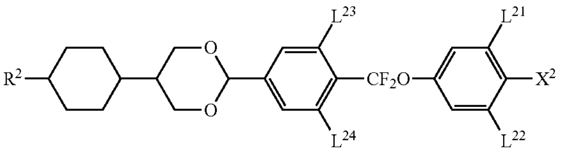

II-b

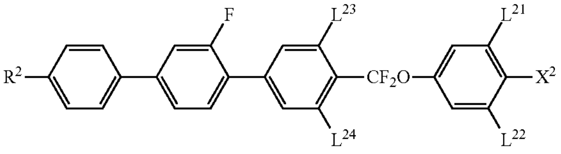

II-c

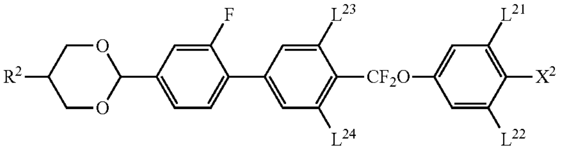

II-d

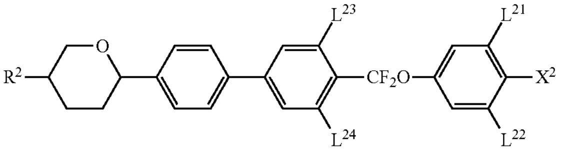

II-e

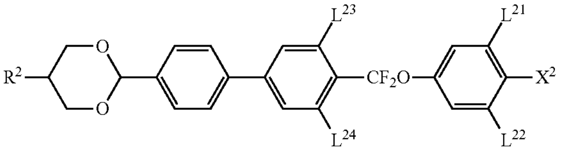

II-f

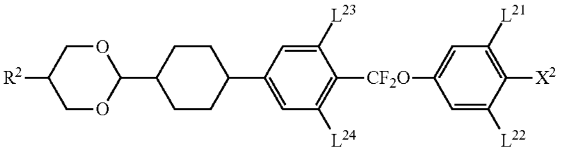

II-g

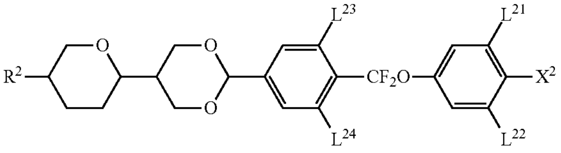

II-h

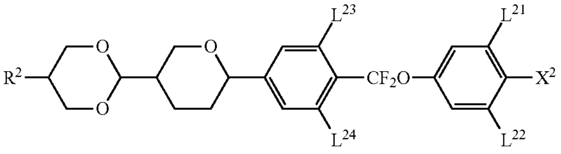

in which the parameters have the respective meanings given for formula II above.

In a preferred embodiment of the invention the medium comprises one or more compounds selected from the group of compounds of formulae II-a to II-c, wherein preferably $X^2$ is F.

In a preferred embodiment of the present invention the medium comprises compounds selected from the group of compounds of formulae II-a to II-h, wherein $L^{21}$ and $L^{22}$ or $L^{23}$ and $L^{24}$ are both F.

In another preferred embodiment the medium comprises compounds selected from the group of compounds of formulae II-a to II-h, wherein $L^{21}$, $L^{22}$, $L^{23}$ and $L^{24}$ all are F.

It is particularly preferred that the medium comprises one or more compounds selected from the group of compounds of formulae II-a, II-b and II-c. It is even more preferred that the medium comprises two or more compounds selected from the group of compounds of formulae II-a, II-b and II-c, and in particular three or more compounds selected from the group of compounds of formulae II-a, II-b and II-c.

Especially preferred compounds of formula II are compounds of formulae II-A, II-B, II-C and II-D, in particular compounds of formulae II-B, II-C and II-D

II-A

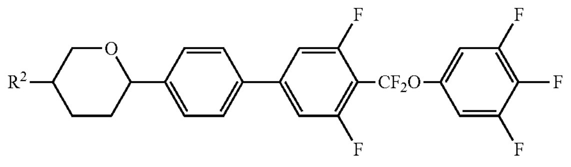

II-B

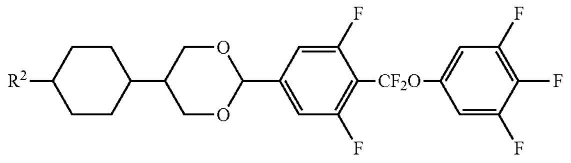

II-C

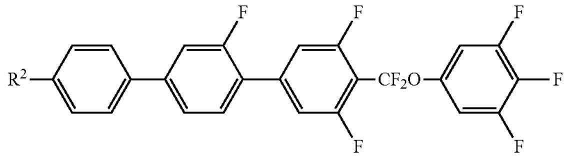

II-D

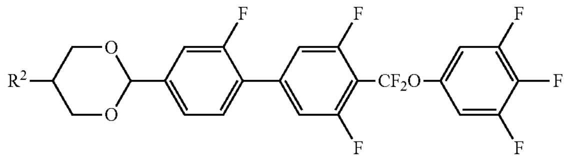

wherein $R^2$ has the meaning given for formula II above.

In a preferred embodiment the medium contains at least one compound of formula II-B and/or at least one compound of formula II-C and/or at least one compound of formula II-D.

In a further embodiment the liquid-crystal medium comprises one or more compounds selected from the compounds of formulae II-E to II-P

II-E

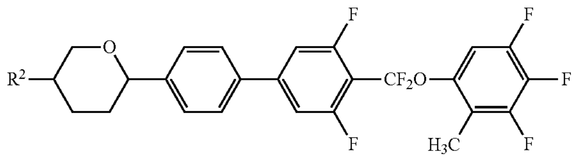

II-F

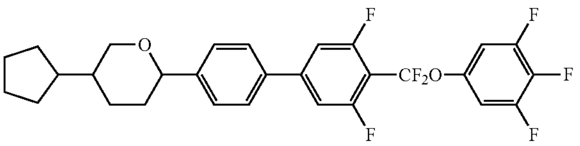

II-G

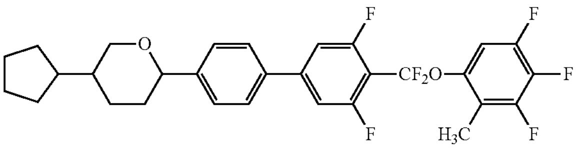

II-H

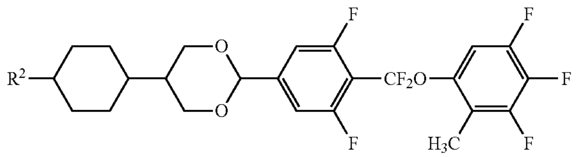

II-I

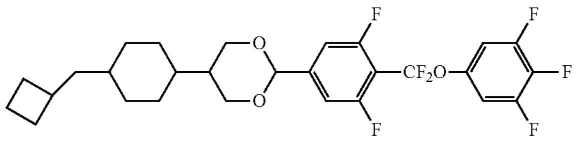

II-J

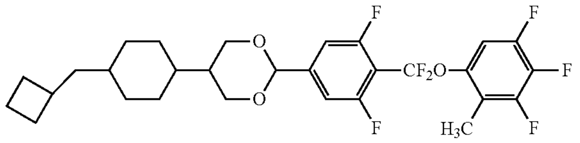

II-K

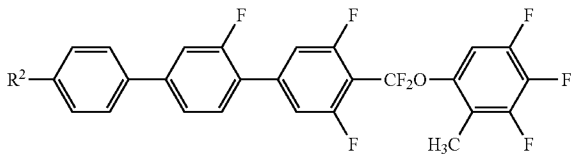

II-L

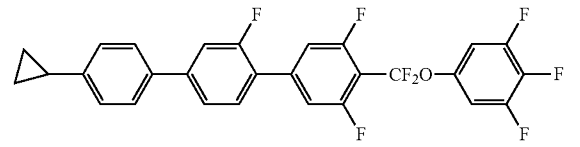

II-M

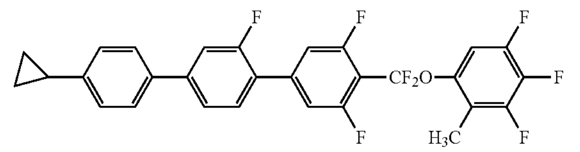

-continued
II-N
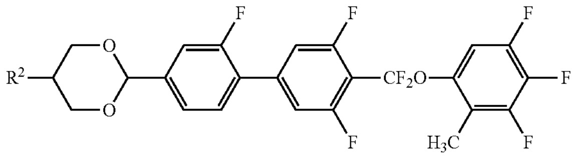
II-O
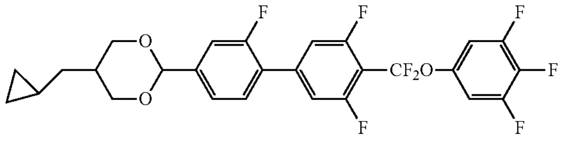
II-P
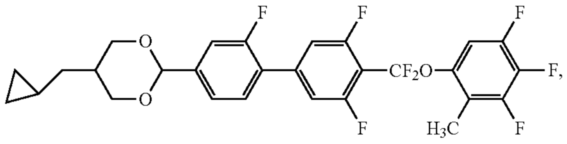
wherein $R^2$ has the meaning given for formula II above.
In an embodiment the liquid-crystal medium comprises one or more compounds selected from the group of compounds of formulae III-1 to III-32
III-1
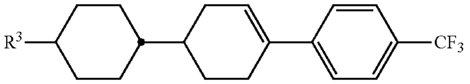
III-2
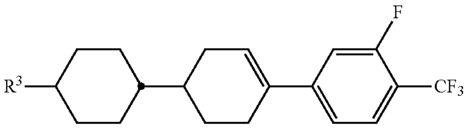
III-3
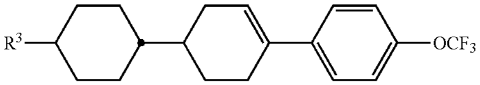
III-4
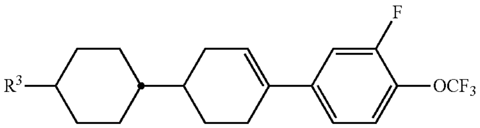
III-5
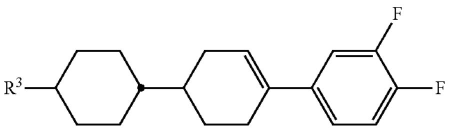
III-6
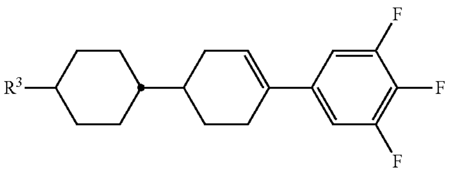
III-7
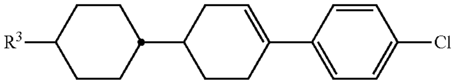
-continued
III-8
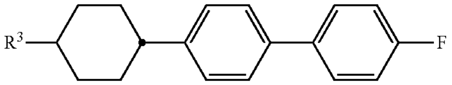
III-9
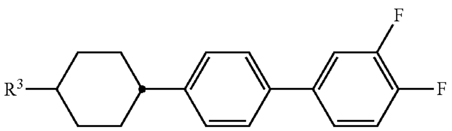
III-10
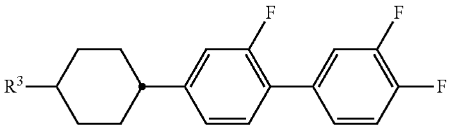
III-11
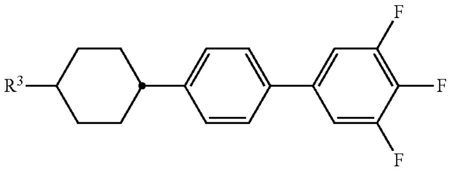
III-12
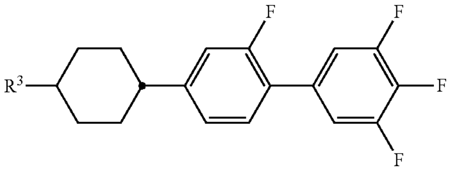
III-13
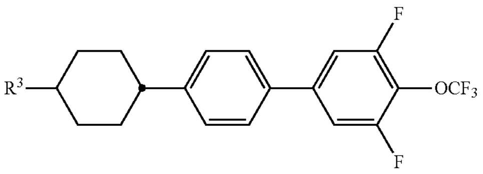
III-14
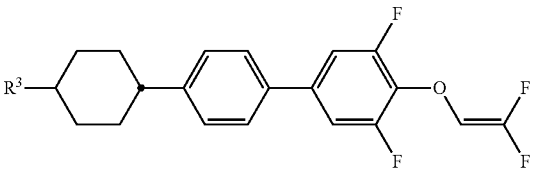
III-15
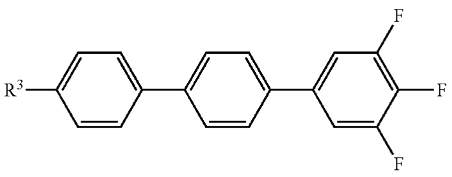
III-16
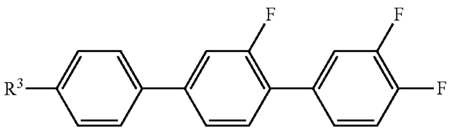

-continued

III-17

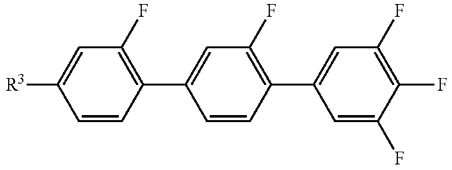

III-18

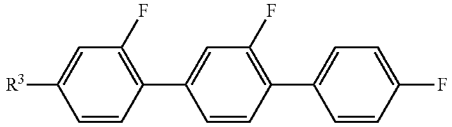

III-19

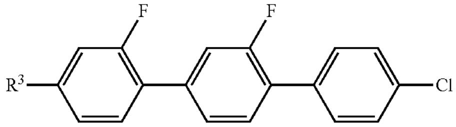

III-20

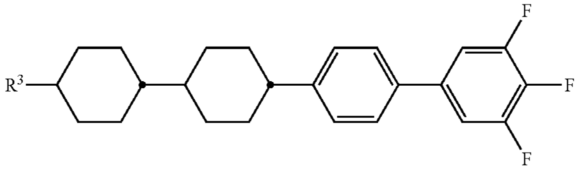

III-21

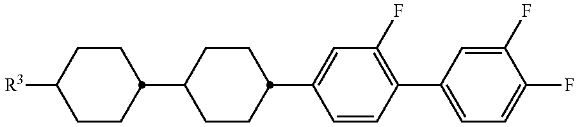

III-22

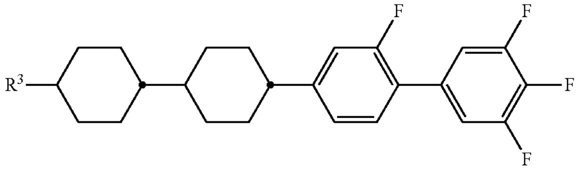

III-23

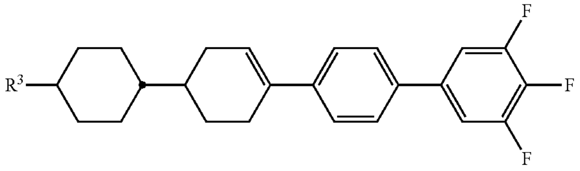

III-24

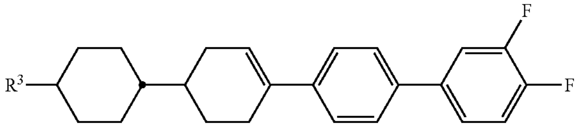

III-25

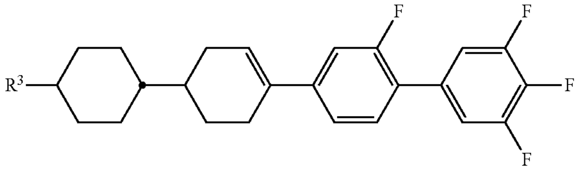

-continued

III-26

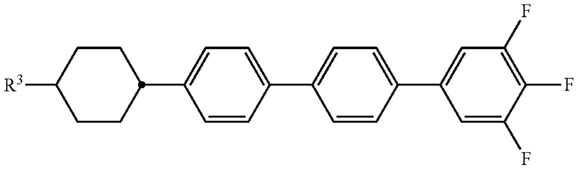

III-27

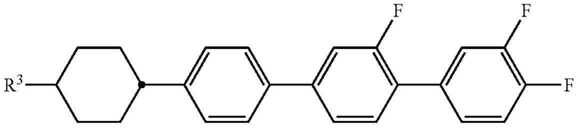

III-28

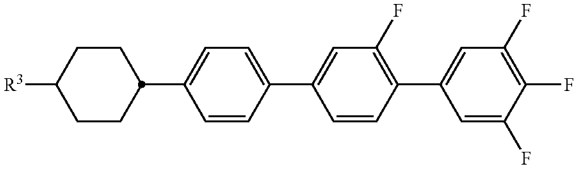

III-29

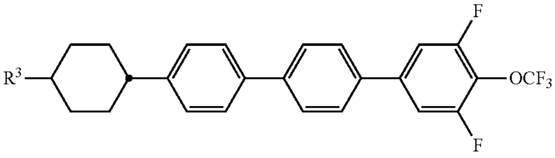

III-30

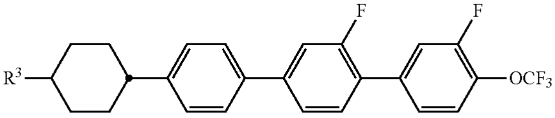

III-31

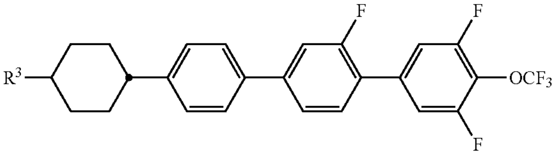

III-32

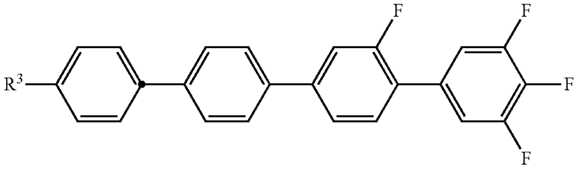

wherein $R^3$ has the meaning as given for $R^2$ in formula II above.

Preferably, the liquid-crystal medium comprises at least one compound of formula III-1, preferably in an amount of at least 2% by weight, more preferably at least 5% by weight.

Preferably, the medium according to the invention comprises one or more compounds of formula IV

IV

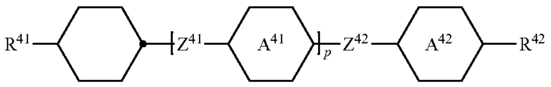

in which $R^{41}$ and $R^{42}$ independently of each other, denote alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, preferably $R^{41}$ is alkyl with 1 to 7 C atoms and $R^{42}$ is alkyl with 1 to 7 C atoms or alkoxy with 1 to 7 C atoms or $R^{41}$ is alkenyl with 2 to 7 C atoms and $R^{42}$ is alkyl with 1 to 7 C atoms,

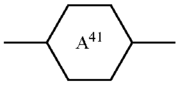 and 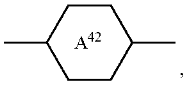 , on each occurrence, identically or differently, denote

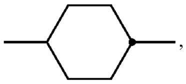, 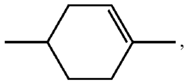,

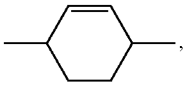, 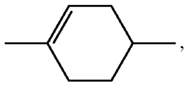,

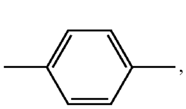, 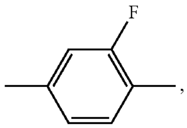,

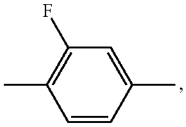, 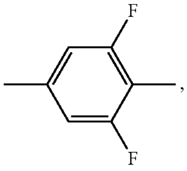,

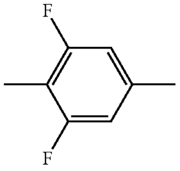 or 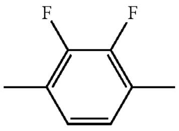

preferably at least one of

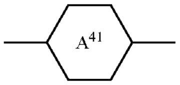 and 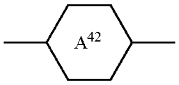 is

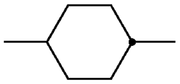

$Z^{41}$, $Z^{42}$ on each occurrence, identically or differently, denote $-CH_2CH_2-$, $-COO-$, trans-$CH{=}CH-$, trans-$CF{=}CF-$, $-CH_2O-$, $-CF_2O-$, $-C{\equiv}C-$ or a single bond, preferably a single bond, and p is 0, 1 or 2, preferably 0 or 1, more preferably 0.

Preferably the liquid-crystal media according to the present invention comprise one or more compounds of formula IV selected from the group of compounds of formulae IV-1 to IV-5

IV-1

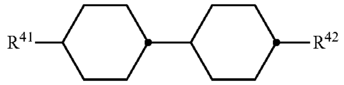

IV-2

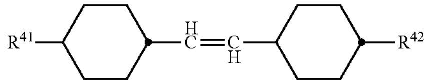

IV-3

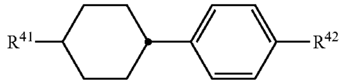

IV-4

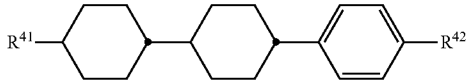

IV-5

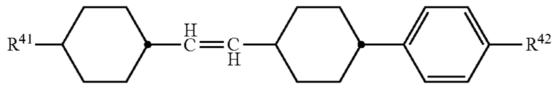

in which $R^{41}$ and $R^{42}$ have the respective meanings given under formula IV above and in formulae IV-1, IV-4 and IV-5 $R^{41}$ preferably is alkyl or alkenyl, preferably alkenyl and $R^{42}$ preferably is alkyl or alkenyl, preferably alkyl; in formula IV-2 $R^{41}$ and $R^{42}$ preferably are alkyl and in formula IV-3 $R^{41}$ preferably is alkyl or alkenyl, preferably alkyl and $R^{42}$ preferably is alkyl or alkoxy, preferably alkoxy.

Particularly preferably, the medium according to the invention comprises one or more compounds of formula IV-1 and one or more compounds of formula IV-4.

Optionally it is preferred that the medium further comprises one or more compounds of formula IV selected from the group of compounds of formulae IV-6 to IV-13

IV-6

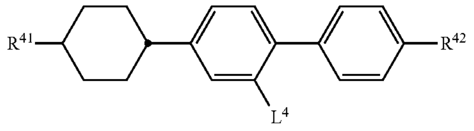

IV-7

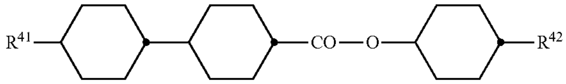

IV-8

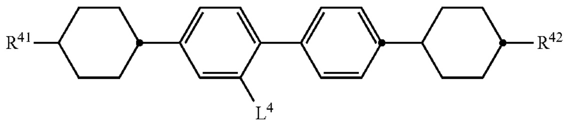

IV-9

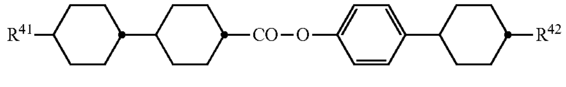

-continued

IV-10

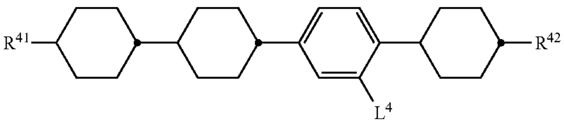

IV-11

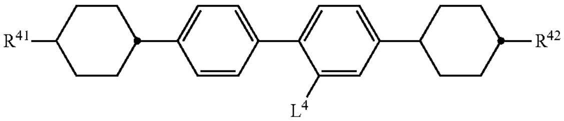

IV-12

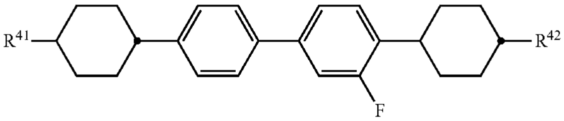

IV-13

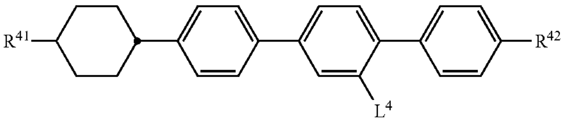

in which $R^{41}$ and $R^{42}$ independently of each other, denote alkyl, alkoxy, fluorinated alkyl or fluorinated alkoxy with 1 to 7 C atoms, alkenyl, alkenyloxy, alkoxyalkyl or fluorinated alkenyl with 2 to 7 C atoms, and $L^4$ denotes H or F.

In a preferred embodiment the medium comprises one or more compounds of formula IV-1

IV-1

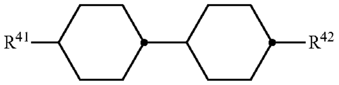

in which $R^{41}$ and $R^{42}$ independently of each other, denote alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

Preferably, the liquid-crystal medium comprises the one or more compounds of formula IV-1 in a total amount of at least 10% by weight, more preferably at least 20% by weight, even more preferably at least 30% by weight and in particular at least 35% by weight.

In an embodiment the media may comprise one or more compounds of formula V

V

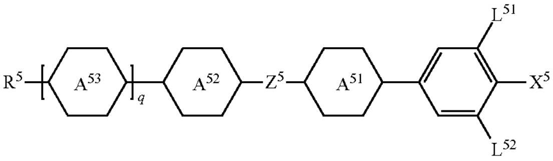

in which $R^5$ is alkyl, alkoxy, fluorinated alkyl or fluorinated alkoxy with 1 to 7 C atoms, alkenyl, alkenyloxy, alkoxyalkyl or fluorinated alkenyl with 2 to 7 C atoms, and preferably is alkyl with 1 to 7 C atoms or alkenyl with 2 to 7 C atoms,

to

are, independently of each other,

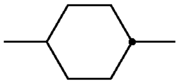

,

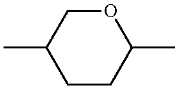

,

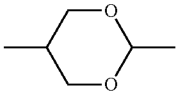

,

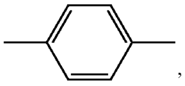

,

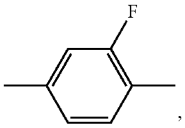

,

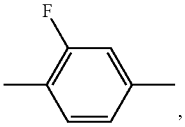

, or

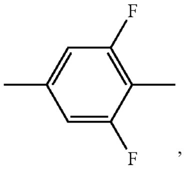

, $L^{51}$ and $L^{52}$, independently of each other, denote H or F, preferably $L^{51}$ denotes F, $X^5$ denotes halogen, halogenated alkyl or alkoxy with 1 to 3 C-atoms or halogenated alkenyl or alkenyloxy with 2 or 3 C-atoms, preferably F, Cl, $—OCF_3$ or $—CF_3$, most preferably F, Cl or $—OCF_3$, $Z^5$ denotes $—CH_2CH_2—$, $—CF_2CF_2—$, —COO—, trans-CH═CH—, trans-CF═CF— or $—CH_2O$, preferably $—CH_2CH_2—$, —COO— or trans-CH═CH— and most preferably —COO— or $—CH_2CH_2—$, and q is 0 or 1.

Preferably the media according to the present invention comprises one or more compounds of formula V selected from the group of compounds of formulae V-1 and V-2

V-1

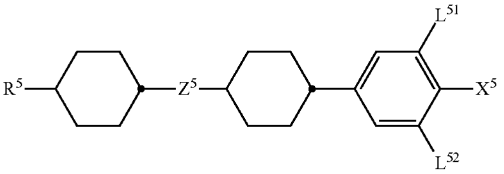

V-2

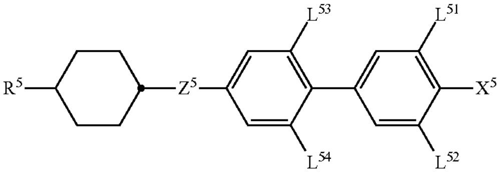

in which the parameters have the respective meanings given for formula V above, and the parameters $L^{53}$ and $L^{54}$ are, independently of each other, H or F, and preferably $Z^5$ is $—CH_2—CH_2—$.

Preferably the compounds of formula V-1 are selected from the group of compounds of formulae V-1a and V-1b V-1a

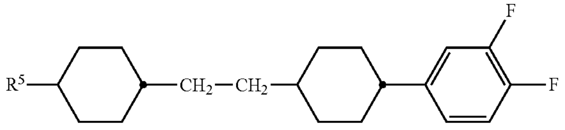

V-1b

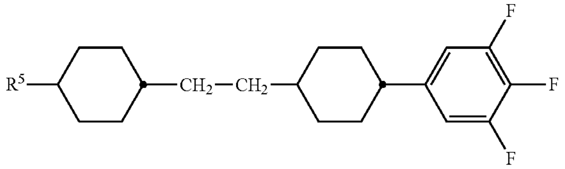

in which the $R^5$ has the meaning given for formula V above.

Preferably the compounds of formula V-2 are selected from the group of compounds of formulae V-2a to V-2d V-2a

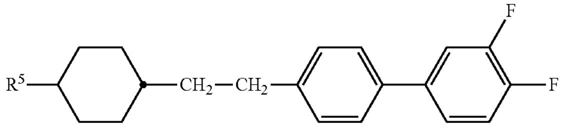

V-2b

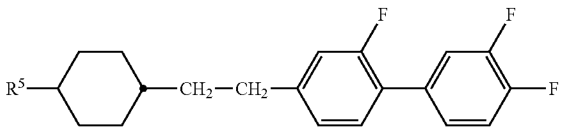

V-2c

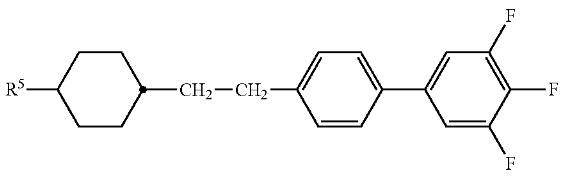

V-2d

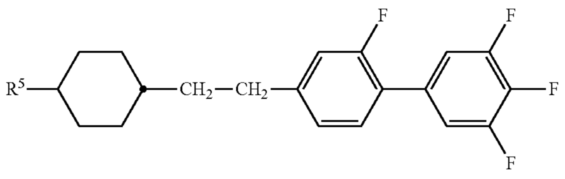

in which the $R^5$ has the meaning given for formula V above.

Preferably the liquid-crystalline media according to the present invention additionally comprise one or more compounds of formula VI

VI

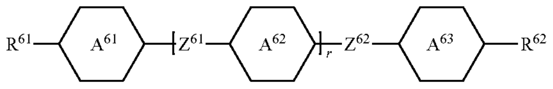

in which $R^{61}$ and $R^{62}$ independently of each other, denote alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, preferably $R^{61}$ is alkyl and $R^{62}$ is alkyl or alkenyl, each having up to 7 C atoms,

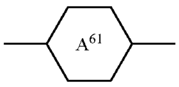
to
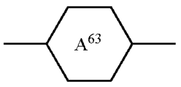

on each occurrence, identically or differently, denote

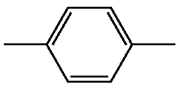
,
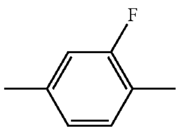
,
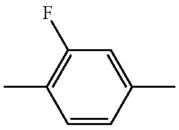
,
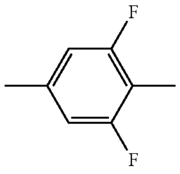
or
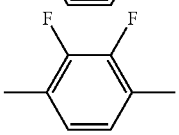
, $Z^{61}$ and $Z^{62}$ on each occurrence, identically or differently, denote $—CH_2CH_2—$, —COO—, trans-CH═CH—, trans-CF═CF—, $—CH_2O—$, $—CF_2O—$ or a single bond, preferably at least one of them is a single bond, and r is 0, 1 or 2, preferably 0 or 1.

Preferably the compounds of formula VI are selected from the group of compounds of formulae VI-1 to VI-4

VI-1

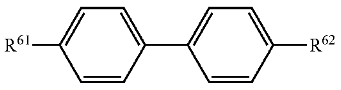

VI-2

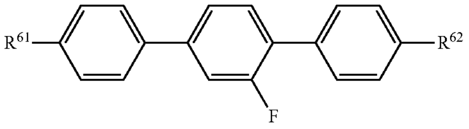

VI-3

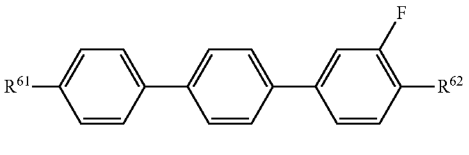

-continued

VI-4

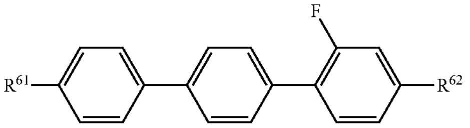

in which $R^{61}$ and $R^{62}$ have the respective meanings given for formula VI above, and $R^{61}$ preferably is alkyl having 1 to 7 C atoms and in formula VI-1 $R^{62}$ preferably is alkenyl having up to 7 C atoms, more preferably $-(CH_2)_2-CH=CH-CH_3$, and in formula VI-2 $R^{62}$ preferably is alkenyl having up to 7 C atoms, more preferably $-(CH_2)_2-CH=CH_2$, and in formulae VI-3 and VI-4 $R^{62}$ preferably is alkyl having 1 to 7 C atoms.

Preferably, the liquid-crystal medium comprises one or more compounds of formula VI-1, preferably in a total amount of at least 5% by weight, more preferably at least 7.5% by weight, and in particular at least 10% by weight.

In a preferred embodiment, the medium according to the invention comprises one or more compounds of formula Y

Y

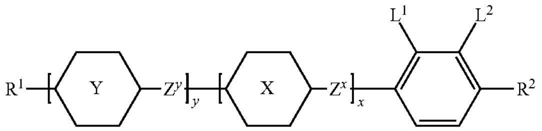

in which the individual radicals have the following meaning:

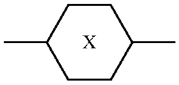 and 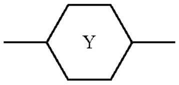 denote

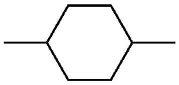, 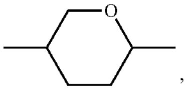,

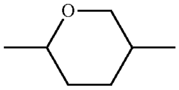, 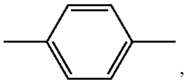,

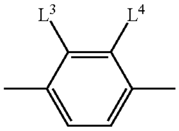, 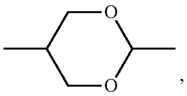,

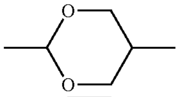, 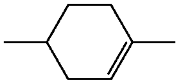 or

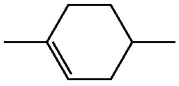, $R^1$, $R^2$ independently of each other, denote a straight-chain, branched or cyclic alkyl or alkoxy radical that is unsubstituted or halogenated and has 1 to 15 C atoms, where, in addition, one or more $CH_2$ groups in these radicals may each be replaced, independently of one another, by $-C\equiv C-$, $-CF_2O-$, $-CH=CH-$,

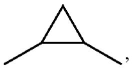, 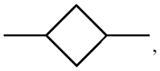,

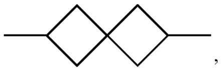, 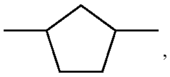,

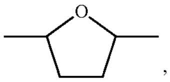, $O-$, $-CO-O-$ or $-O-CO-$ in such a way that O atoms are not linked directly to one another, $Z^x$, $Z^y$ independently of each other, denote $CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond, $L^1$, $L^2$, $L^3$ and $L^4$ independently of each other, denote H, F or Cl, preferably H or F, more preferably F, and x, y independently of each other, denote 0, 1 or 2, with $x+y\leq 3$.

Preferably, the compounds of formula Y contain at least one substituent $L^{1-4}$ that is F or Cl, preferably F, more preferably at least two substituents $L^{1-4}$ that are F.

In the compounds of formula Y and its subformulae, $R^1$ and $R^2$ preferably denote straight-chain alkyl or alkoxy having 1 to 6 C atoms, furthermore alkenyl having 2 to 6 C atoms, in particular vinyl, 1E-propenyl, 1E-butenyl, 3-butenyl, 1E-pentenyl, 3E-pentenyl or 4-pentenyl.

In the compounds of formula Y and its subformulae, preferably both radicals $L^1$ and $L^2$ denote F. In another preferred embodiment of the present invention, in the compounds of formula Y and its subformulae one of the radicals $L^1$ and $L^2$ denotes F and the other denotes Cl.

In a preferred embodiment of the present invention the medium contains one or more compounds of formula Y that are selected from the following subformulae

Y1

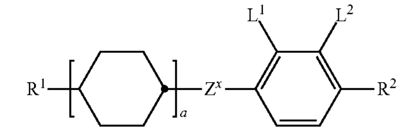

Y2

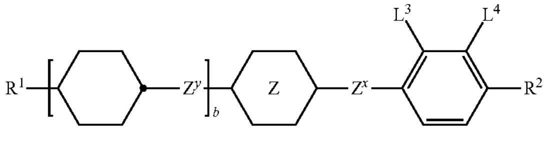

in which $R^1$, $R^2$, $Z^x$, $Z^Y$, $L^1$ and $L^2$ have one of the meanings given in formula Y or one of the preferred meanings as given above and below, a denotes 1 or 2, b denotes 0, 1 or 2, preferably 1 or 2,

 denotes 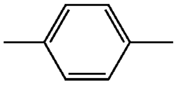 or

-continued

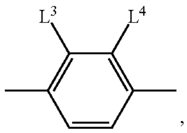

$L^3$, $L^4$ independently of each other, denote F or Cl, preferably F.

Preferably, in the compounds of formula Y1 and Y2 both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

Preferably, the medium comprises one or more compounds of the formula Y1 selected from the group consisting of the following subformulae

Y1-1

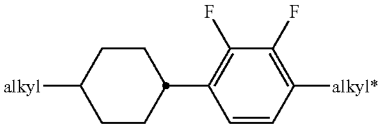

Y1-2

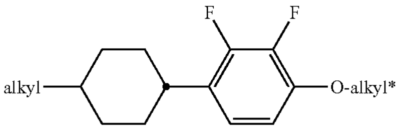

Y1-3

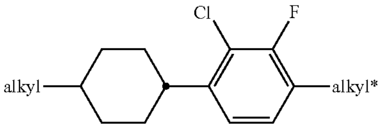

Y1-4

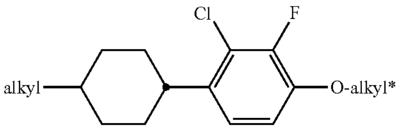

Y1-5

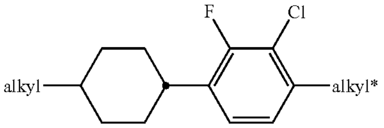

Y1-6

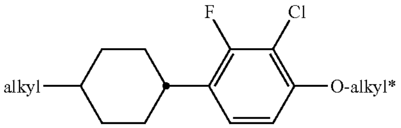

Y1-7

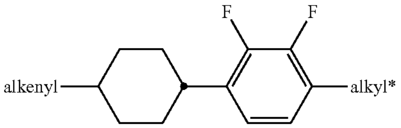

Y1-8

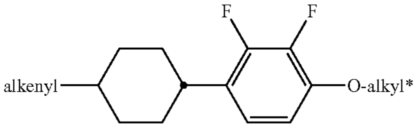

-continued

Y1-9

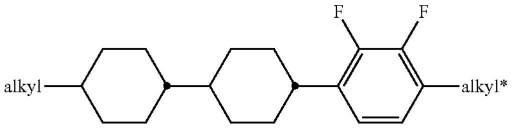

Y1-10

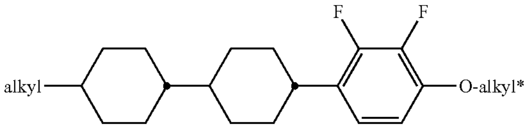

Y1-11

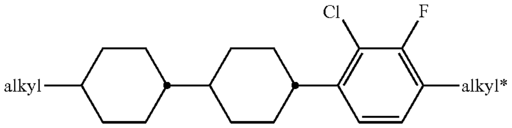

Y1-12

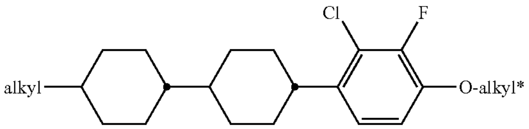

Y1-13

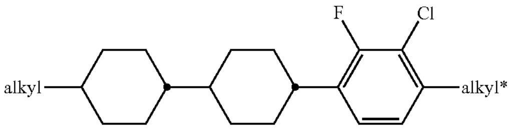

Y1-14

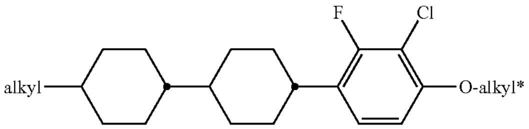

Y1-15

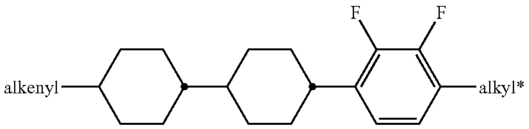

Y1-16

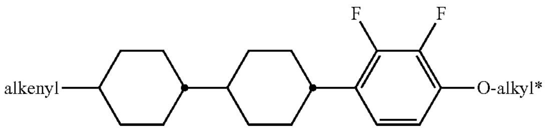

Y1-17

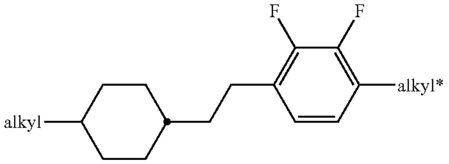

Y1-18

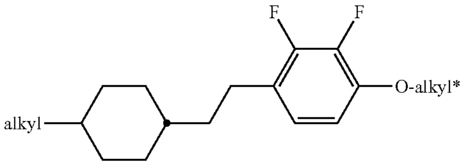

-continued
Y1-19
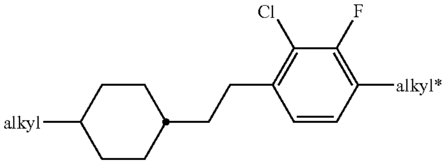
Y1-20
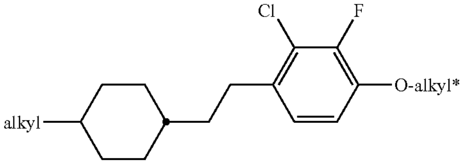
Y1-21
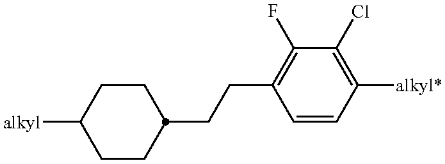
Y1-22
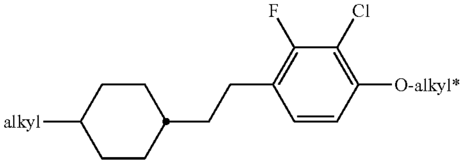
Y1-23
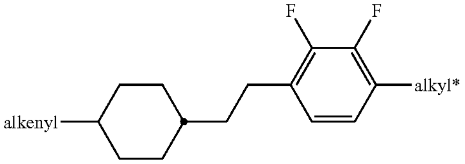
Y1-24
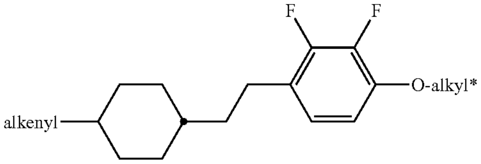
Y1-25
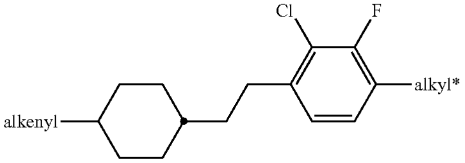
Y1-26
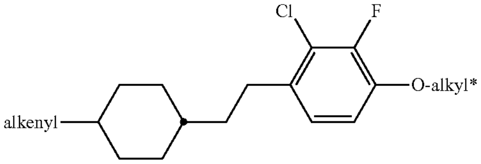
Y1-27
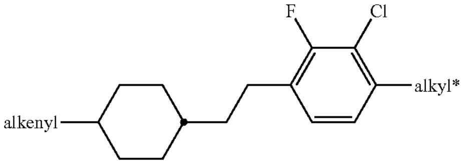
-continued
Y1-28
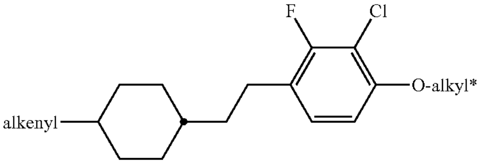
Y1-29
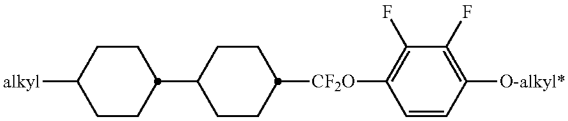
Y1-30
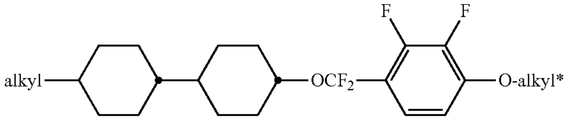
Y1-31
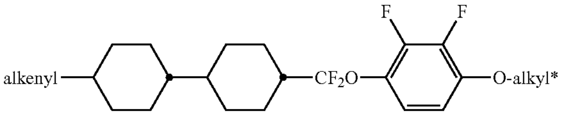
Y1-32
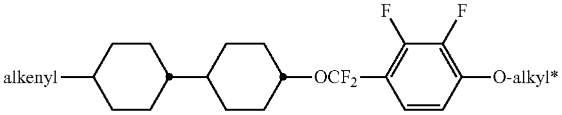
Y1-33
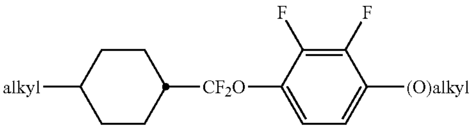
Y1-34
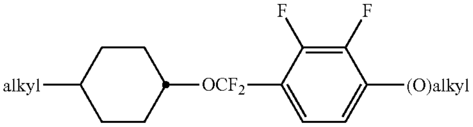
Y1-35
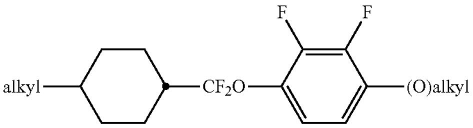
Y1-36
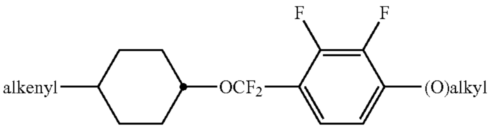
Y1-37
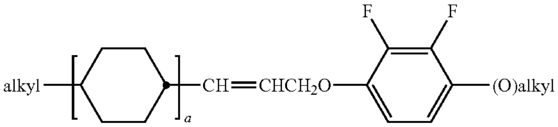

-continued

Y1-38

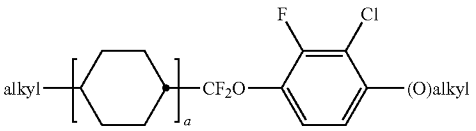

Y1-39

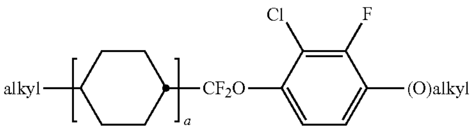

Y1-40

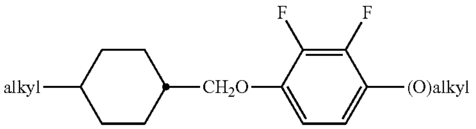

Y1-41

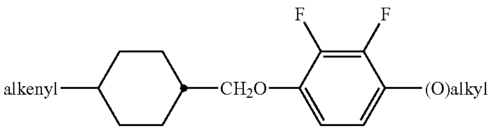

Y1-42

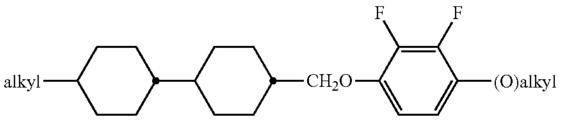

Y1-43

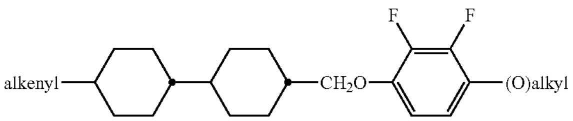

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very preferably the medium contains one or more compounds of formula Y1 selected from formulae Y1-2 and Y1-10.

Preferably, the medium comprises one or more compounds of the formula Y2 selected from the group consisting of the following subformulae:

Y2-1

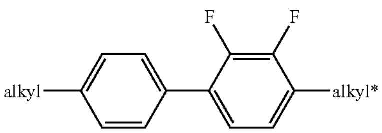

-continued

Y2-2

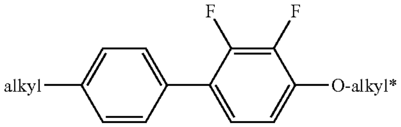

Y2-3

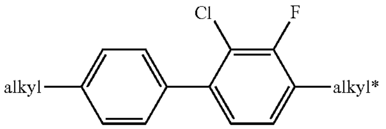

Y2-4

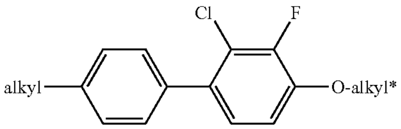

Y2-5

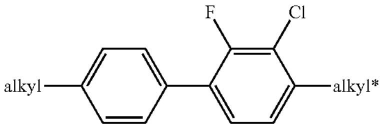

Y2-6

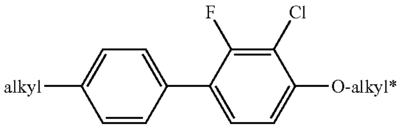

Y2-7

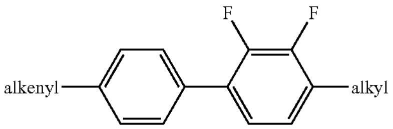

Y2-8

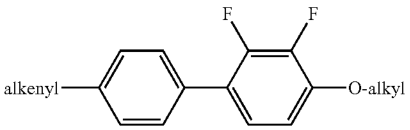

Y2-9

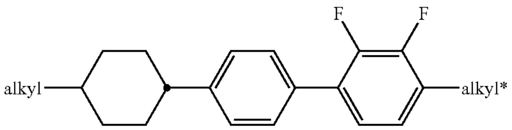

Y2-10

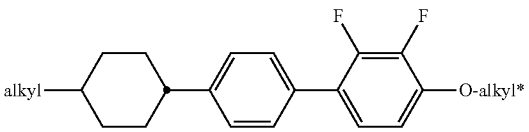

Y2-11

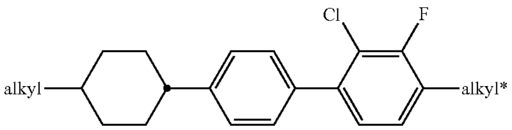

Y2-12

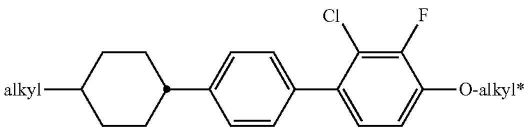

-continued

Y2-13

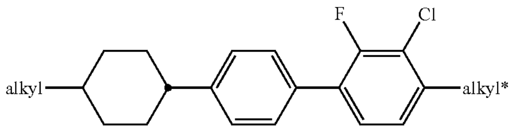

Y2-14

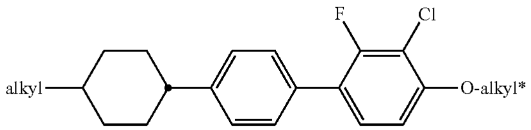

Y2-15

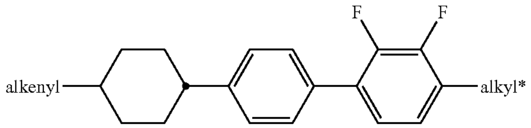

Y2-16

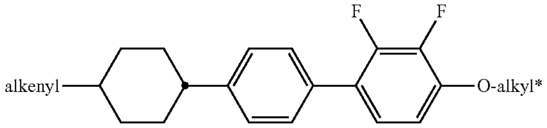

Y2-17

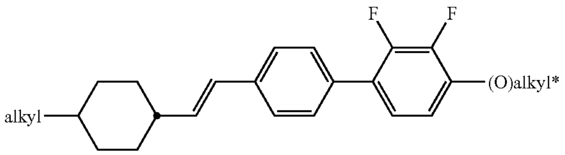

Y2-18

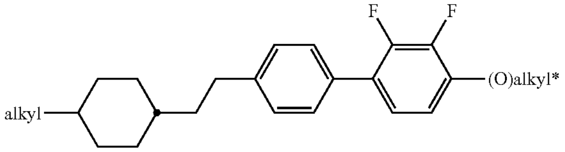

Y2-19

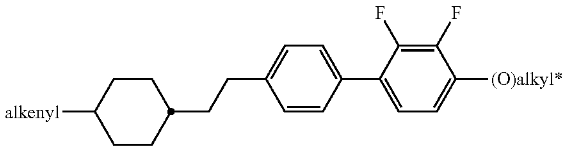

Y2-20

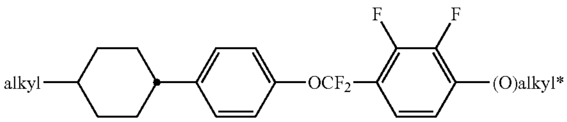

Y2-21

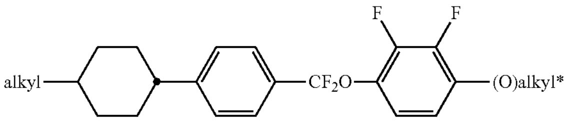

Y2-22

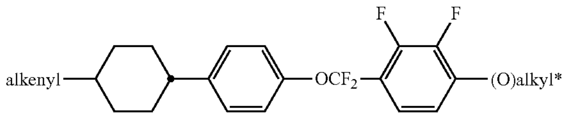

-continued

Y2-23

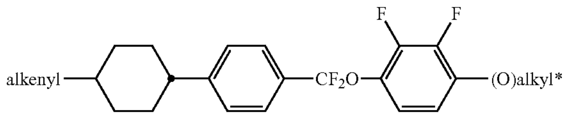

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very preferably the medium contains one or more compounds of formula Y2 selected from formulae Y2-2 and Y2-10, in particular one or more compounds of formula Y2-10.

The proportion of the compounds of formula Y1 or its subformulae in the medium is preferably from 1 to 10% by weight.

The proportion of the compounds of formula Y2 or its subformulae, in particular formula Y2-10, in the medium is preferably from 1% by weight to 15% by weight, more preferably from 2% by weight to 10% by weight.

The total proportion of the compounds of formula Y1 and Y2 or their subformulae in the medium is preferably from 1 to 20%, very preferably from 1 to 15%, most preferably from 1 to 10% by weight.

Preferably the medium contains 1, 2 or 3 compounds of formula Y1 and Y2 or their subformulae, very preferably selected from formulae Y1-2, Y1-10, Y2-2 and Y2-10.

Preferably, the medium comprises one or more compounds of formula Y selected from the following subformula

LY

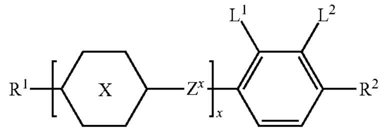

in which $R^1$, $R^2$, $L^1$, $L^2$, X, x and $Z^x$ have the meanings given in formula Y, in which at least one of the rings X is cyclohexenylene. If x is 2, preferably, one ring X is cyclohexylene-1,4-diyl and the other ring X is cyclohexylene-1,4-diyl or cyclohexane-1,4-diyl.

Preferably, in formula LY x is 1 or 2, and

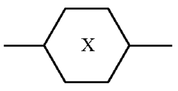

denotes

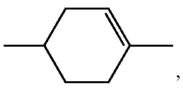

, and in case x is 2 one group

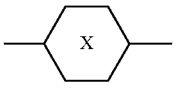

alternatively denotes

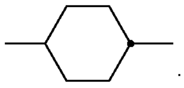

Preferably, both radicals $L^1$ and $L^2$ denote F. In an alternative embodiment one of the radicals $L^1$ and $L^2$ denotes F and the other denotes Cl.

The compounds of the formula LY are preferably selected from the group consisting of the following sub-formulae:

LY1

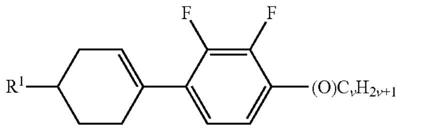

LY2

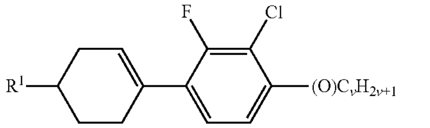

LY3

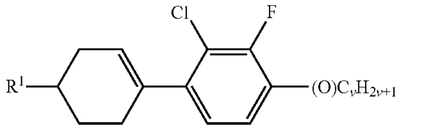

LY4

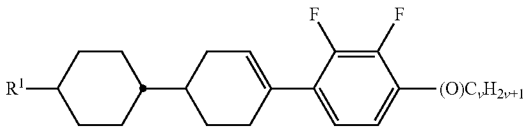

LY5

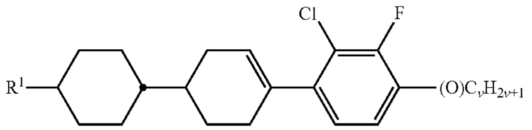

LY6

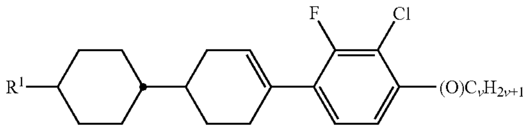

LY7

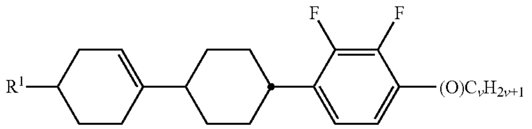

LY8

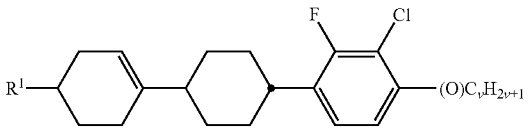

in which $R^1$ has the meaning indicated for formula LY above, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Preferably, the medium contains 1, 2 or 3 compounds of formula LY. The proportion of the compounds of formula LY or its subformulae in the medium is preferably from 1 to 15% by weight.

It is particularly preferred that the medium contains one or more compounds of formula LY4, wherein the proportion of the compounds of formula LY4 in the medium preferably is from 1% by weight to 15% by weight, more preferably from 2% by weight to 10% by weight.

In an embodiment the medium comprises one or more compounds selected from the group of compounds of formulae Y4-1 to Y4-24

Y4-1

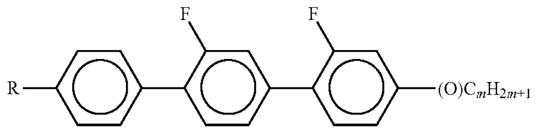

Y4-2

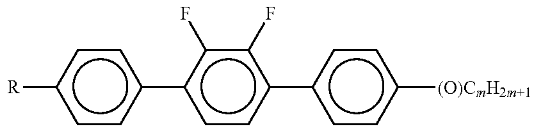

Y4-3

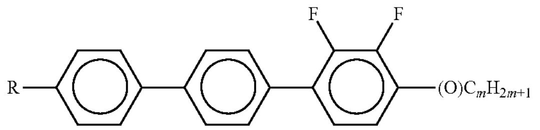

Y4-4

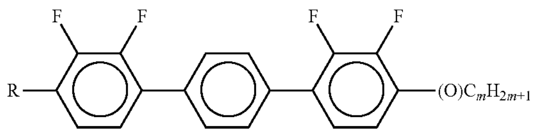

Y4-5

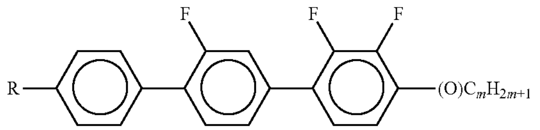

Y4-6

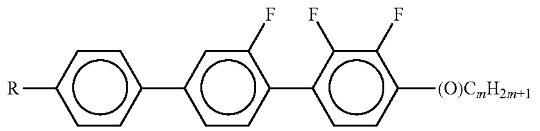

Y4-7

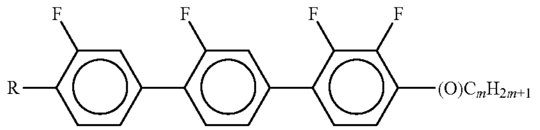

-continued

Y4-8

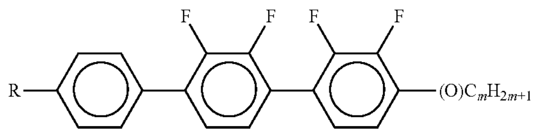

Y4-9

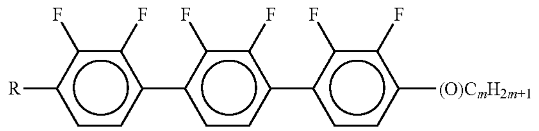

Y4-10

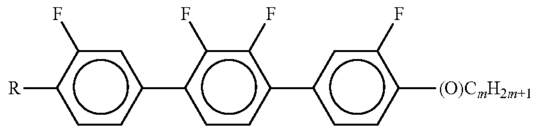

Y4-11

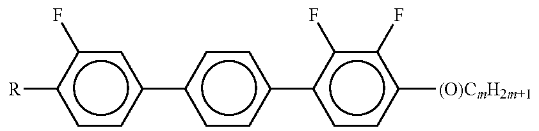

Y4-12

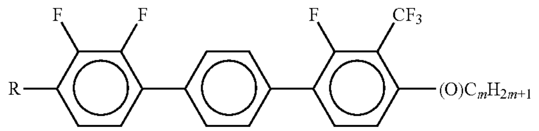

Y4-13

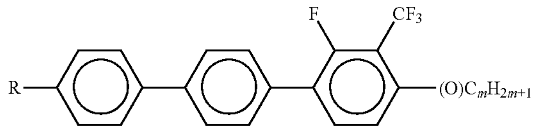

Y4-14

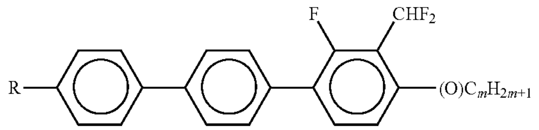

Y4-15

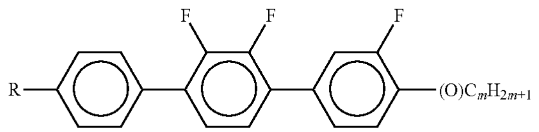

Y4-16

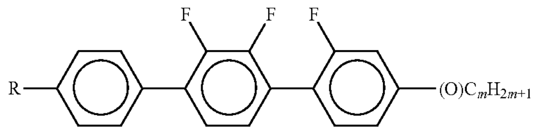

Y4-17

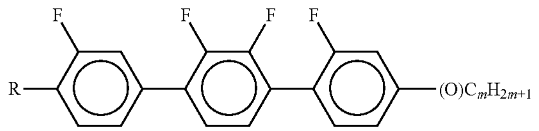

-continued

Y4-18

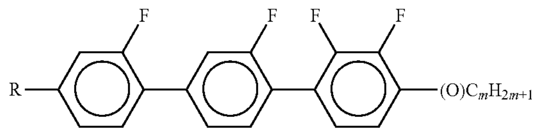

Y4-19

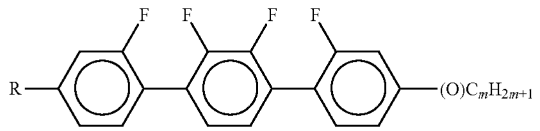

Y4-20

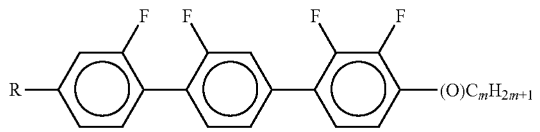

Y4-21

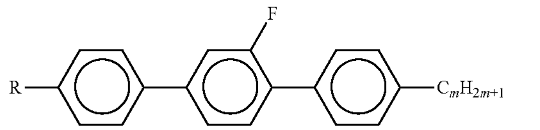

Y4-22

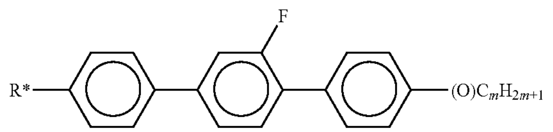

Y4-23

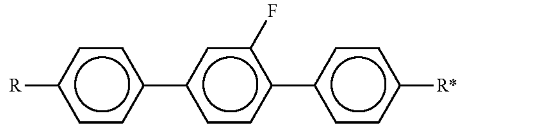

Y4-24

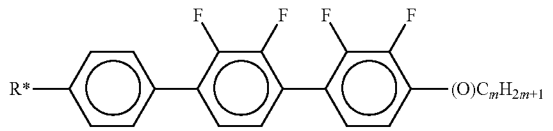

in which R denotes a straight-chain alkyl or alkoxy radical having 1 to 7 C atoms, R* denotes a straight-chain alkenyl radical having 2 to 7 C atoms, (O) denotes an oxygen atom or a single bond, and m denotes an integer from 1 to 6. R* preferably denotes $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$ or $CH_3-(CH_2)_3-CH{=}CH-$ or $CH_3-CH{=}CH-(CH_2)_2-$. R preferably denotes methyl, ethyl, propyl, butyl, pentyl, hexyl, methoxy, ethoxy, propoxy, butoxy or pentoxy.

Preferably, the total proportion of the compounds of formulae I-1, I-2, 1-3 and Y, and in particular their respective sub-formuale, in the medium is from 2% by weight to 30% by weight, more preferably from 5% by weight to 26% by weight, and even more preferably from 8% by weight to 20% by weight.

The liquid-crystal media according to the invention preferably retain the nematic phase down to −20° C., more preferably down to −30° C., and even more preferably down to −40° C. Preferably, the liquid-crystal media according to the invention have a clearing point of ≥75° C., more preferably ≥80° C., and in particular ≥85° C. In addition, the liquid-crystal media preferably exhibit rotational viscosities $\gamma_1$ of 110 mPa·s, particularly preferably 100 mPa·s, where the rotational viscosities are determined at 20° C. Thus LC displays having fast response times may be favourably provided.

The liquid-crystal medium according to the invention has a positive dielectric anisotropy Δε.

Above and below, Δε denotes the dielectric anisotropy, wherein $\Delta\varepsilon=\varepsilon\|-\varepsilon_\perp$. The dielectric anisotropy Δε is preferably determined at 20° C. and 1 kHz.

In particular, the liquid-crystal medium preferably has a dielectric anisotropy Δε of +0.5 or more, more preferably of +1.5 or more, and even more preferably of +2.5 or more. It is particularly preferred that the liquid-crystal medium exhibits a dielectric anisotropy Δε in the range of from +1.5 to +12.0, more preferably from +3.5 to +10.0, even more preferably from +5.0 to +8.0 and in particular from +6.0 to +7.0.

The liquid-crystal medium preferably has an optical anisotropy Δn of 0.08 or more, more preferably 0.10 or more and even more preferably 0.12 or more.

Above and below, Δn denotes the optical anisotropy, wherein $\Delta n=n_e-n_o$, and wherein preferably the optical anisotropy Δn is determined at 20° C. and at a wavelength of 589.3 nm. The liquid-crystal medium preferably has an optical anisotropy in the range of from 0.08 to 0.15 and in particular from 0.11 to 0.13.

The rotational viscosity $\gamma_1$ of the liquid-crystal media preferably is ≤80 mPa s, more preferably ≤70 mPa s, and even more preferably ≤60 mPa s.

The ratio $\gamma_1/K_{11}$, in which $\gamma_1$ is the rotational viscosity and $K_{11}$ is the elastic constant for splay deformation, of the liquid-crystal media preferably is ≤4.5 mPa·s/pN, more preferably ≤4.2 mPa·s/pN, most preferably ≤4.0 mPa·s/pN.

The nematic phase range of the liquid-crystal media according to the invention preferably has a width of at least 90° C., more preferably of at least 100° C., in particular of at least 110° C. This range particularly preferably extends at least from −25° C. to +80° C.

According to the invention the liquid-crystal medium comprises at least one stabilizer. In a preferred embodiment the medium contains two or more stabilizers. In particular, the at least one stabilizer is an additive which is useful to prevent or impede degradation of the medium, in particular with respect to heat and/or light.

The one or more stabilizers, preferably the two or more stabilizers, are preferably selected from hindered amine light stabilizers, also known as HALS. A preferred stabilizer therefore is for example TINUVIN®770.

In a preferred embodiment of the present invention the liquid-crystal medium comprises one or more, preferably two or more, stabilizers selected from the group consisting of compounds of the formulae ST-a to ST-r ST-a

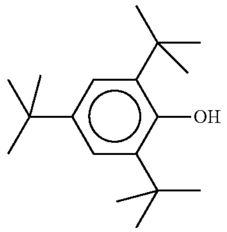

ST-b

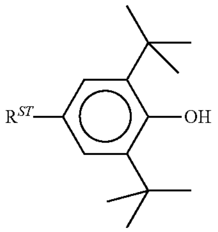

ST-c

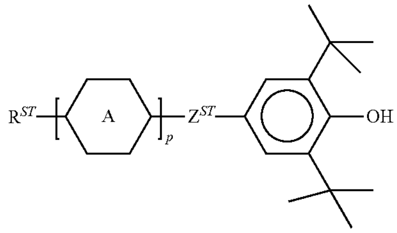

ST-d

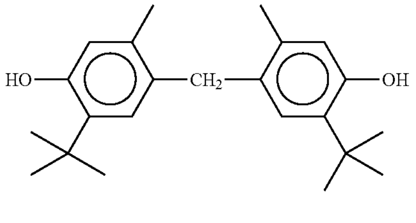

ST-e

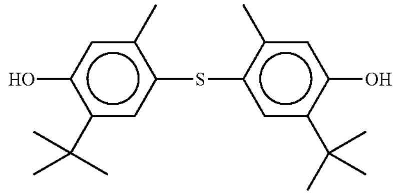

ST-f

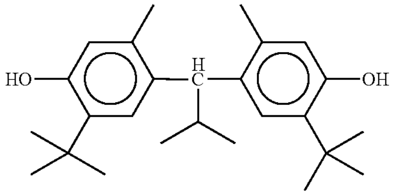

ST-g

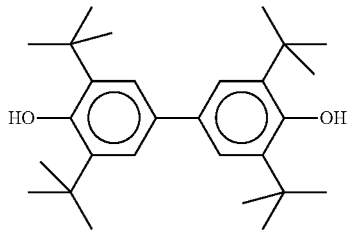

ST-h

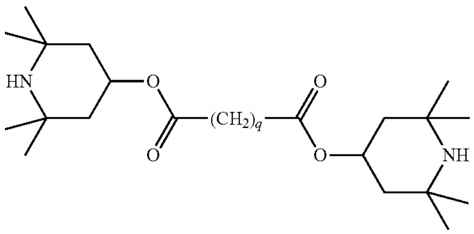

-continued
ST-i
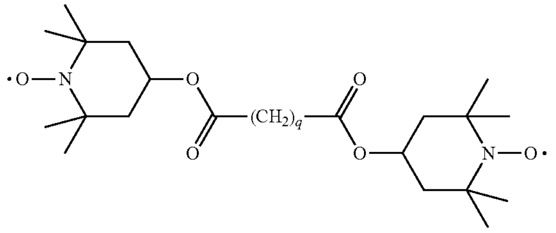
ST-j
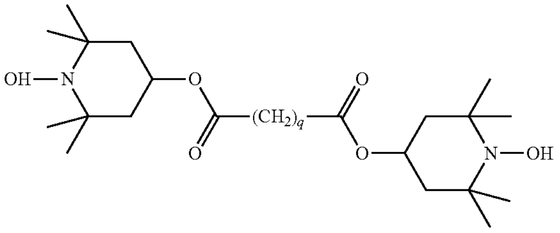
ST-k
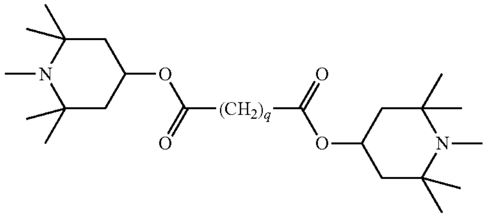
ST-l
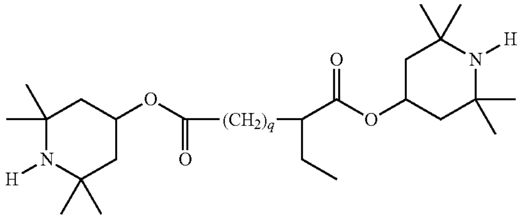
ST-m
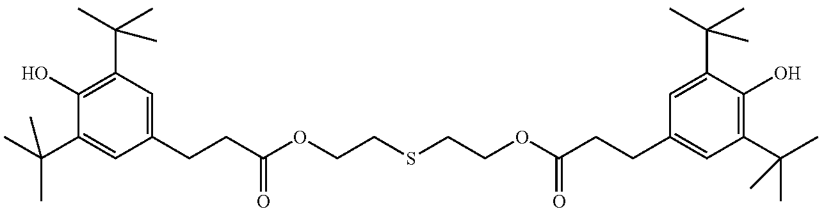
ST-n
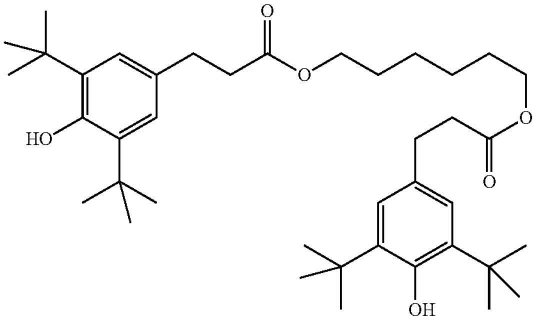
ST-o
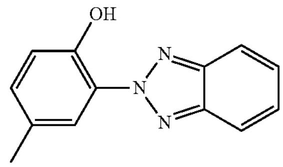
ST-p
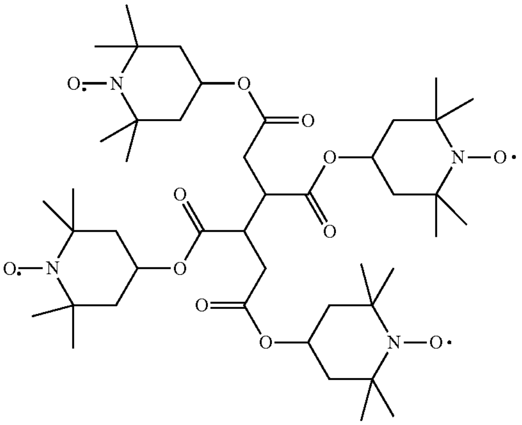
ST-q
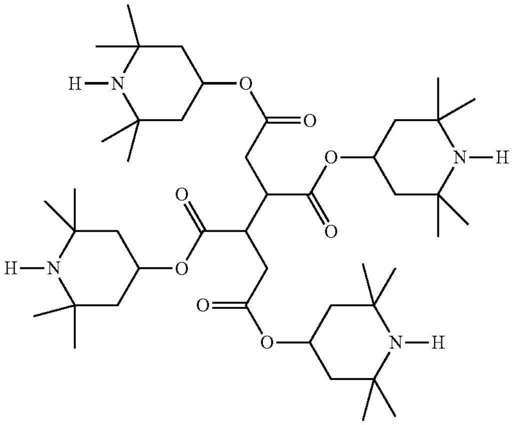

-continued

ST-r

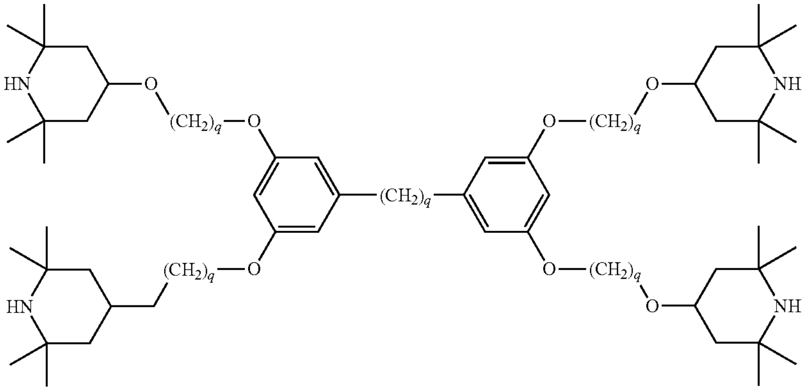

in which $R^{ST}$ denotes H, an alkyl or alkoxy radical having 1 to 15 C atoms, where, in addition, one or more $CH_2$ groups in these radicals may each be replaced, independently of one another, by —C≡C—, —$CF_2O$—, —$OCF_2$—, —CH═CH—,

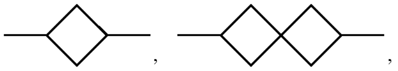

—O—, —CO—O—, or —O—CO— in such a way that O atoms are not linked directly to one another, and in which, in addition, one or more H atoms may each be replaced by halogen,

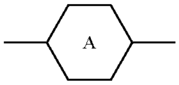 denotes 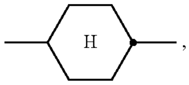,

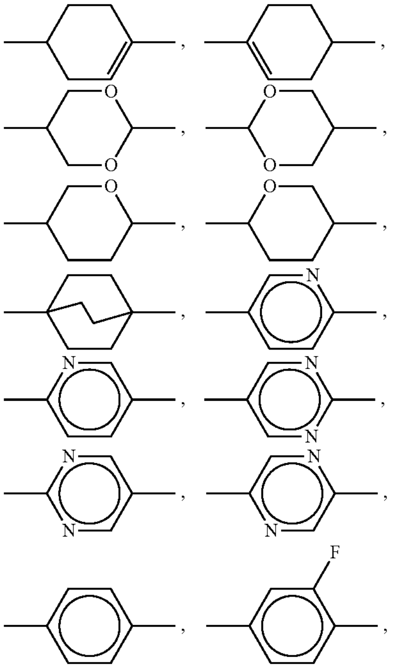

-continued

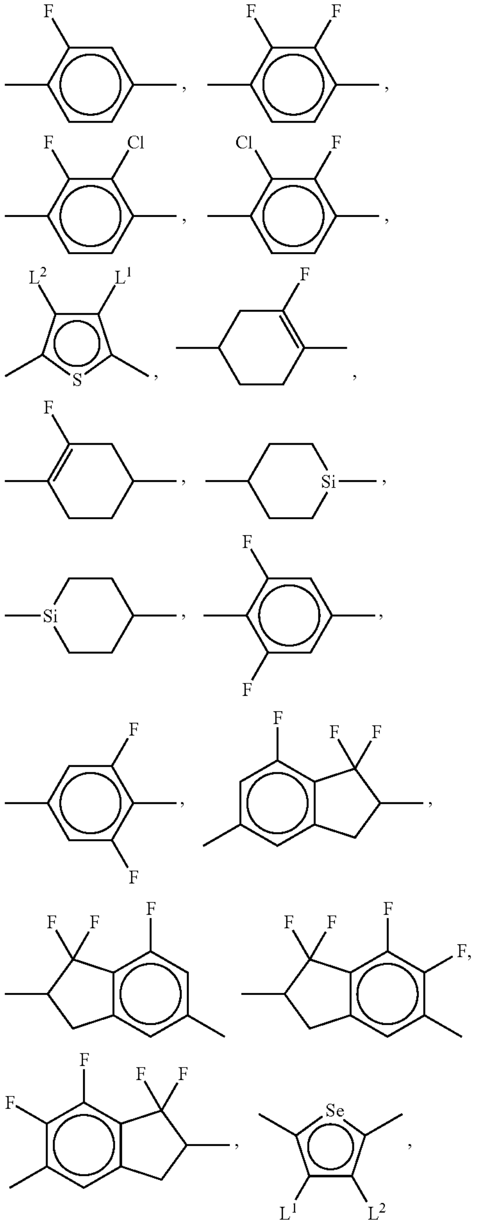

-continued

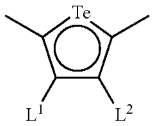,
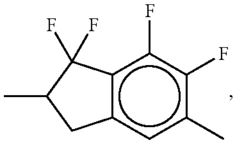,
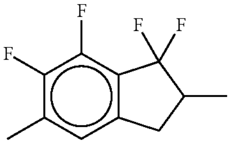,
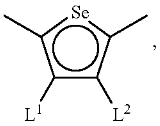,
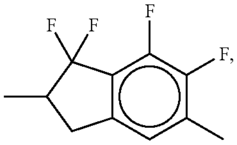
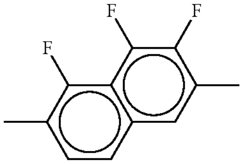,
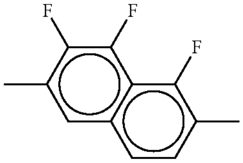,
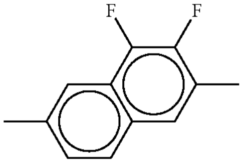,
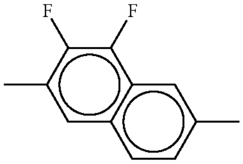,
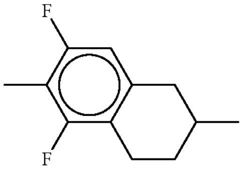
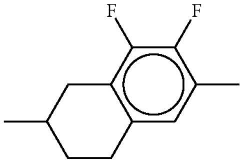,
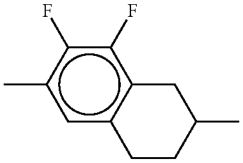,
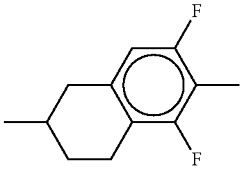
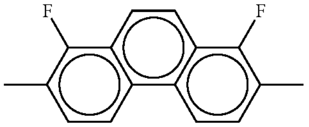,
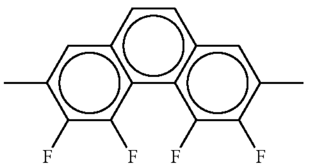,
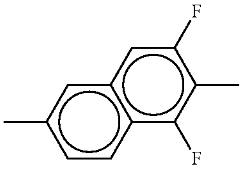

-continued

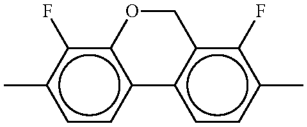,
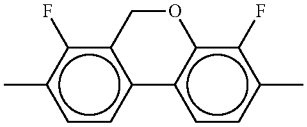,
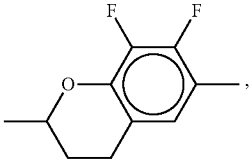,
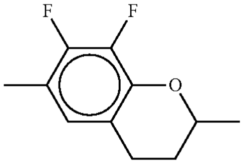
or
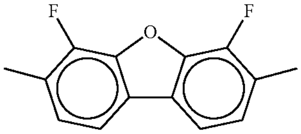

$Z^{ST}$ each, independently of one another, denote —CO—O—, —O—CO—, $—CF_2O—$, $—OCF_2—$, $—CH_2O—$, $—OCH_2—$, $—CH_2—$, $—CH_2CH_2—$, $—(CH_2)_4—$, $—CH{=}CH—CH_2O—$, $—C_2F_4—$, $—CH_2CF_2—$, $—CF_2CH_2—$, —CF=CF—, —CH=CF—, —CF=CH—, —CH=CH—, —C≡C— or a single bond, $L^1$ and $L^2$ each, independently of one another, denote F, Cl, $CF_3$ or $CHF_2$, p denotes 1 or 2, and q denotes 1, 2, 3, 4, 5, 6, 7, 8, 9 or 10.

In another preferred embodiment of the present invention the liquid-crystal media contain one or more stabilizers selected from Table F.

It is particularly preferred that the liquid-crystal medium according to the invention comprises one or more stabilizers, more preferably two or more stabilizers, selected from the group consisting of compounds ST-1 to ST-5, in particular from ST-1, ST-2 and ST-3

ST-1

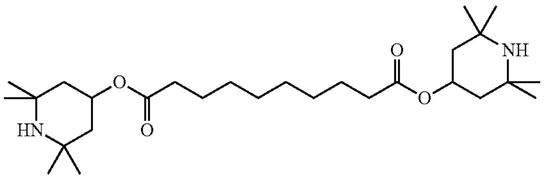

ST-2

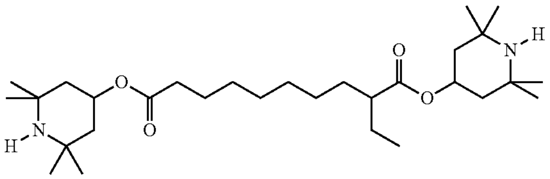

ST-3

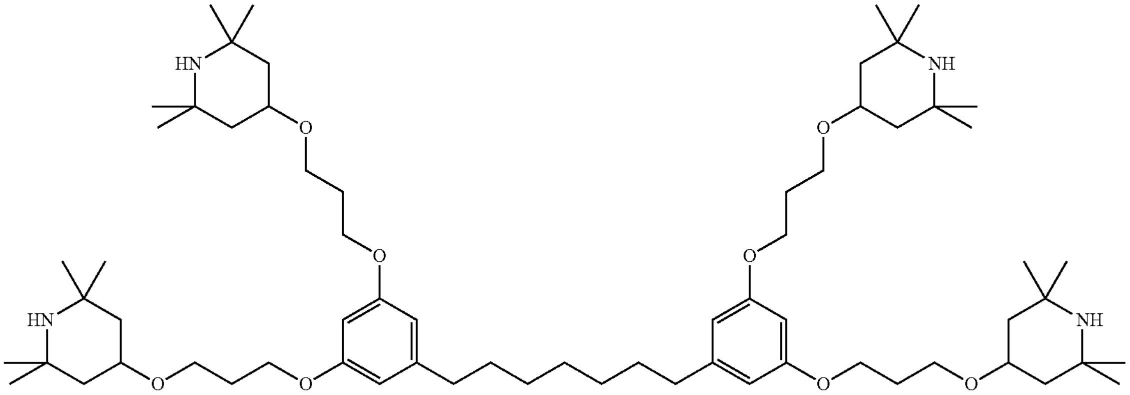

ST-4

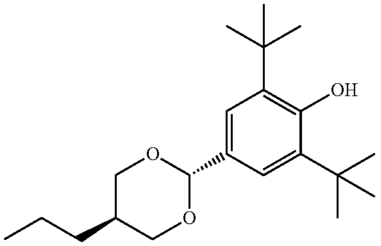

ST-5

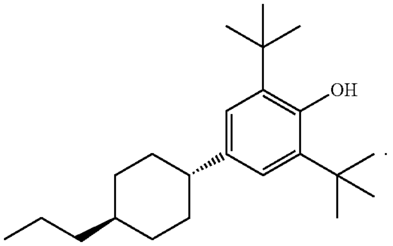

The individual stabilizer(s), preferably selected from the compounds ST-1 to ST-5, is (are) preferably present in the liquid-crystal media according to the invention in an amount of from 0.005% by weight to 2.5% by weight, more preferably from 0.01% by weight to 1% by weight, even more preferably from 0.03% by weight to 0.5% by weight and in particular from 0.1% by weight to 0.2% by weight, based on the mixture.

In case the mixtures according to the invention comprise two or more stabilizers, the overall concentration of these compounds is preferably in the range of from 0.01% by weight to 2.5% by weight, more preferably in the range of from 0.05% by weight to 1.0% by weight, based on the mixtures.

However, the total proportion of the one or more stabilizers, based on the mixture according to the invention, should preferably not exceed 3% by weight.

The use of stabilizer ST-3 is particularly preferred.

In an aspect of the present invention the liquid-crystal media are prepared by mixing the one or more stabilizers with a liquid-crystal host medium having a positive dielectric anisotropy and comprising the one or more compounds selected from the group of compounds of formulae I-1, I-2 and I-3.

Another aspect of the present invention relates to the use of the one or more stabilizers, preferably selected from the compounds ST-1 to ST-5, in particular from ST-1, ST-2 and ST-3 and especially ST-3, in a liquid-crystal medium having a positive dielectric anisotropy and comprising the one or more compounds selected from the group of compounds of formulae I-1, I-2 and I-3.

It has surprisingly been found that the presently provided liquid-crystal medium can favourably contribute to obtaining an advantageous electro-optical device performance, e.g. in terms of the achievable contrast and the high bright state transmittance, while exhibiting functionality, reliability and stability also at high temperatures and at low temperatures.

Above and below, the definitions of the abbreviations, also referred to as acronyms, of preferred compounds are given in table A to C below.

In further preferred embodiments, the medium according to the invention comprises

- one or more compounds selected from the group of compounds of formulae I-1, I-2 and I-3, preferably of formula I-2, in a total concentration in the range of from 2.5% by weight to 15% by weight, more preferably from 5% by weight to 10% by weight and in particular from 6% by weight to 8% by weight, and

- one or more stabilizers, preferably two or more stabilizers, in particular selected from the group of stabilizers ST-1, ST-2, ST-3, ST-4 and ST-5, and/or

- one or more compounds of formula II, preferably of formulae II-B, II-C and/or II-D, preferably in a total amount of 5% by weight or more, more preferably 10% by weight or more, even more preferably 15% by weight or more and in particular 20% by weight or more, and/or one or more compounds of formula III-1, preferably in an amount of at least 2% by weight, more preferably at least 5% by weight, and/or one or more compounds of formula IV-1, preferably selected from CC-n-V and CC-n-Vm, more preferably from CC-n-V, and in particular CC-3-V, CC-3-V1 and/or CC-3-2V1, preferably in a total amount of at least 10% by weight, more preferably at least 20% by weight, even more preferably at least 30% by weight and in particular at least 35% by weight, and/or one or more compounds of formula VI-1, preferably PP-n-2Vm and in particular PP-1-2V1, preferably in a total amount of at least 5% by weight, more preferably at least 7.5% by weight, and in particular at least 10% by weight, and/or one or more compounds of formula Y2-10, preferably in a total amount of from 1% by weight to 15% by weight, more preferably from 2% by weight to 10% by weight and/or one or more compounds of formula LY4, preferably in a total amount of from 1% by weight to 15% by weight, more preferably from 2% by weight to 10% by weight.

The term "alkyl" or "alkyl*" herein encompasses straight-chain and branched alkyl groups, preferably having 1-6 carbon atoms, in particular the straight-chain groups methyl, ethyl, propyl, butyl, pentyl and hexyl. Groups having 2-5 carbon atoms are generally preferred.

The term "alkenyl" or "alkenyl*" encompasses straight-chain and branched alkenyl groups, preferably having 2-6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2{=}CH$, $CH_3CH{=}CH$.

The term "fluoroalkyl" preferably encompasses straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

The individual compounds of the above-mentioned formulae and the sub-formulae thereof which can be used in the liquid-crystalline media according to the invention are either known or can be prepared analogously to the known compounds.

In another preferred embodiment of the present invention the liquid-crystal medium additionally comprises one or more polymerisable compounds. The polymerisable compounds are preferably selected from formula M $$R^a—B^1—(Z^b—B^2)_m—R^b \quad M$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl.

Very preferred compounds of formula M are selected from the following formulae:

M1

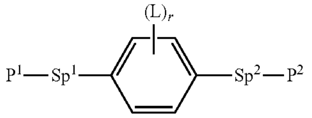

M2

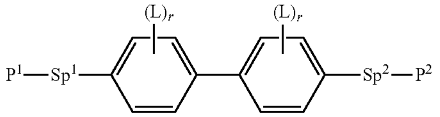

M3

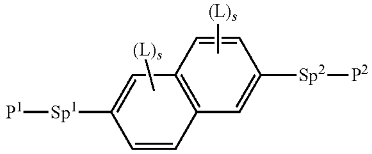

M4

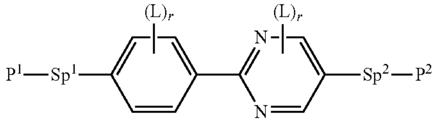

M5

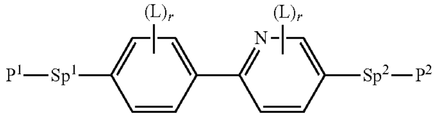

M6

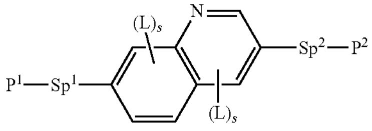

M7

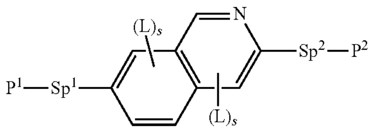

M8

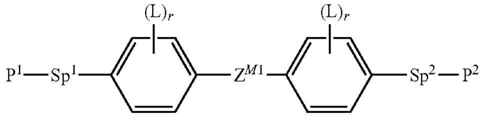

M9

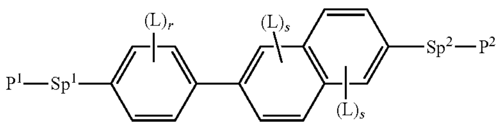

-continued

M10

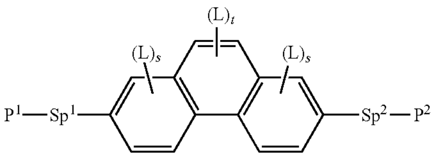

M11

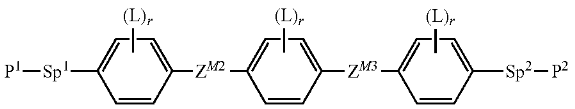

M12

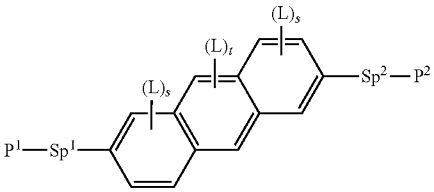

M13

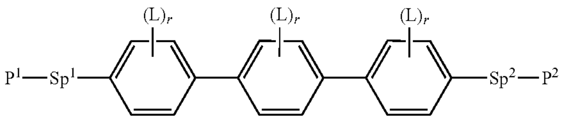

M14

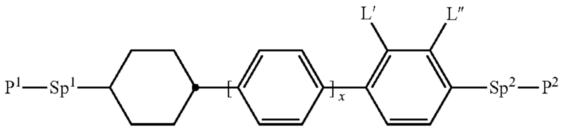

M15

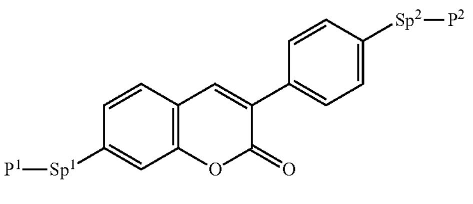

M16

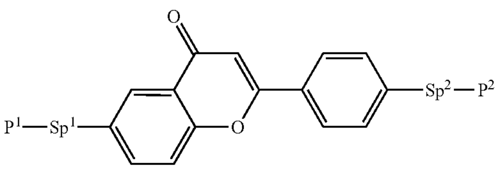

M17

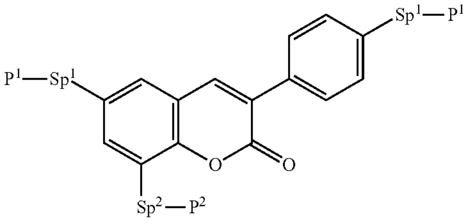

-continued

M18

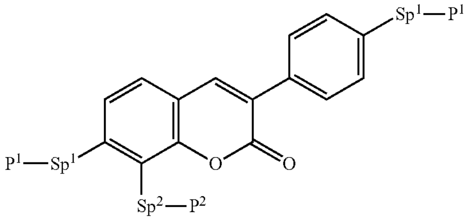

M19

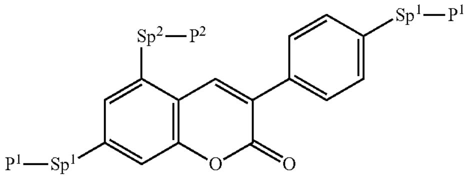

M20

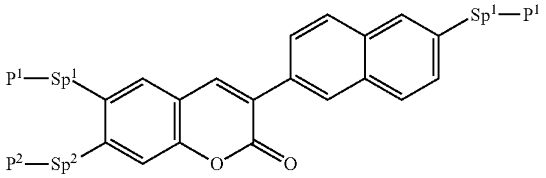

M21

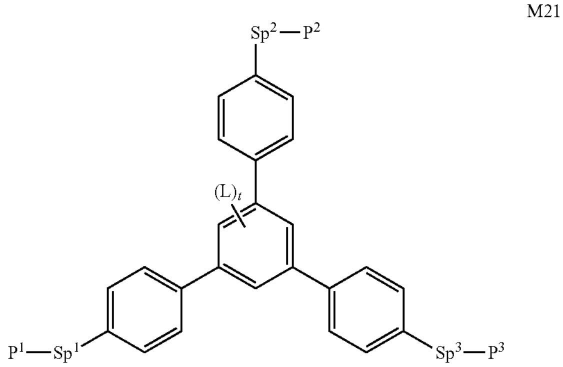

M22

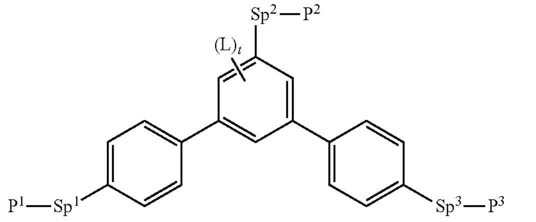

M23

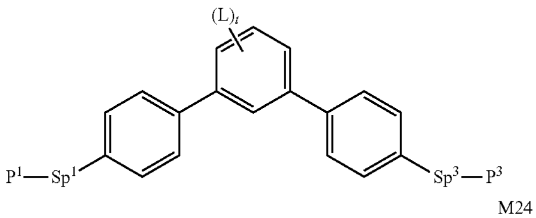

M24

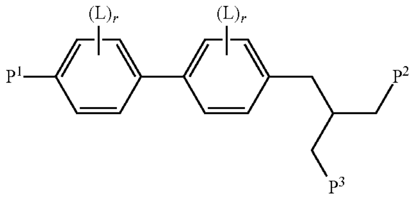

-continued

M25

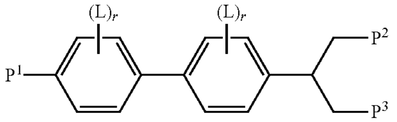

M26

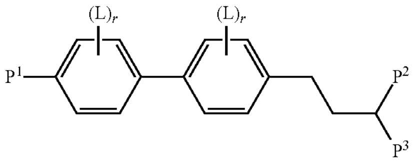

M27

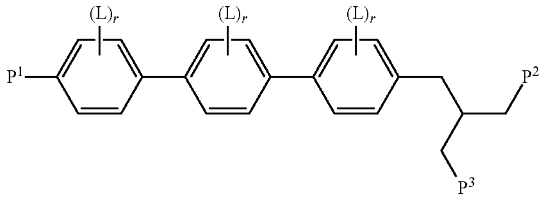

M28

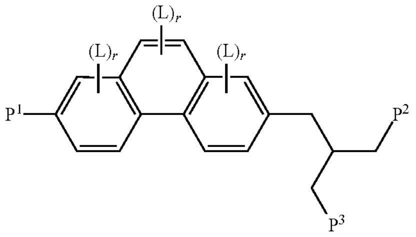

M29

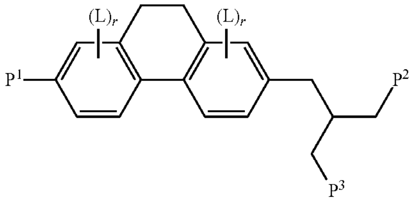

M30

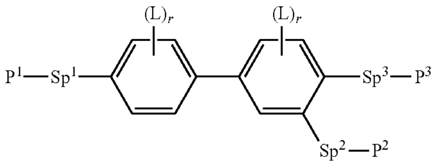

M31

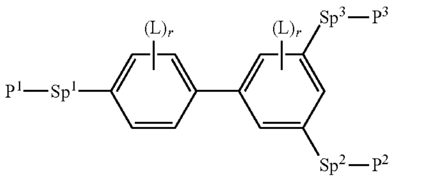

in which the individual radicals, on each occurrence identically or differently, and each, independently of one another, have the following meaning:

$P^1$, $P^2$, $P^3$ a polymerisable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^1$—$Sp^2$- and $P^3$—$Sp^3$- may denote $R^{aa}$, with the proviso that at least one of the radicals $P^1$-$Sp^1$-, $P^2$—$Sp^2$ and $P^3$—$Sp^3$- present is different from $R^{aa}$ preferably $-(CH_2)_{p1}-$, $-(CH_2)_{p1}-O-$, $-(CH_2)_{p1}-CO-O-$ or $-(CH_2)_{p1}-O-CO-O-$, in which p1 is an integer from 1 to 12, $R^{aa}$ H, F, Cl, CN or straight-chain or branched alkyl having 1 to 25 C atoms, in which, in addition, one or more non-adjacent $CH_2$ groups may each be replaced, independently of one another, by $-C(R^0)=C(R^{00})-$, $-C\equiv C-$, $-N(R^0)-$, $-O-$, $-S-$, $-CO-$, $-CO-O-$, $-O-CO-$, $-O-CO-O-$ in such a way that O and/or S atoms are not linked directly to one another, and in which, in addition, one or more H atoms may be replaced by F, Cl, CN or $P^1-Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, $CH_3$ or $CF_3$, $X^1$, $X^2$, $X^3$ $-CO-O-$, $-O-CO-$ or a single bond, $Z^{M1}$ $-O-$, $-CO-$, $-C(R^yR^z)-$ or $-CF_2CF_2-$, $Z^{M2}$, $Z^{M3}$ $-CO-O-$, $-O-CO-$, $-CH_2O-$, $-OCH_2-$, $-CF_2O-$, $-OCF_2-$ or $-(CH_2)_n-$, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, r 0, 1, 2, 3 or 4, s 0, 1, 2 or 3, t 0, 1 or 2, x 0 or 1.

Especially preferred are compounds of formulae M2 and M13.

Further preferred are trireactive compounds M15 to M31, in particular M17, M18, M19, M22, M23, M24, M25, M30 and M31.

In the compounds of formulae M1 to M31 the group

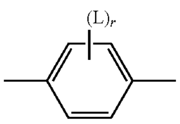

is preferably

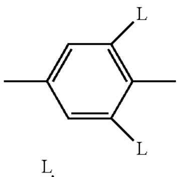,

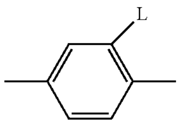,

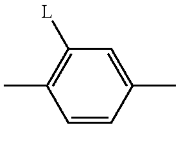,

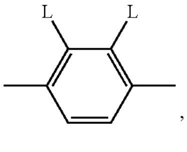,

-continued

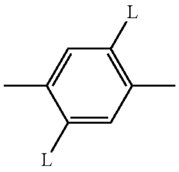

or

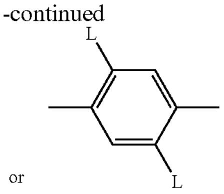, in which L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Preferred compounds of formulae M1 to M31 are those in which $P^1$, $P^2$ and $P^3$ denote an acrylate, methacrylate, oxetane or epoxy group, very preferably an acrylate or methacrylate group.

Further preferred compounds of formulae M1 to M31 are those in which $Sp^1$, $Sp^2$ and $Sp^3$ are a single bond.

Further preferred compounds of formulae M1 to M31 are those in which one of $Sp^1$, $Sp^2$ and $Sp^3$ is a single bond and another one of $Sp^1$, $Sp^2$ and $Sp^3$ is different from a single bond.

Further preferred compounds of formulae M1 to M31 are those in which those groups $Sp^1$, $Sp^2$ and $Sp^3$ that are different from a single bond denote $-(CH_2)_{s1}-X''-$, in which s1 is an integer from 1 to 6, preferably 2, 3, 4 or 5, and X" is X" is the linkage to the benzene ring and is $-O-$, $-O-CO-$, $-CO-O-$, $-O-CO-O-$ or a single bond.

Particular preference is given to liquid-crystalline media comprising one, two or three polymerisable compounds of formula M, preferably selected from formulae M1 to M31.

Further preferably the liquid-crystalline media according to the present invention comprise one or more polymerisable compounds selected from Table G below.

Preferably the proportion of polymerisable compounds in the liquid-crystalline medium, preferably selected from formula M and Table G, is from 0.01 to 5%, very preferably from 0.05 to 1%, most preferably from 0.1 to 0.5%.

It was observed that the addition of one or more polymerisable compounds to the liquid-crystalline medium, like those selected from formula M and Table G, leads to advantageous properties like fast response times. Such a liquid-crystalline medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds it is possible to increase the absorption of the liquid-crystalline medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

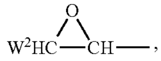, 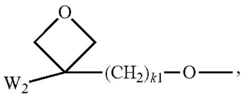,

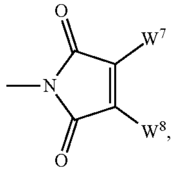 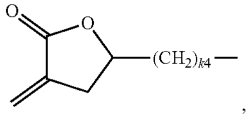, $CH_2$=$CW^2$—$(O)_{k3}$—, $CW^1$=CH—CO—$(O)_{k3}$—, $CW^1$=CH—CO—NH—, $CH_2$=$CW^1$—CO—NH—, $CH_3$—CH=CH—O—, $(CH_2{=}CH)_2CH$—OCO—, $(CH_2{=}CH{-}CH_2)_2CH$—OCO—, $(CH_2{=}CH)_2CH$—O—, $(CH_2{=}CH{-}CH_2)_2N$—, $(CH_2{=}CH{-}CH_2)_2N$—CO—, HO—$CW^2W^3$—, HS—$CW^2W^3$_, $HW^2N$—, HO—$CW^2W^3$—NH—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^6$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$=$CW^1$—CO—O—, $CH_2$=$CW^1$—CO—,

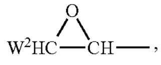, 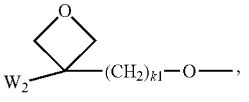,

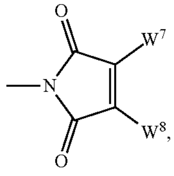 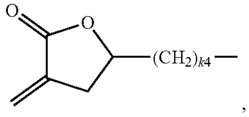, $CH_2$=$CW^2$—O—, $CH_2$=$CW^2$—, $CW^1$=CH—CO—$(O)_{k3}$—, $CW^1$=CH—CO—NH—, $CH_2$=$CW^1$—CO—NH—, $(CH_2{=}CH)_2CH$—OCO—, $(CH_2{=}CH{-}CH_2)_2$CH—OCO—, $(CH_2{=}CH)_2CH$—O—, $(CH_2{=}CH{-}CH_2)_2$N—, $(CH_2{=}CH{-}CH_2)_2N$—CO—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$=$CW^1$—CO—O—, in particular $CH_2$=CH—CO—O—, $CH_2$=$C(CH_3)$—CO—O— and $CH_2$=CF—CO—O—, furthermore $CH_2$=CH—O—, $(CH_2{=}CH)_2CH$—O—CO—, $(CH_2{=}CH)_2CH$—O—,

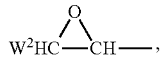, and 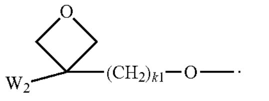.

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"—X", so that the respective radical P-Sp- conforms to the formula P-Sp"—X"—, in which Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —$N(R^0)$—, —$Si(R^0R^{00})$—, —CO—, —CO—O—, —O—CO—, —O—CO—O—, —S—CO—, —CO—S—, —$N(R^{00})$—CO—O—, —O—CO—$N(R^0)$—, —$N(R^0)$—CO—$N(R^{00})$—, —CH=CH— or —C=C— in such a way that O and/or S atoms are not linked directly to one another, X" denotes —O—, —S—, —CO—, —CO—O—, —O—CO—, —O—CO—O—, —CO—$N(R^0)$—, —$N(R^0)$—CO—, —$N(R^0)$—CO—$N(R^{00})$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"—X"— are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}$—$O)_{p1}$—, in which p1 is an integer from 1 to 12, q1 is an integer from 1 to 3, and $R^0$ and $R^{00}$ have the meanings indicated above.

Particularly preferred groups Sp and -Sp"—X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

For the production of PSA displays, the polymerisable compounds contained in the liquid-crystalline medium are polymerised or crosslinked (if one compound contains two or more polymerisable groups) by in-situ polymerisation in the liquid-crystalline medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the liquid-crystalline media according to the invention at the same time as constantly high clearing points and high VHR values.

The use of liquid-crystalline media containing polymerisable compounds allows the rapid establishment of a particularly low pretilt angle in PSA displays. In particular, the liquid-crystalline media exhibit significantly shortened response times, in particular also the grey-shade response times, in PSA displays compared with the media from the prior art.

Preference is generally given to liquid-crystalline media which have a nematic liquid-crystalline phase, and preferably have no chiral liquid crystal phase.

The invention also relates to the use of a liquid-crystalline medium according to the present invention as described above and below for electro-optical purposes, in particular for the use is in shutter glasses, for 3D applications, in TN, PS-TN, STN, TN-TFT, OCB, IPS, PS-IPS, FFS, HB-FFS, PS-FFS, positive VA and positive PS-VA displays, and to electro-optical displays, in particular of the aforementioned types, containing a liquid-crystalline medium according to the present invention as described above and below, in particular a TN, PS-TN, STN, TN-TFT, OCB, IPS, PS-IPS, FFS, HB-FFS, PS-FFS, positive VA (vertically aligned) or positive PS-VA display.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, wherein the a nematic liquid-crystal mixture is a liquid-crystalline medium according to the present invention as described above and below.

The liquid-crystalline media according to the invention enable a significant broadening of the available parameter latitude. The achievable combinations of clearing point, viscosity at low temperature, thermal and UV stability and suitable optical anisotropy are superior to previous materials from the prior art.

Comparative measurements of the voltage holding ratio (VHR) are shown e.g. in S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989).

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

The liquid-crystalline media which can be used in accordance with the invention are prepared in a manner conventional per se, for example by mixing the compounds as set forth in claim 1, optionally also mixing with further mesogenic compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The liquid-crystalline media may also comprise further additives known to the person skilled in the art and described in the literature, such as, for example, polymerisation initiators, inhibitors, surface-active substances, light stabilizers, antioxidants, e.g. BHT, TEMPOL, microparticles, free-radical scavengers, nanoparticles, etc. For example, 0-15% of pleochroic dyes or chiral dopants can be added. Suitable stabilizers and dopants are mentioned below in Tables E and F.

In an embodiment the liquid-crystalline media contain one or more chiral dopants, preferably in a concentration from 0.01 to 1% by weight, very preferably from 0.05 to 0.5% by weight. The chiral dopants are preferably selected from the group consisting of compounds from Table E below, very preferably from the group consisting of R- or S-1011, R- or S-2011, R- or S-3011, R- or S-4011, and R- or S-5011.

In another embodiment the liquid-crystalline media contain a racemate of one or more chiral dopants, which are preferably selected from the chiral dopants mentioned in the previous paragraph.

In another embodiment the LC medium according to the present invention contains a self-aligning (SA) additive, preferably in a concentration of 0.1 to 2.5% by weight. An LC medium according to this embodiment is especially suitable for use in polymer stabilised SA-FFS or SA-HB-FFS displays.

In a preferred embodiment the SA-FFS or SA-HB-FFS display according to the present invention does not contain a polyimide alignment layer. In another preferred embodiment the SA-FFS or SA-HB-FFS display contains a polyimide alignment layer.

Preferred SA additives for use in this embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerisable groups which are attached, optionally via spacer groups, to the mesogenic group. These polymerisable SA additives can be polymerised in the LC medium under similar conditions as applied for the RMs in the PSA process.

Suitable SA additives to induce homeotropic alignment, especially for use in SA-VA mode displays, are described for example in US 2013/0182202 A1, US 2014/0138581 A1, US 2015/0166890 A1 and US 2015/0252265 A1.

In another preferred embodiment an LC medium or a polymer stabilised SA-FFS or SA-HB-FFS display according to the present invention contains one or more self-aligning additives selected from Table H below.

Furthermore, it is possible to add to the liquid-crystalline media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The displays according to the present invention are preferably addressed by an active matrix, preferably by a matrix of TFT. However, the liquid crystals according to the invention can also advantageously be used in displays having other known addressing means.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

Above and below, unless explicitly stated otherwise, all concentrations are given in weight percent, i.e. percent data denote percent by weight. All temperatures are indicated in degrees Celsius.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $ClH_{2l-1}$ denote straight-chain alkyl or alkenyl, preferably 1E-alkenyl, having n, m and l C atoms respectively, where n, m and l, independently of one another, denote an integer from 1 to 9, preferably 1 to 7, or from 2 to 9, preferably 2 to 7, respectively. $C_nH_{2o}+_1$ denotes straight-chain alkyl having 1 to 7, preferably 1 to 4, C atoms, or branched alkyl having 1 to 7, preferably 1 to 4, C atoms.

Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

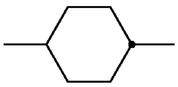

C

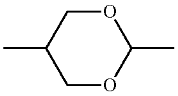

D

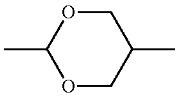

DI

TABLE A-continued

Ring elements

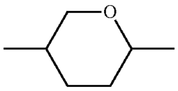

A

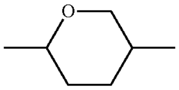

AI

P

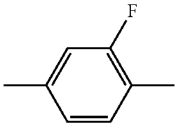

G

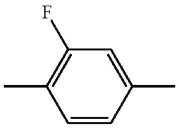

GI

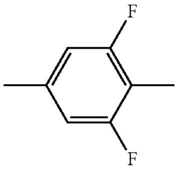

U

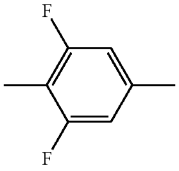

UI

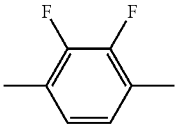

Y

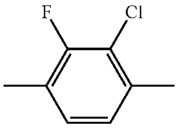

P(F, Cl)Y

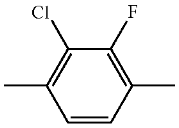

P(Cl,F)Y

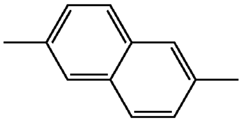

np

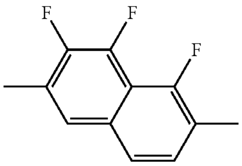

n3f

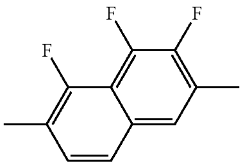

nN3fI

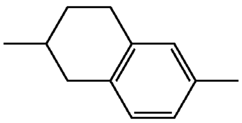

th

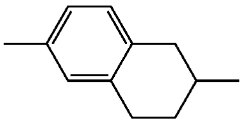

thI

TABLE A-continued

| Ring elements | |
|---|---|
| 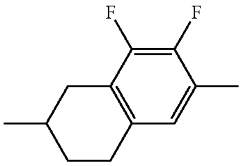 | 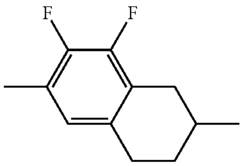 |
| tH2f | tH2fI |
| 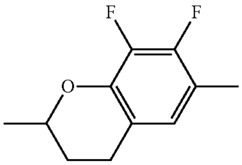 | 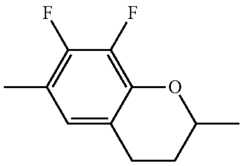 |
| o2f | o2fI |
| 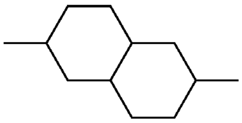 | |
| dh | |
| 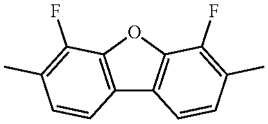 | 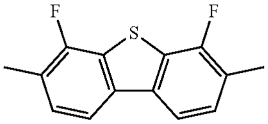 |
| B | B(S) |
| 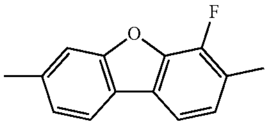 | 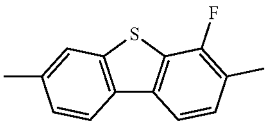 |
| Bh | Bh(S) |
| 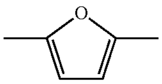 | 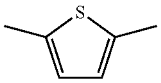 |
| O | S |
| 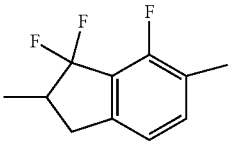 | 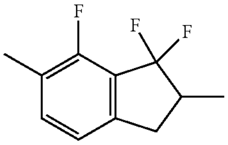 |
| K | KI |
| 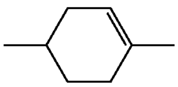 | 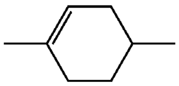 |
| L | LI |

TABLE A-continued

| Ring elements | |
|---|---|
| 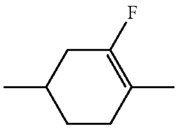 | 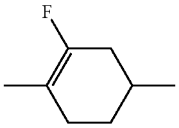 |
| F | FI |

TABLE B

| Linking groups | | | |
|---|---|---|---|
| E | $-CH_2CH_2-$ | Z | $-CO-O-$ |
| V | $-CH{=}CH-$ | ZI | $-O-CO-$ |
| X | $-CF{=}CH-$ | O | $-CH_2-O-$ |
| XI | $-CH{=}CF-$ | OI | $-O-CH_2-$ |
| B | $-CF{=}CF-$ | Q | $-CF_2-O-$ |
| T | $-C{\equiv}C-$ | QI | $-O-CF_2-$ |
| W | $-CF_2CF_2-$ | | |

TABLE C

| End groups | | | |
|---|---|---|---|
| Left-hand side | | Right-hand side | |
| Used alone | | | |
| -n- | $C_nH_{2n+1}-$ | —n | $-C_nH_{2n+1}$ |
| —nO— | $C_nH_{2n+1}-O-$ | —On | $-O-C_nH_{2n+1}$ |
| —V— | $CH_2{=}CH-$ | —V | $-CH{=}CH_2$ |
| —nV— | $C_nH_{2n+1}-CH{=}CH-$ | —nV | $-C_nH_{2n}-CH{=}CH_2$ |
| —Vn— | $CH_2{=}CH-C_nH_{2n+1}-$ | —Vn | $-CH{=}CH-C_nH_{2n+1}$ |
| —nVm— | $C_nH_{2n+1}-CH{=}CH-C_mH_{2m}-$ | —nVm | $-C_nH_{2n}-CH{=}CH-C_mH_{2m+1}$ |
| —N— | $N{\equiv}C-$ | —N | $-C{\equiv}N$ |
| —S— | $S{=}C{=}N-$ | —S | $-N{=}C{=}S$ |
| —F— | F— | —F | —F |
| —Cl— | Cl— | —Cl | —Cl |
| —M— | $CFH_2-$ | —M | $-CFH_2$ |
| —D— | $CF_2H-$ | —D | $-CF_2H$ |
| —T— | $CF_3-$ | —T | $-CF_3$ |
| —MO— | $CFH_2O-$ | —OM | $-OCFH_2$ |
| —DO— | $CF_2HO-$ | —OD | $-OCF_2H$ |
| —TO— | $CF_3O-$ | —OT | $-OCF_3$ |
| —OXF— | $CF_2{=}CH-O-$ | —OXF | $-O-CH{=}CF_2$ |
| —A— | $H-C{\equiv}C-$ | —A | $-C{\equiv}C-H$ |
| —nA— | $C_nH_{2n+1}-C{\equiv}C-$ | —An | $-C{\equiv}C-C_nH_{2n+1}$ |
| —NA— | $N{\equiv}C-C{\equiv}C-$ | —AN | $-C{\equiv}C-C{\equiv}N$ |
| Used together with others | | | |
| —. . . A . . .— | $-C{\equiv}C-$ | —. . . A . . . | $-C{\equiv}C-$ |
| —. . . V . . .— | $CH{=}CH-$ | —. . . V . . . | $-CH{=}CH-$ |
| —. . . Z . . .— | $-CO-O-$ | —. . . Z . . . | $-CO-O-$ |
| —. . . ZI . . .— | $-O-CO-$ | —. . . ZI . . . | $-O-CO-$ |
| —. . . K . . .— | $-CO-$ | —. . . K . . . | $-CO-$ |
| —. . . W . . .— | $-CF{=}CF-$ | —. . . W . . . | $-CF{=}CF-$ |

in which n and m each denote integers, and the three dots " . . . " are placeholders for other abbreviations from this table.

The following table shows illustrative structures together with their respective abbreviations. These are shown in order to illustrate the meaning of the rules for the abbreviations. They furthermore represent compounds which are preferably used.
TABLE D
| Illustrative structures |
|---|
| 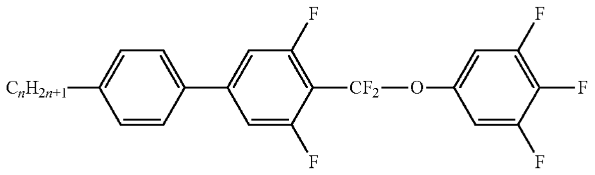<br>PUQU-n-F |
| 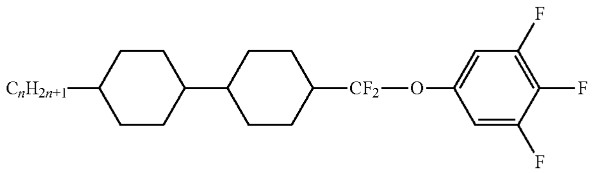<br>CCQU-n-F |
| 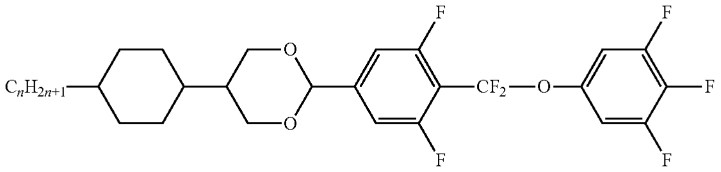<br>CDUQU-n-F |
| 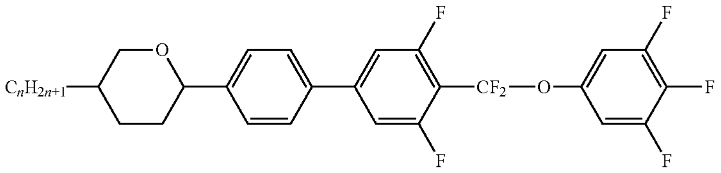<br>APUQU-n-F |
| 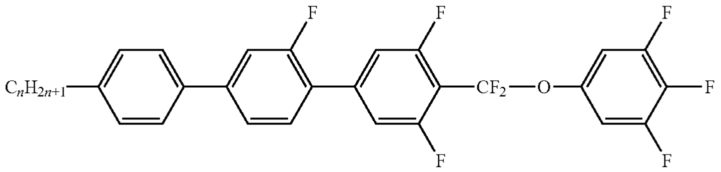<br>PGUQU-n-F |
| 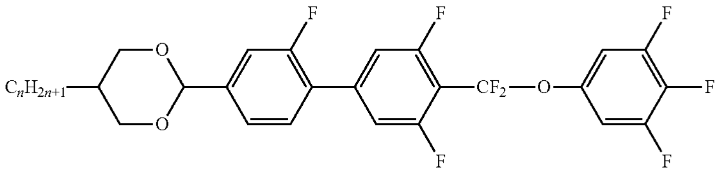<br>DGUQU-n-F |

TABLE D-continued
| Illustrative structures |
|---|
| 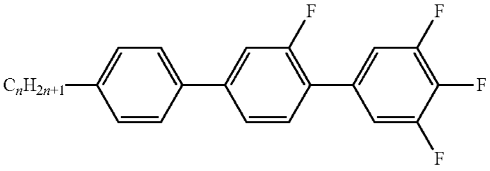 |
| PGU-n-F |
| 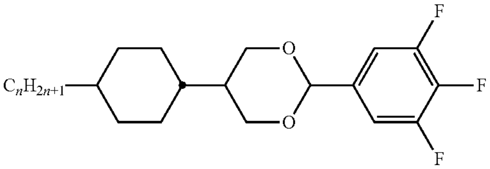 |
| CDU-n-F |
| 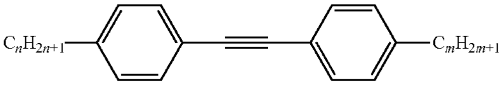 |
| PTP-n-m |
| 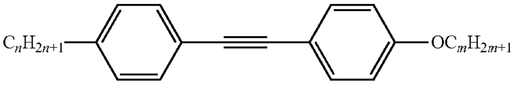 |
| PTP-n-Om |
| 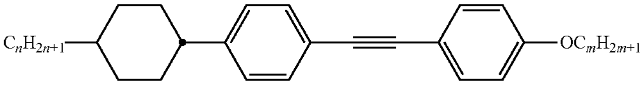 |
| CPTP-n-Om |
| 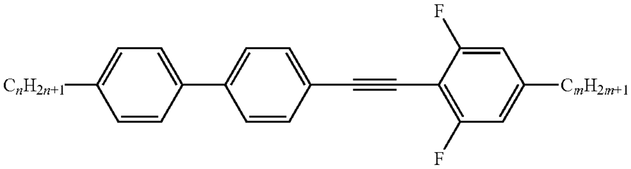 |
| PPTUI-n-m |
| 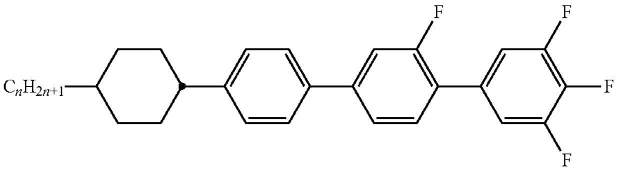 |
| CPGU-n-F |
| 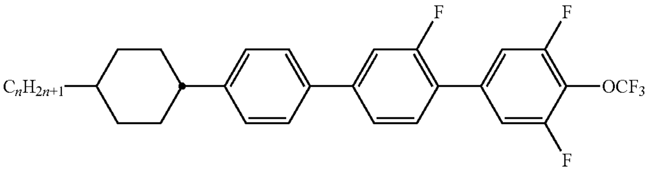 |
| CPGU-n-OT |

TABLE D-continued
Illustrative structures
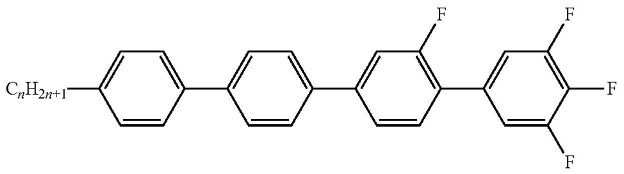
PPGU-n-F
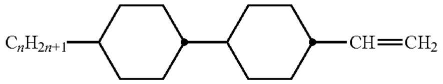
CC-n-V
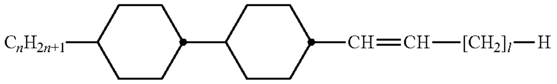
CC-n-Vl
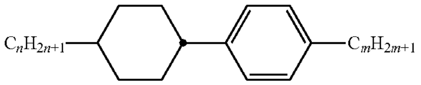
CP-n-m
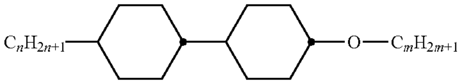
CC-n-Om
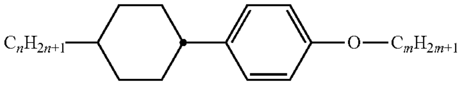
CP-n-Om
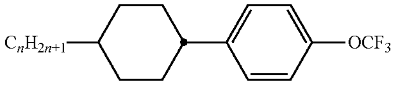
CP-n-OT
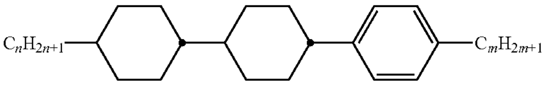
CCP-n-m
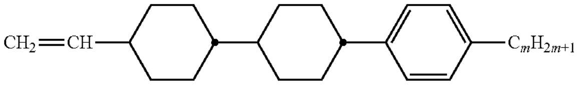
CCP-V-m
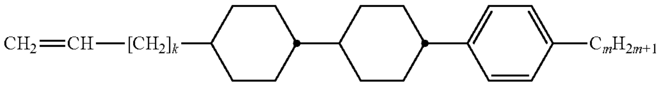
CCP-Vk-m TABLE D-continued
Illustrative structures
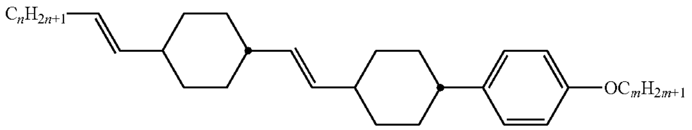
CVCP-nV-Om
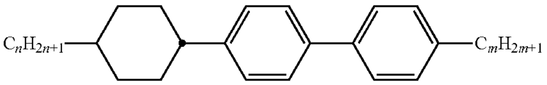
CPP-n-m
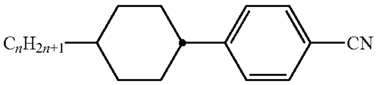
CP-n-N
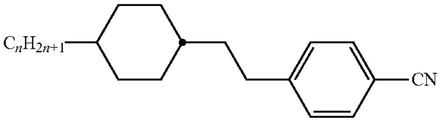
CEP-n-N
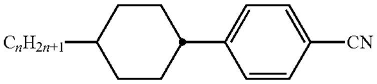
CP-n-N
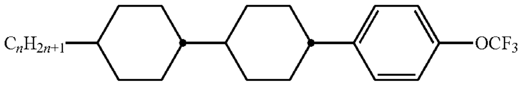
CCP-n-OT
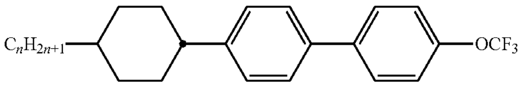
CPP-n-OT
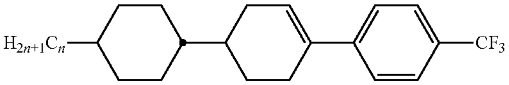
CLP-n-T
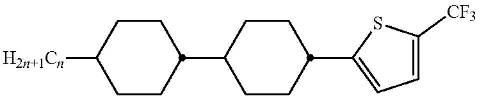
CCS-n-T
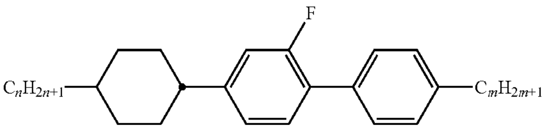
CGP-n-m TABLE D-continued
Illustrative structures
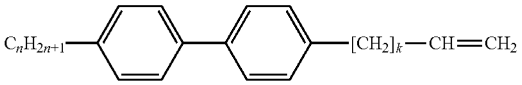
PP-n-kV
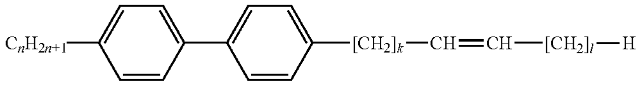
PP-n-kVl
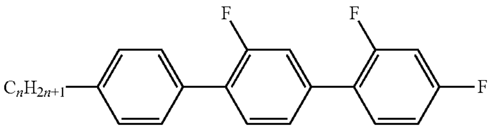
PGIGI-n-F
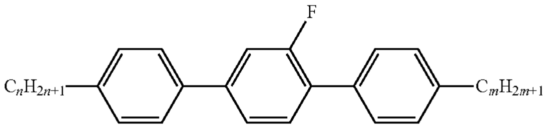
PGP-n-m
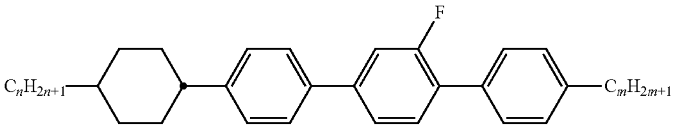
CPGP-n-m
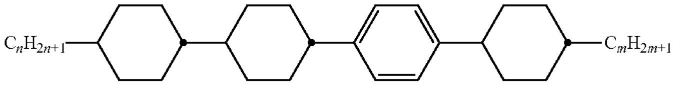
CCPC-n-m
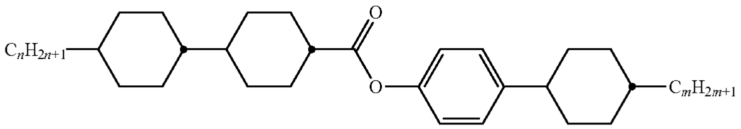
CCZPC-n-m
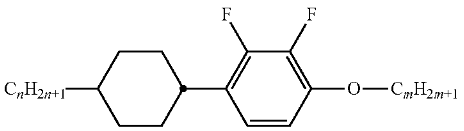
CY-n-Om
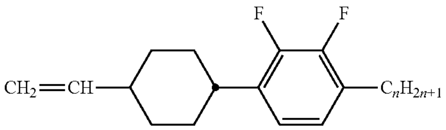
CY-V-n TABLE D-continued
Illustrative structures
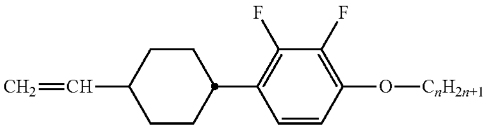
CY-V-On
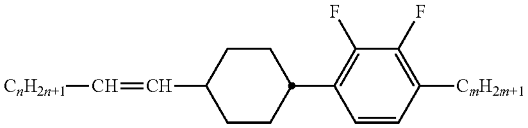
CY-nV-m
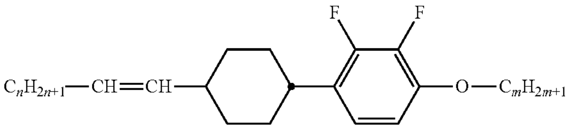
CY-nV-Om
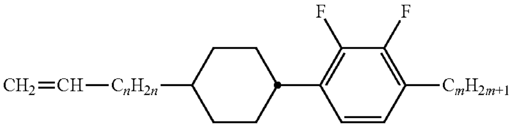
CY-Vn-m
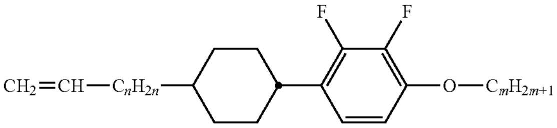
CY-Vn-Om
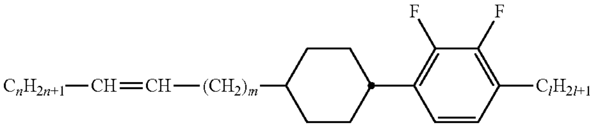
CY-nVm-l
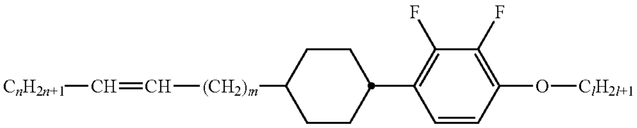
CY-nVm-Ol
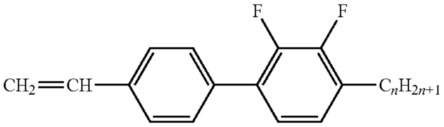
PY-V-n
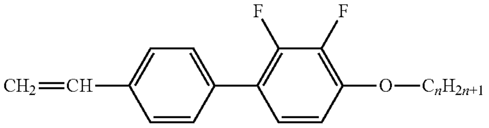
PY-V-On TABLE D-continued
Illustrative structures
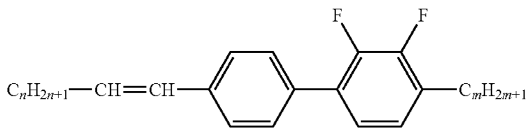
PY-nV-m
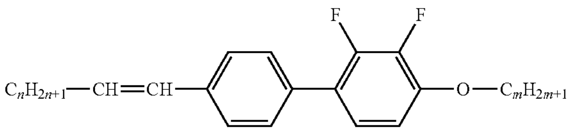
PY-nV-Om
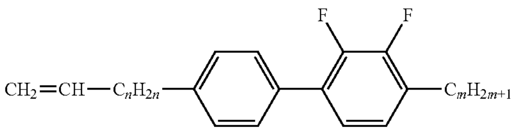
PY-Vn-m
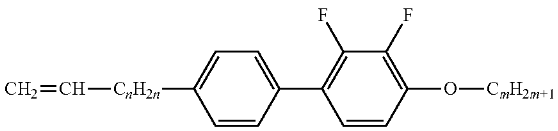
PY-Vn-Om
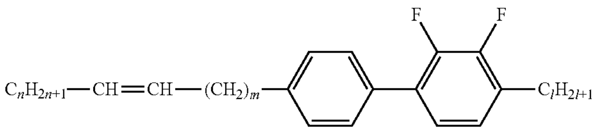
PY-nVm-l
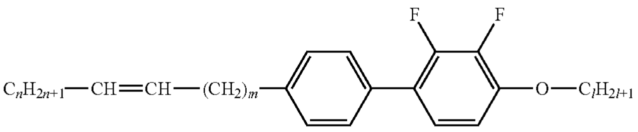
PY-nVm-Ol
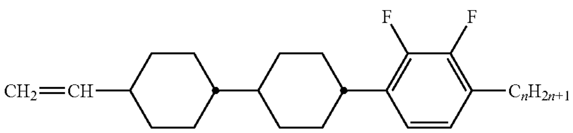
CCY-V-n
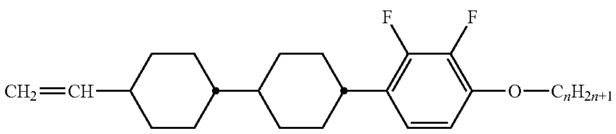
CCY-V-On
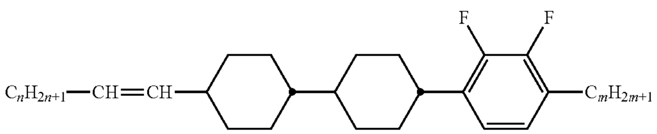
CCY-nV-m TABLE D-continued
| Illustrative structures |
| --- |
| 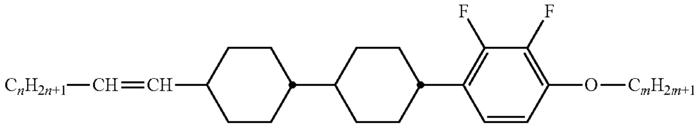 |
| CCY-nV-Om |
| 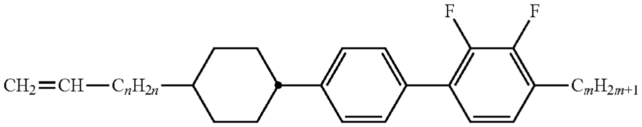 |
| CCY-Vn-m |
| 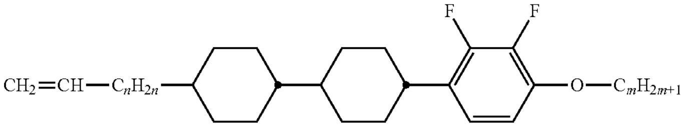 |
| CCY-Vn-Om |
| 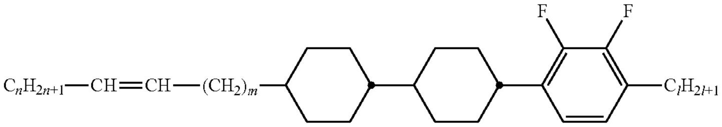 |
| CCY-nVm-l |
| 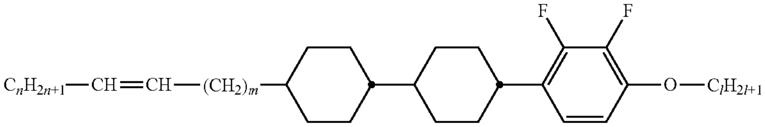 |
| CCY-nVm-Ol |
| 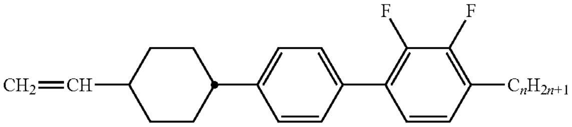 |
| CPY-V-n |
| 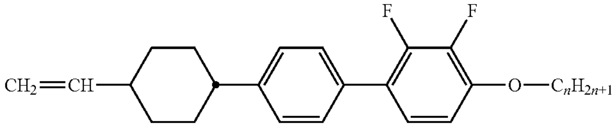 |
| CPY-V-On |
| 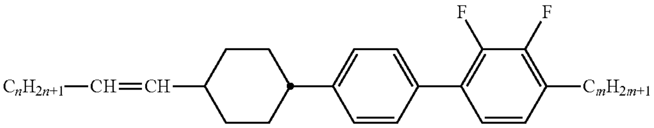 |
| CPY-nV-m |

TABLE D-continued
Illustrative structures
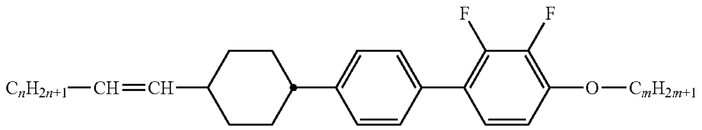
CPY-nV-Om
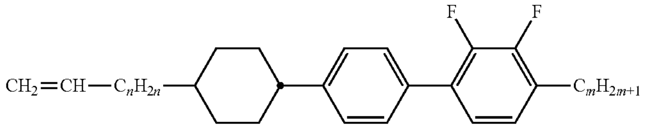
CPY-Vn-m
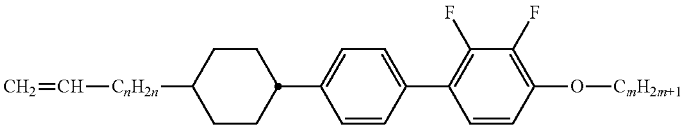
CPY-Vn-Om
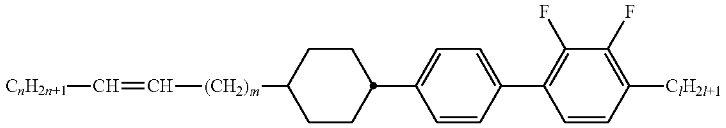
CPY-nVm-l
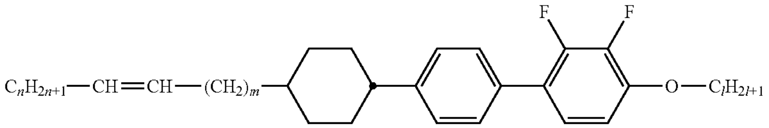
CPY-nVm-Ol
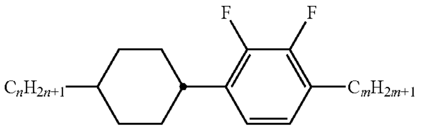
CY-n-m
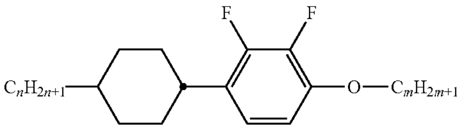
CY-n-Om
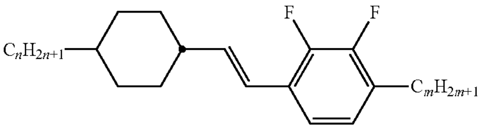
CVY-n-m
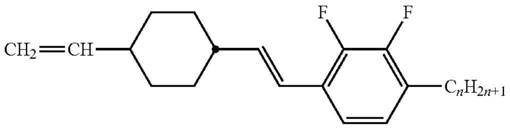
CVY-V-n TABLE D-continued
| Illustrative structures |
| --- |
| 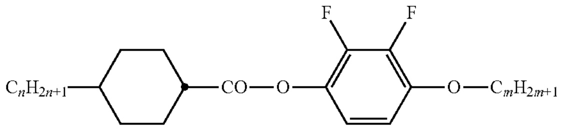 |
| CZY-n-Om |
| 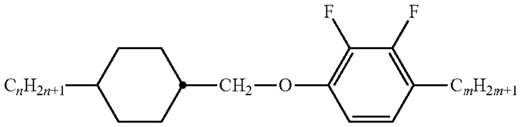 |
| COY-n-m |
| 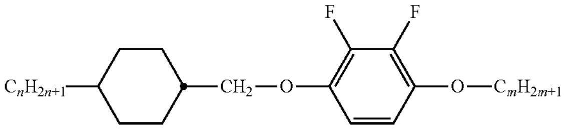 |
| COY-n-Om |
| 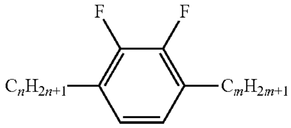 |
| Y-n-m |
| 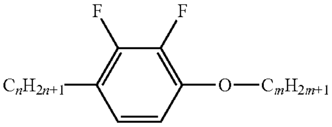 |
| Y-n-Om |
| 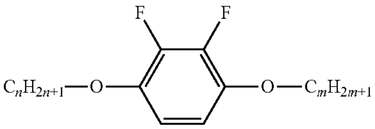 |
| Y-nO-Om |
| 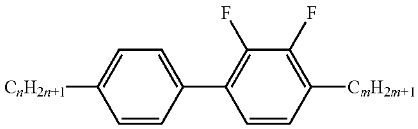 |
| PY-n-m |
| 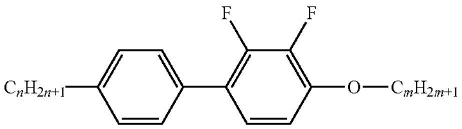 |
| PY-n-Om |
| 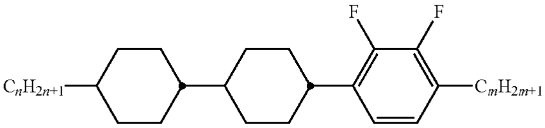 |
| CCY-n-m |

TABLE D-continued
Illustrative structures
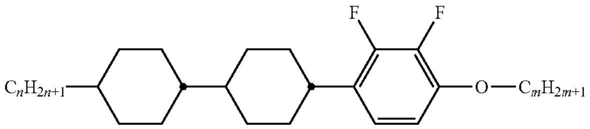
CCY-n-Om
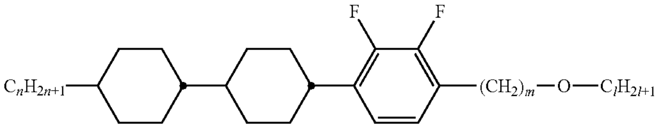
CCY-n-mOl
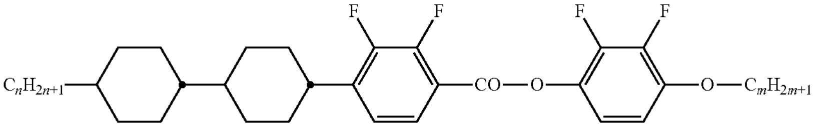
CCZY-n-Om
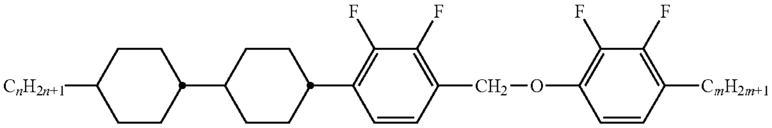
CCOY-n-m
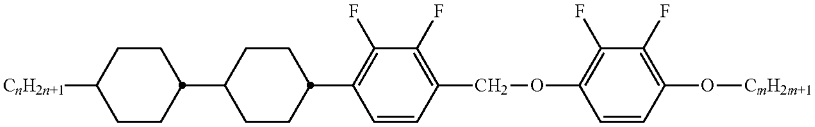
CCOY-n-Om
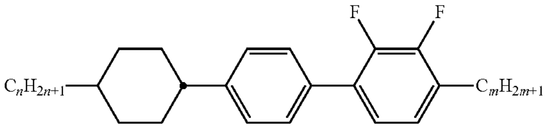
CPY-n-m
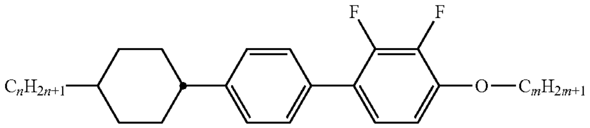
CPY-n-Om
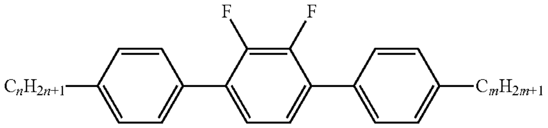
PYP-n-m
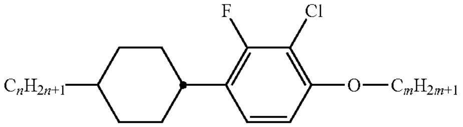
CP(F,Cl)-n-Om TABLE D-continued
| Illustrative structures |
|---|
| 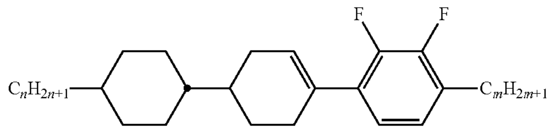 |
| CLY-n-m |
| 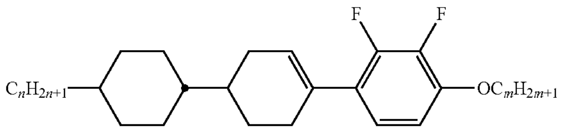 |
| CLY-n-Om |
| 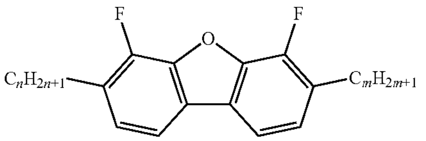 |
| B-n-m |
| 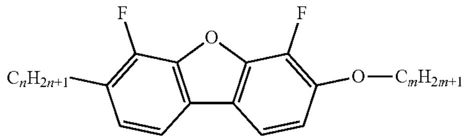 |
| B-n-Om |
| 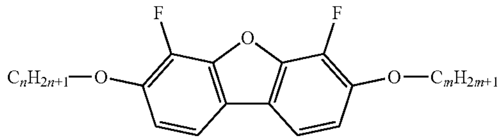 |
| B-nO-Om |
| 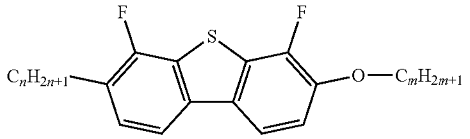 |
| B(S)-n-m |
| 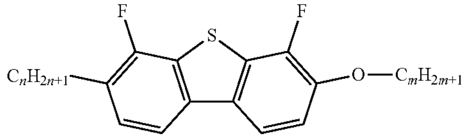 |
| B(S)-n-Om |
| 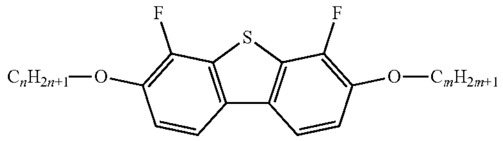 |
| B(S)-nO-Om |
The illustrative structures show compounds which are particularly preferably employed.

in which k, l, m and n are, independently of one another, each an integer, preferably from 1 to 9, more preferably from 1 to 7.
TABLE E
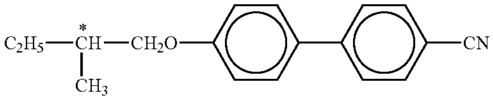
C 15
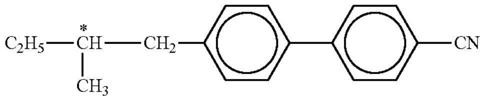
CB 15
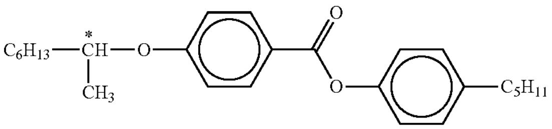
CM 21
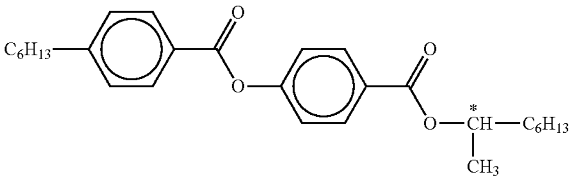
R/S-811
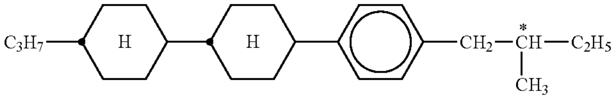
CM 44
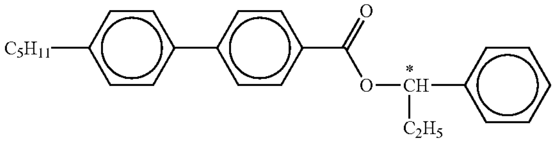
CM 45
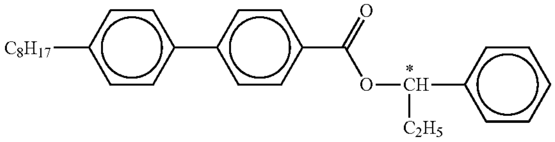
CM 47
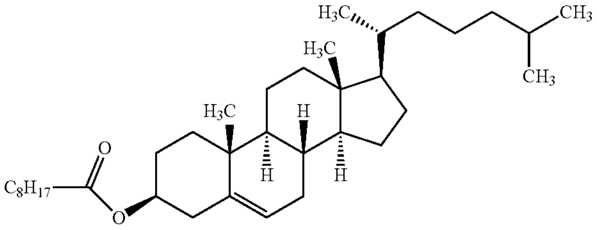
CN TABLE E-continued
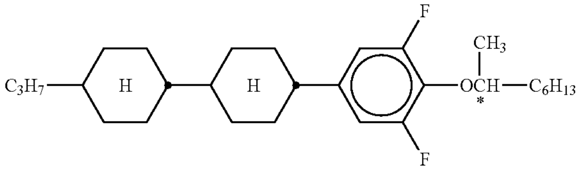
R/S-2011
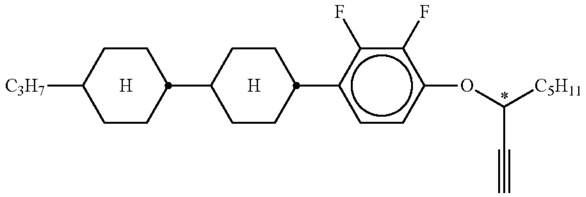
R/S-3011
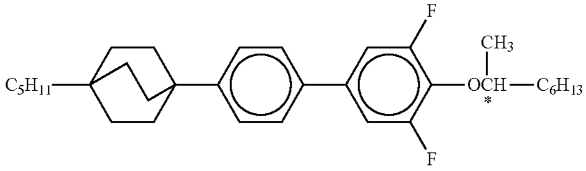
R/S-4011
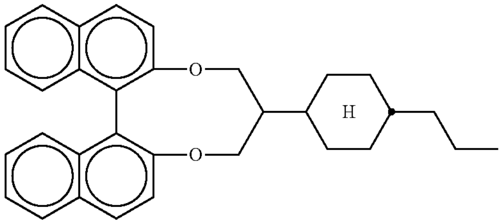
R/S-5011
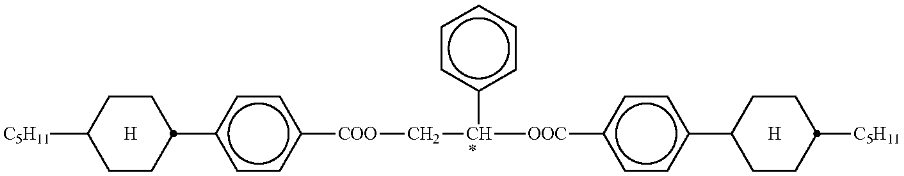
R/S-1011
Table E indicates possible chiral dopants which are optionally added to the liquid-crystal media according to the invention. The liquid-crystal media preferably comprise 0-10% by weight, in particular 0.01-5% by weight and particularly preferably 0.01-3% by weight of chiral dopants.
TABLE F
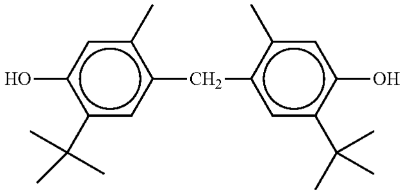

TABLE F-continued
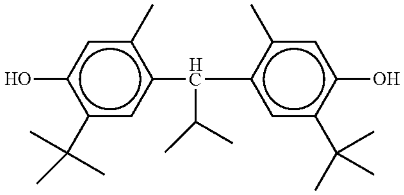
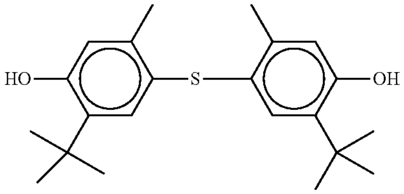
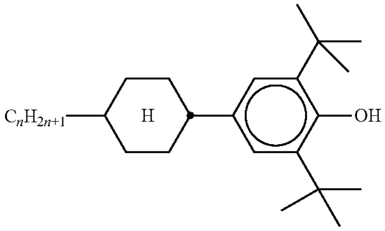
n = 1, 2, 3, 4, 5, 6 or 7
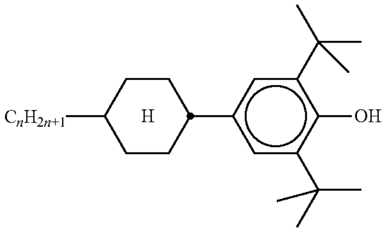
n = 1, 2, 3, 4, 5, 6 or 7
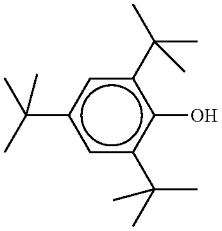
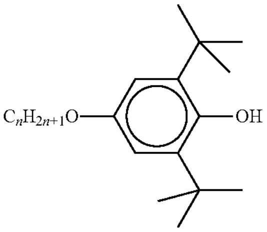
n = 1, 2, 3, 4, 5, 6 or 7

TABLE F-continued
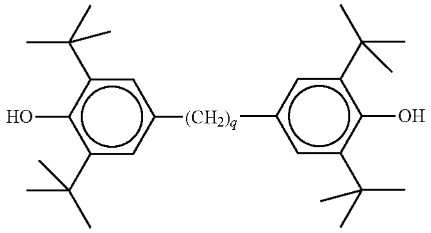
q = 1, 2, 3, 4, 5, 6, 7 or 8
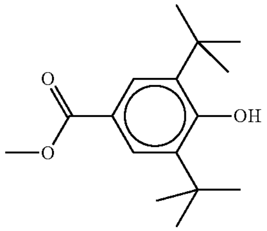
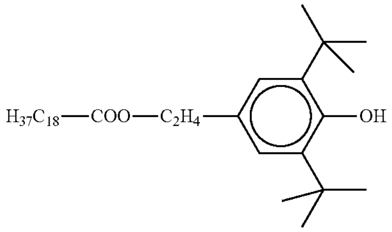
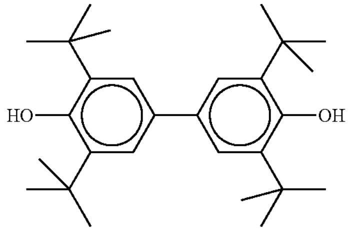
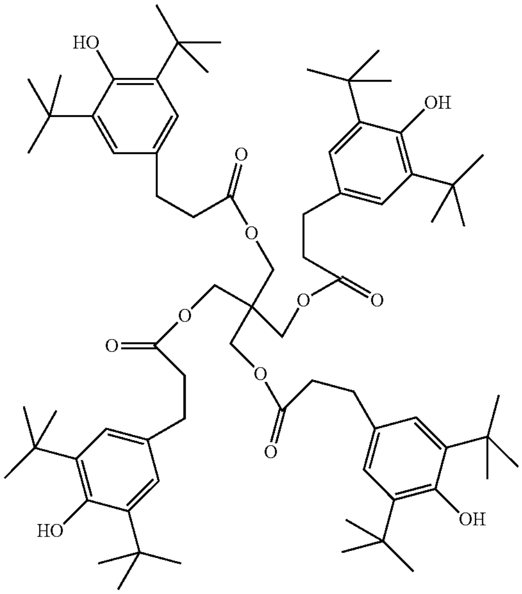 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE F-continued
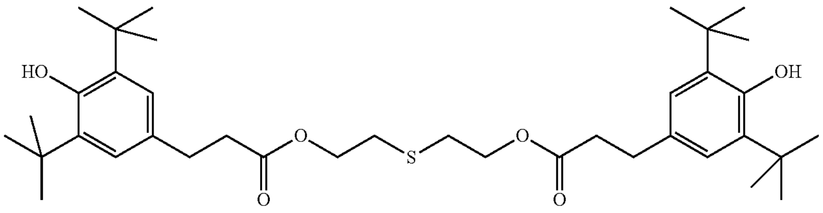 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
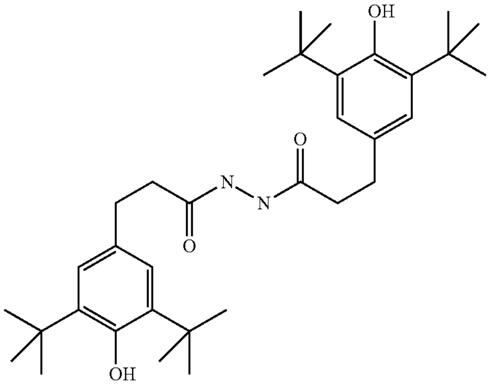 [SMILES: CC(C)(C)c1cc(CCC(=O)NNC(=O)CCc2cc(C(C)(C)C)c(O)c(C(C)(C)C)c2)cc(C(C)(C)C)c1O]
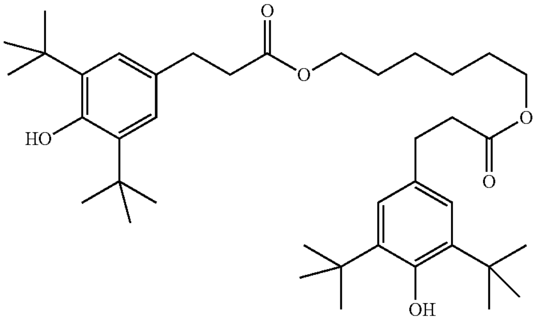 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
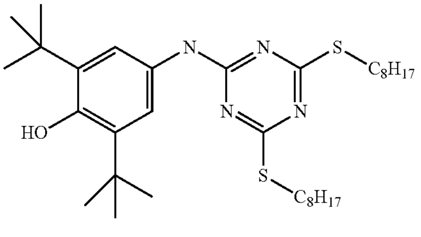

TABLE F-continued
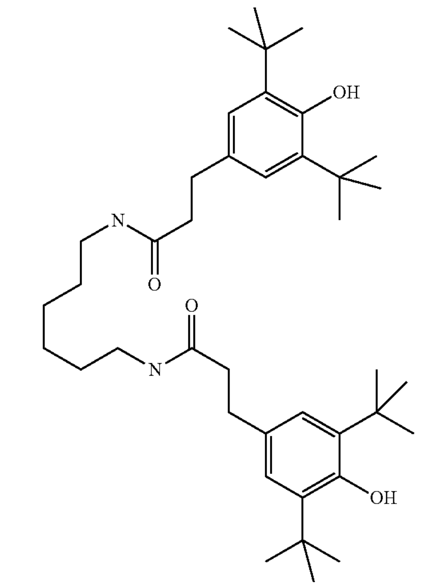 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
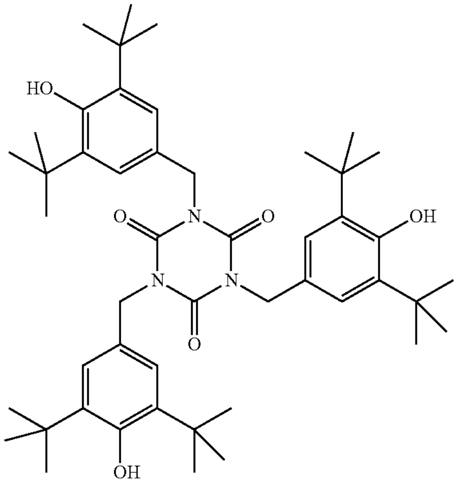 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
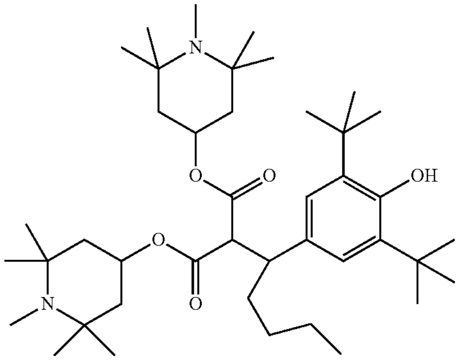 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE F-continued
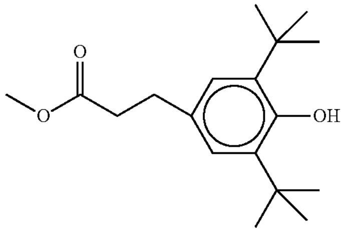
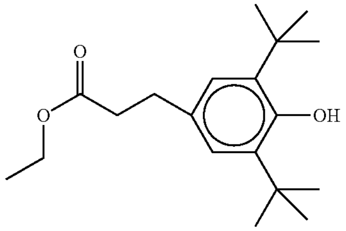
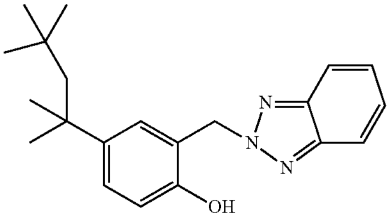 [SMILES: CC(C)(C)CC(C)(C)c1ccc(O)c(Cn2nc3ccccc3n2)c1]
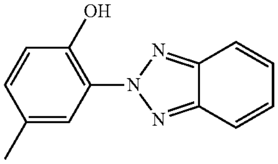 [SMILES: Cc1ccc(O)c(-n2nc3ccccc3n2)c1]
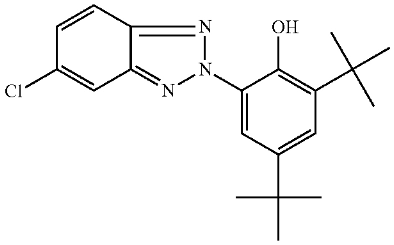 [SMILES: CC(C)(C)c1cc(-n2nc3ccc(Cl)cc3n2)c(O)c(C(C)(C)C)c1]
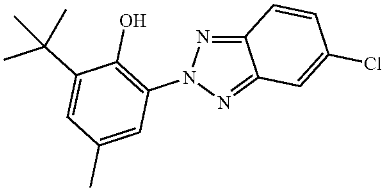 [SMILES: Cc1cc(-n2nc3ccc(Cl)cc3n2)c(O)c(C(C)(C)C)c1]

TABLE F-continued
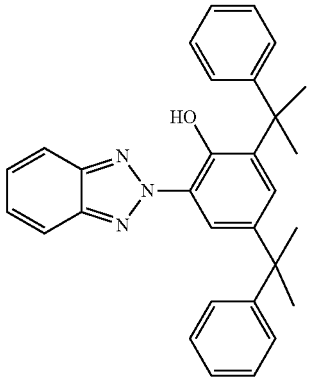 [SMILES: CC(C)(c1ccccc1)c1cc(-n2nc3ccccc3n2)c(O)c(C(C)(C)c2ccccc2)c1]
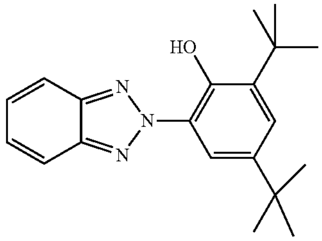 [SMILES: CC(C)(C)c1cc(-n2nc3ccccc3n2)c(O)c(C(C)(C)C)c1]
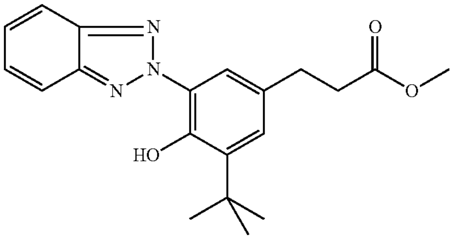 [SMILES: COC(=O)CCc1cc(-n2nc3ccccc3n2)c(O)c(C(C)(C)C)c1]
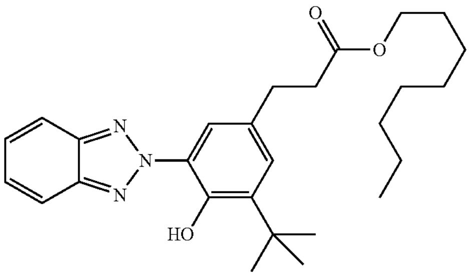 [SMILES: CCCCCCCCOC(=O)CCc1cc(-n2nc3ccccc3n2)c(O)c(C(C)(C)C)c1]

TABLE F-continued
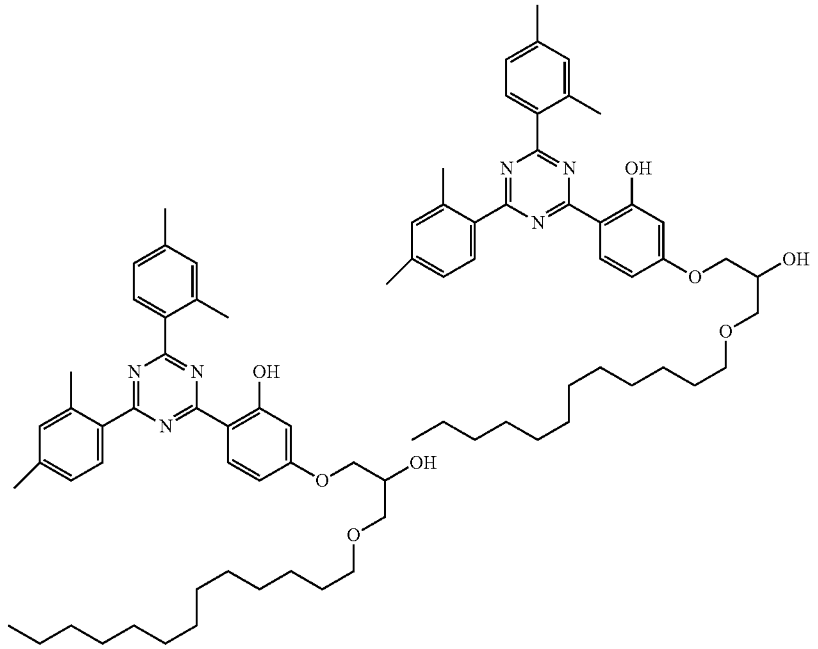
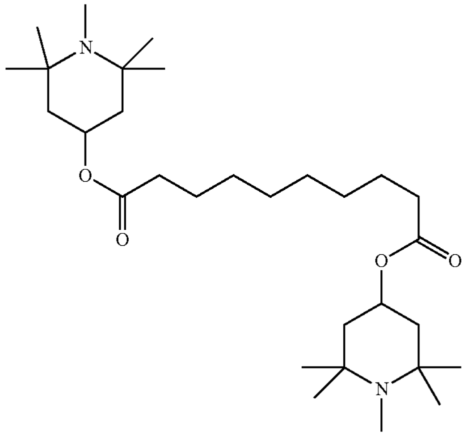
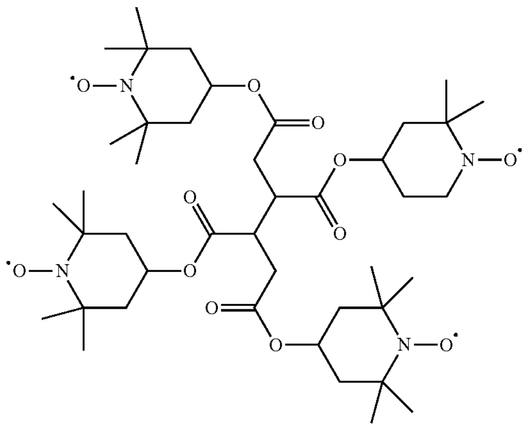

TABLE F-continued
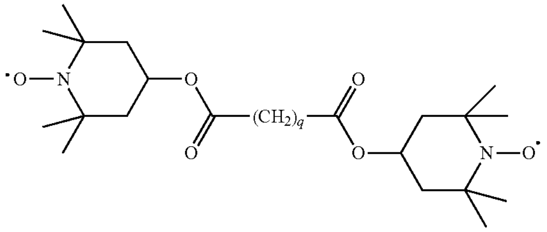
q = 1, 2, 3, 4, 5, 6, 7, 8, 9 or 10
Stabilizers which may preferably be added to the liquid-crystal media according to the invention in amounts of 0.005-3% by weight are shown below.
TABLE G
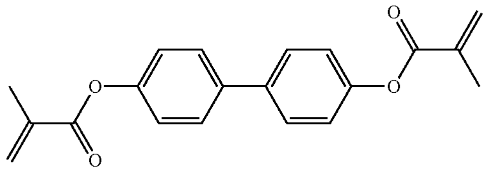 [SMILES: C=C(C)C(=O)Oc1ccc(-c2ccc(OC(=O)C(=C)C)cc2)cc1]
RM-1
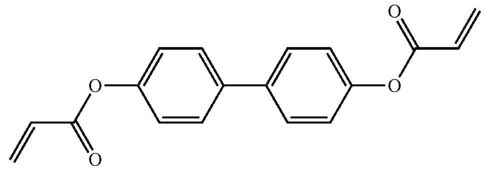 [SMILES: C=CC(=O)Oc1ccc(-c2ccc(OC(=O)C=C)cc2)cc1]
RM-2
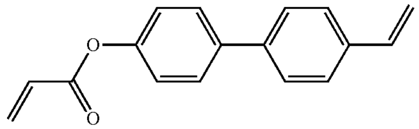 [SMILES: C=CC(=O)Oc1ccc(-c2ccc(C=C)cc2)cc1]
RM-3
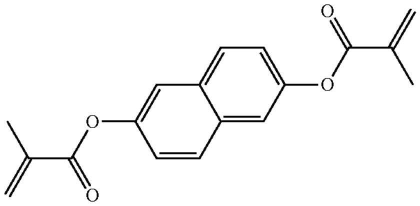 [SMILES: C=C(C)C(=O)Oc1ccc2cc(OC(=O)C(=C)C)ccc2c1]
RM-4
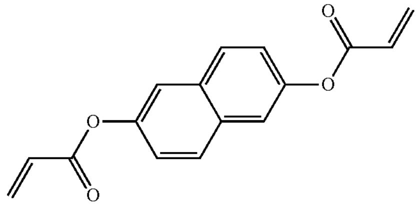 [SMILES: C=CC(=O)Oc1ccc2cc(OC(=O)C=C)ccc2c1]
RM-5
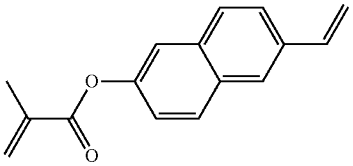 [SMILES: C=Cc1ccc2cc(OC(=O)C(=C)C)ccc2c1]
RM-6

TABLE G-continued
RM-7
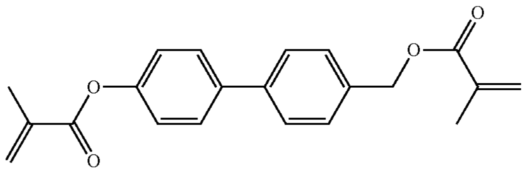 [SMILES: C=C(C)C(=O)OCc1ccc(-c2ccc(OC(=O)C(=C)C)cc2)cc1]
RM-8
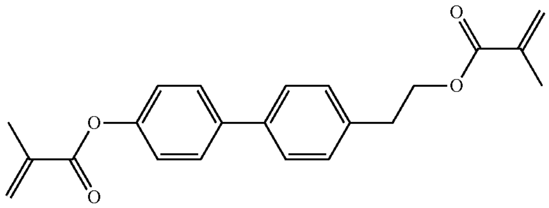 [SMILES: C=C(C)C(=O)OCCc1ccc(-c2ccc(OC(=O)C(=C)C)cc2)cc1]
RM-9
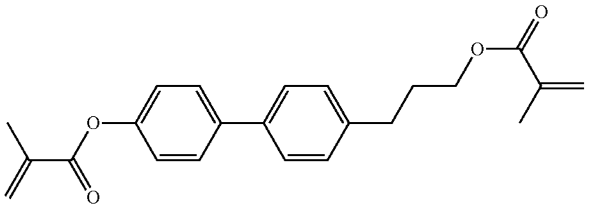 [SMILES: C=C(C)C(=O)OCCCc1ccc(-c2ccc(OC(=O)C(=C)C)cc2)cc1]
RM-10
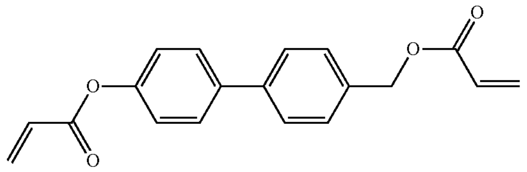 [SMILES: C=CC(=O)OCc1ccc(-c2ccc(OC(=O)C=C)cc2)cc1]
RM-11
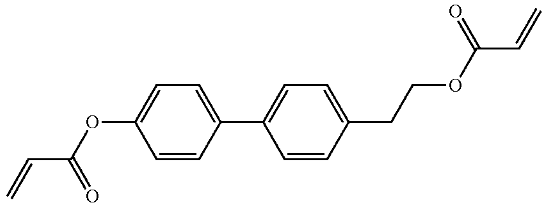 [SMILES: C=CC(=O)OCCc1ccc(-c2ccc(OC(=O)C=C)cc2)cc1]
RM-12
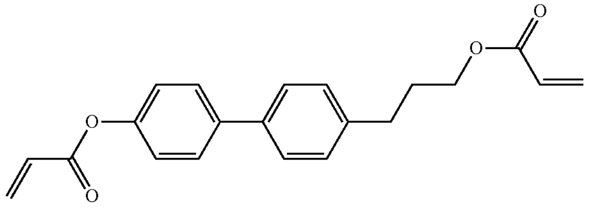 [SMILES: C=CC(=O)OCCCc1ccc(-c2ccc(OC(=O)C=C)cc2)cc1]
RM-13
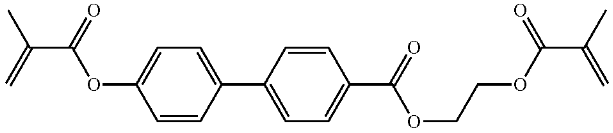 [SMILES: C=C(C)C(=O)OCCOC(=O)c1ccc(-c2ccc(OC(=O)C(=C)C)cc2)cc1]
RM-14
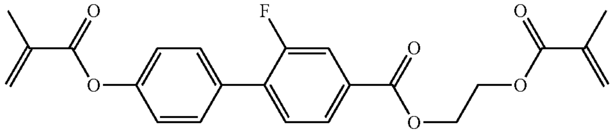 [SMILES: C=C(C)C(=O)OCCOC(=O)c1ccc(-c2ccc(OC(=O)C(=C)C)cc2)c(F)c1]

TABLE G-continued
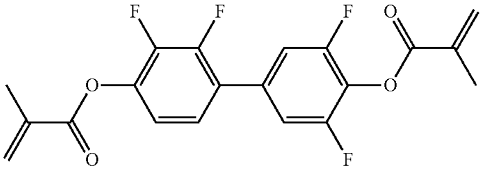 [SMILES: C=C(C)C(=O)Oc1ccc(-c2cc(F)c(OC(=O)C(=C)C)c(F)c2)c(F)c1F]
RM-15
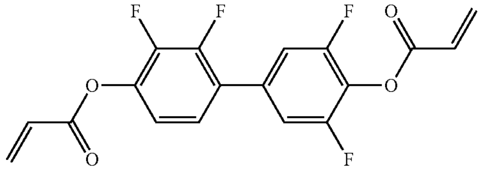 [SMILES: C=CC(=O)Oc1ccc(-c2cc(F)c(OC(=O)C=C)c(F)c2)c(F)c1F]
RM-16
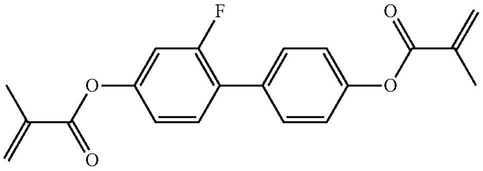
RM-17
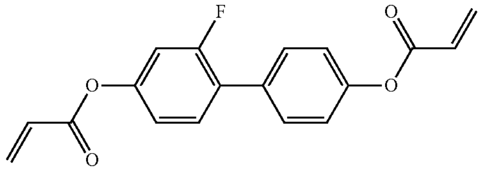 [SMILES: C=CC(=O)Oc1ccc(-c2ccc(OC(=O)C=C)cc2F)cc1]
RM-18
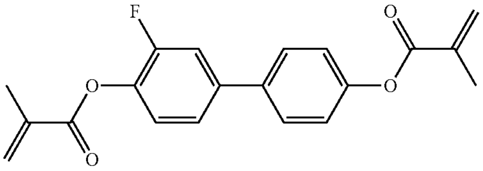 [SMILES: C=C(C)C(=O)Oc1ccc(-c2ccc(OC(=O)C(=C)C)c(F)c2)cc1]
RM-19
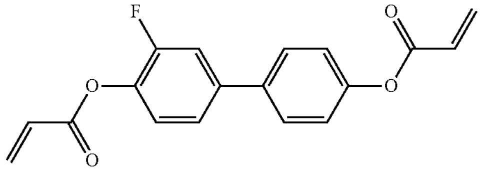
RM-20
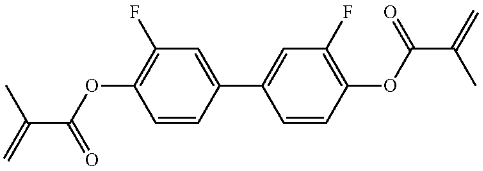 [SMILES: C=C(C)C(=O)Oc1ccc(-c2ccc(OC(=O)C(=C)C)c(F)c2)cc1F]
RM-21
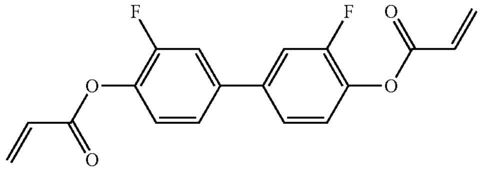 [SMILES: C=CC(=O)Oc1ccc(-c2ccc(OC(=O)C=C)c(F)c2)cc1F]
RM-22
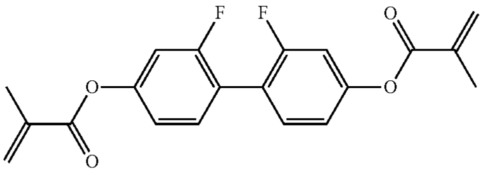 [SMILES: C=C(C)C(=O)Oc1ccc(-c2ccc(OC(=O)C(=C)C)cc2F)c(F)c1]
RM-23

TABLE G-continued
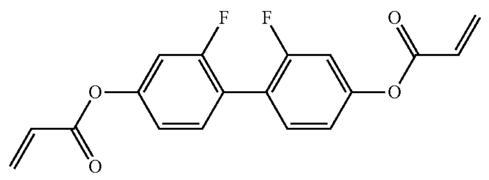
RM-24
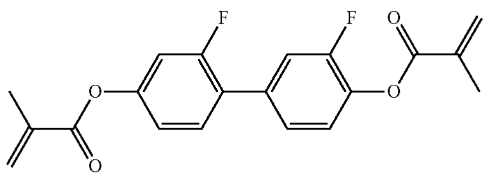 [SMILES: C=C(C)C(=O)Oc1ccc(-c2ccc(OC(=O)C(=C)C)c(F)c2)c(F)c1]
RM-25
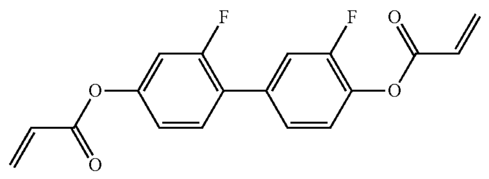 [SMILES: C=CC(=O)Oc1ccc(-c2ccc(OC(=O)C=C)c(F)c2)c(F)c1]
RM-26
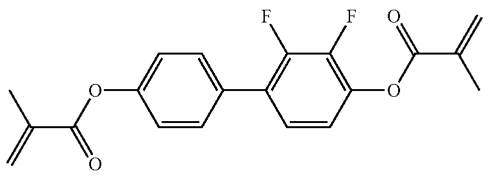 [SMILES: C=C(C)C(=O)Oc1ccc(-c2ccc(OC(=O)C(=C)C)c(F)c2F)cc1]
RM-27
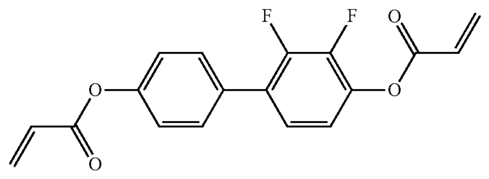 [SMILES: C=CC(=O)Oc1ccc(-c2ccc(OC(=O)C=C)c(F)c2F)cc1]
RM-28
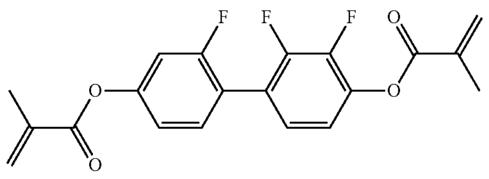 [SMILES: C=C(C)C(=O)Oc1ccc(-c2ccc(OC(=O)C(=C)C)c(F)c2F)c(F)c1]
RM-29
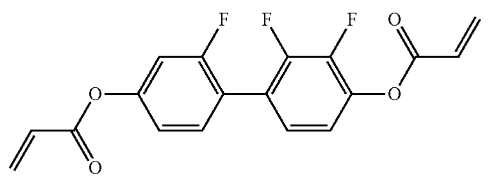
RM-30
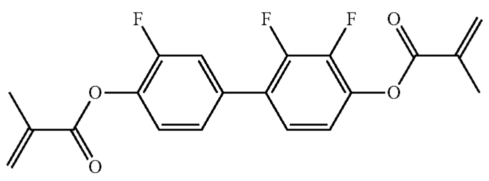 [SMILES: C=C(C)C(=O)Oc1ccc(-c2ccc(OC(=O)C(=C)C)c(F)c2F)cc1F]
RM-31

TABLE G-continued
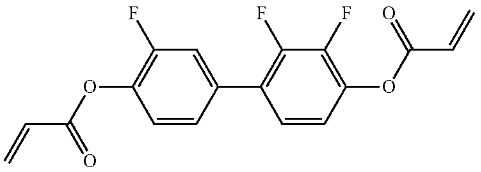 [SMILES: C=CC(=O)Oc1ccc(-c2ccc(OC(=O)C=C)c(F)c2F)cc1F]
RM-32
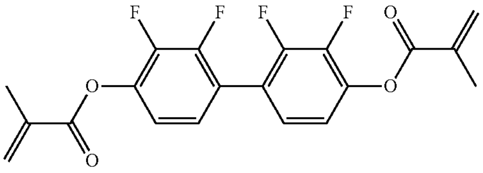 [SMILES: C=C(C)C(=O)Oc1ccc(-c2ccc(OC(=O)C(=C)C)c(F)c2F)c(F)c1F]
RM-33
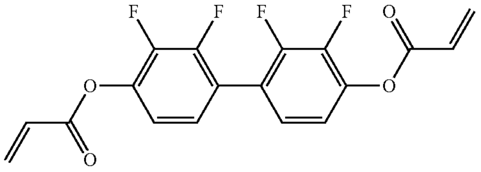 [SMILES: C=CC(=O)Oc1ccc(-c2ccc(OC(=O)C=C)c(F)c2F)c(F)c1F]
RM-34
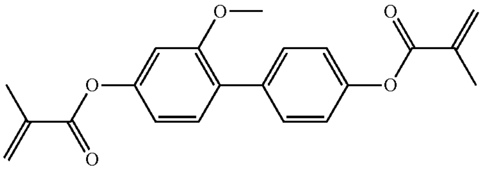
RM-35
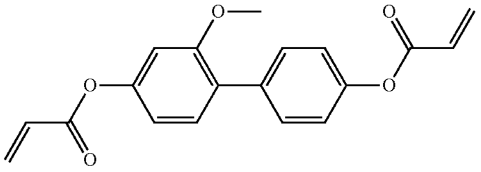 [SMILES: C=CC(=O)Oc1ccc(-c2ccc(OC(=O)C=C)cc2OC)cc1]
RM-36
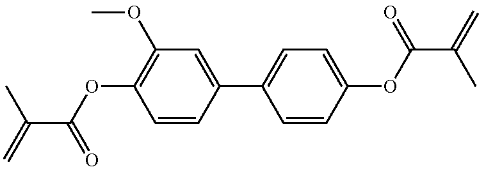 [SMILES: C=C(C)C(=O)Oc1ccc(-c2ccc(OC(=O)C(=C)C)c(OC)c2)cc1]
RM-37
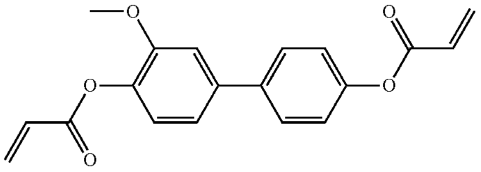 [SMILES: C=CC(=O)Oc1ccc(-c2ccc(OC(=O)C=C)c(OC)c2)cc1]
RM-38
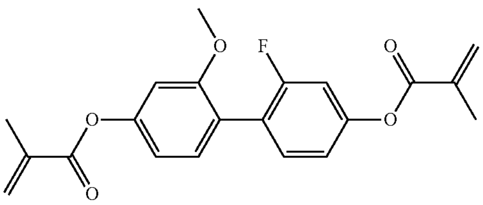 [SMILES: C=C(C)C(=O)Oc1ccc(-c2ccc(OC(=O)C(=C)C)cc2OC)c(F)c1]
RM-39

TABLE G-continued
RM-40
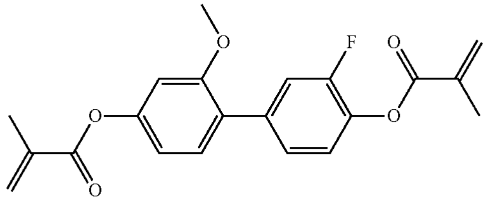 [SMILES: C=C(C)C(=O)Oc1ccc(-c2ccc(OC(=O)C(=C)C)c(F)c2)c(OC)c1]
RM-41
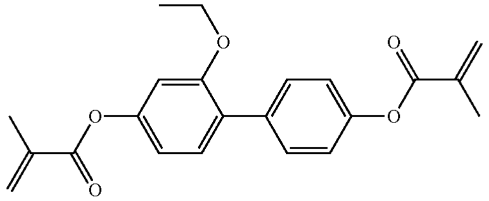 [SMILES: C=C(C)C(=O)Oc1ccc(-c2ccc(OC(=O)C(=C)C)cc2OCC)cc1]
RM-42
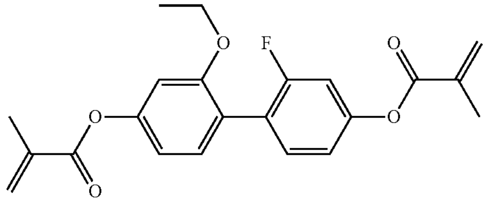 [SMILES: C=C(C)C(=O)Oc1ccc(-c2ccc(OC(=O)C(=C)C)cc2OCC)c(F)c1]
RM-43
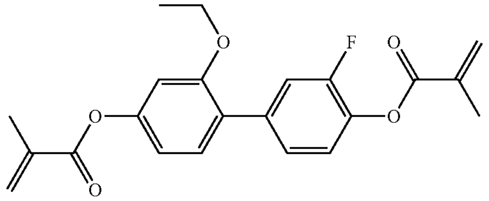 [SMILES: C=C(C)C(=O)Oc1ccc(-c2ccc(OC(=O)C(=C)C)c(F)c2)c(OCC)c1]
RM-44
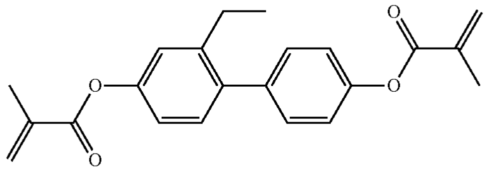 [SMILES: C=C(C)C(=O)Oc1ccc(-c2ccc(OC(=O)C(=C)C)cc2CC)cc1]
RM-45
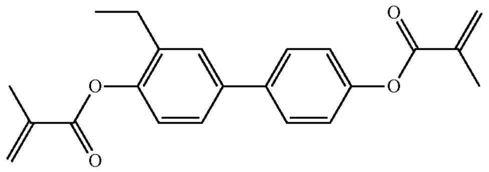 [SMILES: C=C(C)C(=O)Oc1ccc(-c2ccc(OC(=O)C(=C)C)c(CC)c2)cc1]
RM-46
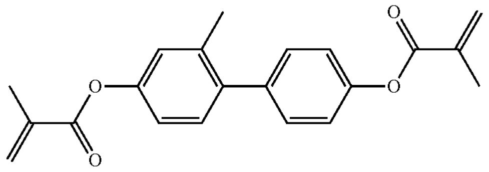
RM-47
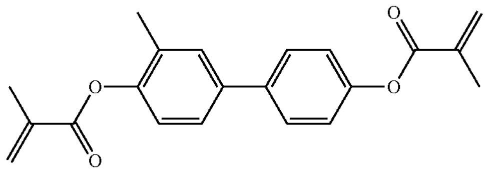 [SMILES: C=C(C)C(=O)Oc1ccc(-c2ccc(OC(=O)C(=C)C)c(C)c2)cc1]

TABLE G-continued
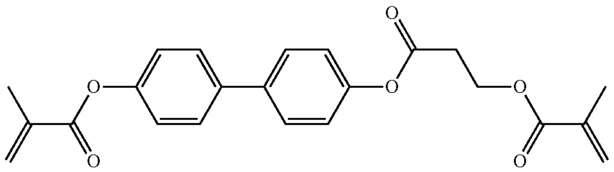 [SMILES: C=C(C)C(=O)OCCC(=O)Oc1ccc(-c2ccc(OC(=O)C(=C)C)cc2)cc1]
RM-48
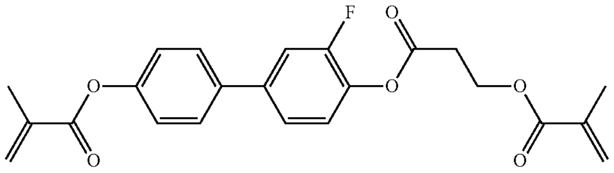 [SMILES: C=C(C)C(=O)OCCC(=O)Oc1ccc(-c2ccc(OC(=O)C(=C)C)cc2)cc1F]
RM-49
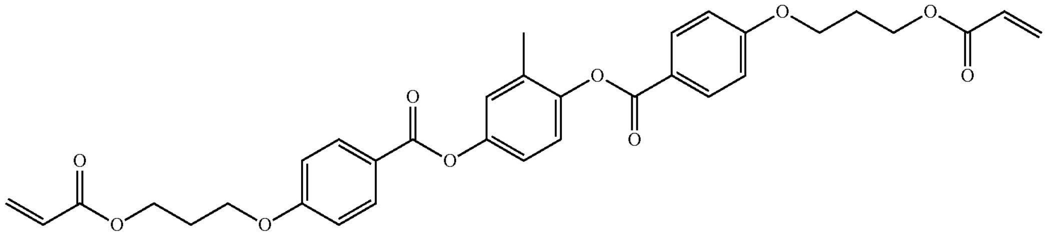 [SMILES: C=CC(=O)OCCCOc1ccc(C(=O)Oc2ccc(OC(=O)c3ccc(OCCCOC(=O)C=C)cc3)c(C)c2)cc1]
RM-50
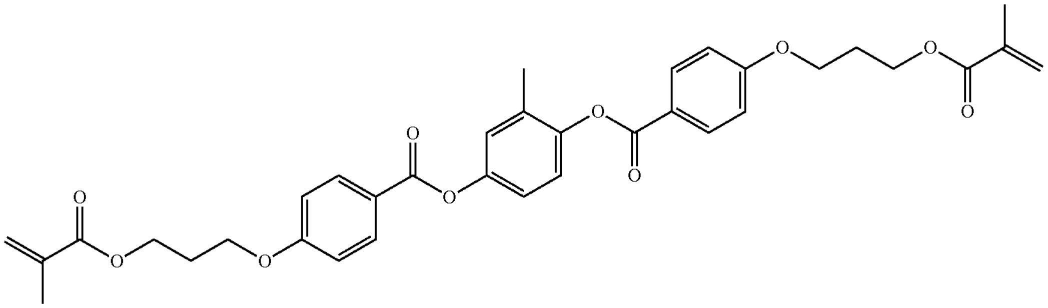 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
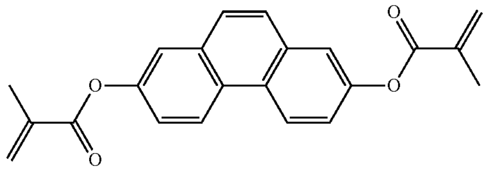 [SMILES: C=C(C)C(=O)Oc1ccc2c(ccc3cc(OC(=O)C(=C)C)ccc32)c1]
RM-52
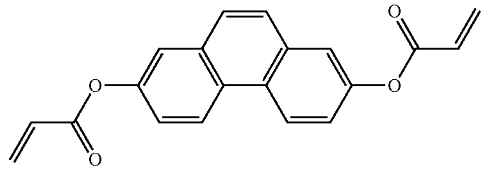 [SMILES: C=CC(=O)Oc1ccc2c(ccc3cc(OC(=O)C=C)ccc32)c1]
RM-53
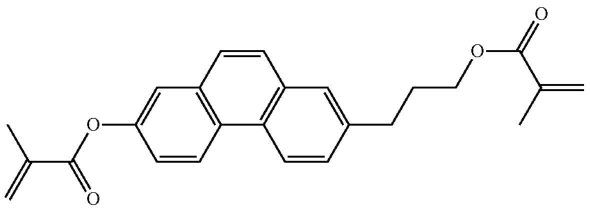 [SMILES: C=C(C)C(=O)OCCCc1ccc2c(ccc3cc(OC(=O)C(=C)C)ccc32)c1]
RM-54

TABLE G-continued
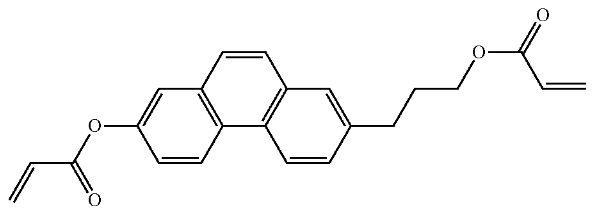 [SMILES: C=CC(=O)OCCCc1ccc2c(ccc3cc(OC(=O)C=C)ccc32)c1]
RM-55
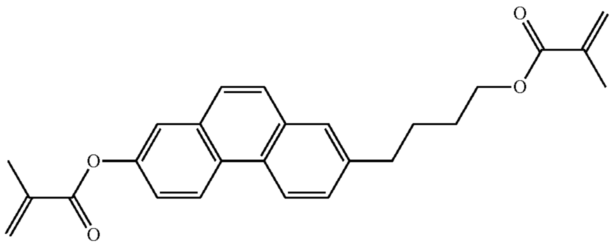 [SMILES: C=C(C)C(=O)OCCCCc1ccc2c(ccc3cc(OC(=O)C(=C)C)ccc32)c1]
RM-56
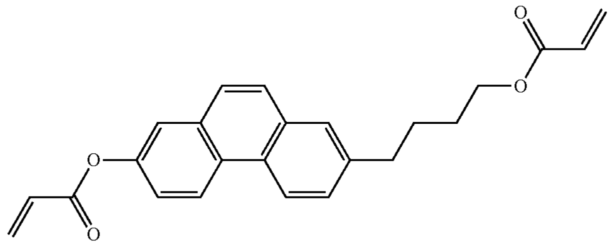 [SMILES: C=CC(=O)OCCCCc1ccc2c(ccc3cc(OC(=O)C=C)ccc32)c1]
RM-57
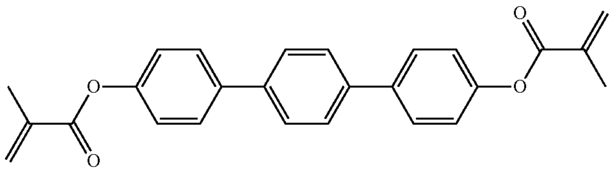 [SMILES: C=C(C)C(=O)Oc1ccc(-c2ccc(-c3ccc(OC(=O)C(=C)C)cc3)cc2)cc1]
RM-58
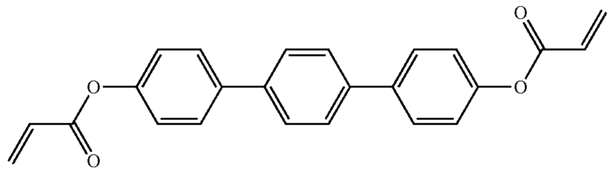 [SMILES: C=CC(=O)Oc1ccc(-c2ccc(-c3ccc(OC(=O)C=C)cc3)cc2)cc1]
RM-59
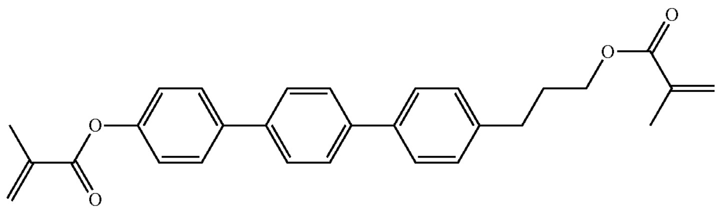 [SMILES: C=C(C)C(=O)OCCCc1ccc(-c2ccc(-c3ccc(OC(=O)C(=C)C)cc3)cc2)cc1]
RM-60
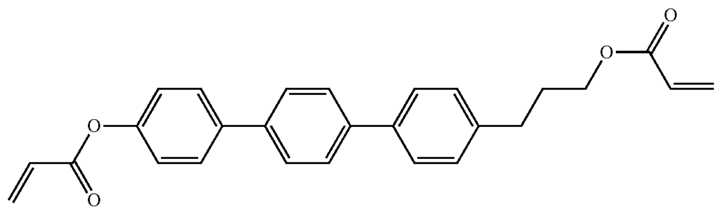 [SMILES: C=CC(=O)OCCCc1ccc(-c2ccc(-c3ccc(OC(=O)C=C)cc3)cc2)cc1]
RM-61

TABLE G-continued
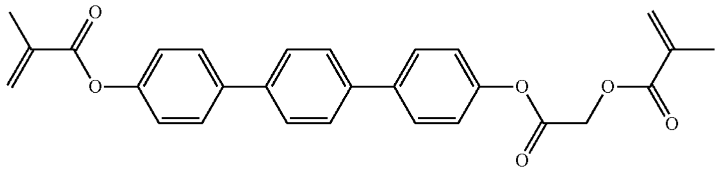 [SMILES: C=C(C)C(=O)OCC(=O)Oc1ccc(-c2ccc(-c3ccc(OC(=O)C(=C)C)cc3)cc2)cc1]
RM-62
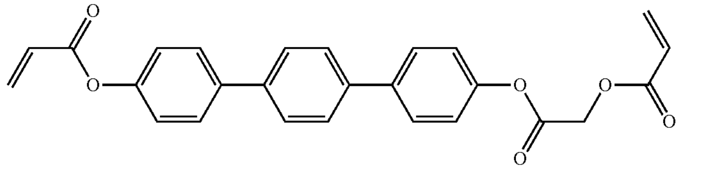 [SMILES: C=CC(=O)OCC(=O)Oc1ccc(-c2ccc(-c3ccc(OC(=O)C=C)cc3)cc2)cc1]
RM-63
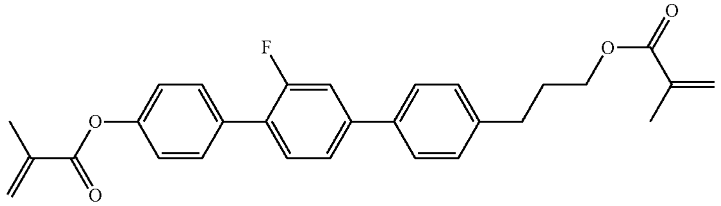 [SMILES: C=C(C)C(=O)OCCCc1ccc(-c2ccc(-c3ccc(OC(=O)C(=C)C)cc3)c(F)c2)cc1]
RM-64
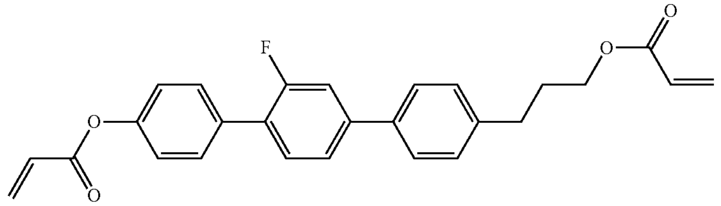 [SMILES: C=CC(=O)OCCCc1ccc(-c2ccc(-c3ccc(OC(=O)C=C)cc3)c(F)c2)cc1]
RM-65
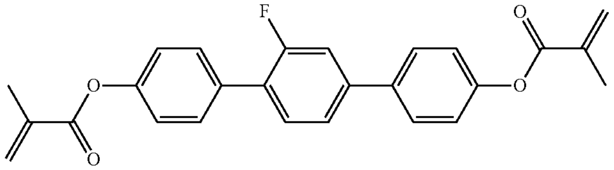 [SMILES: C=C(C)C(=O)Oc1ccc(-c2ccc(-c3ccc(OC(=O)C(=C)C)cc3)c(F)c2)cc1]
RM-66
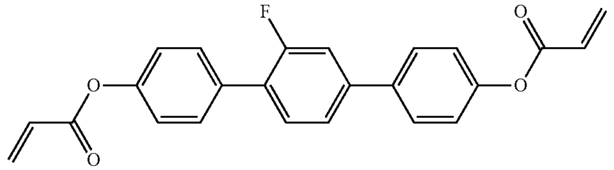 [SMILES: C=CC(=O)Oc1ccc(-c2ccc(-c3ccc(OC(=O)C=C)cc3)c(F)c2)cc1]
RM-67
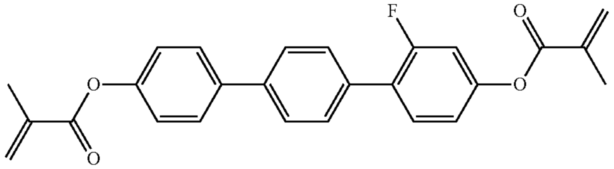 [SMILES: C=C(C)C(=O)Oc1ccc(-c2ccc(-c3ccc(OC(=O)C(=C)C)cc3F)cc2)cc1]
RM-68
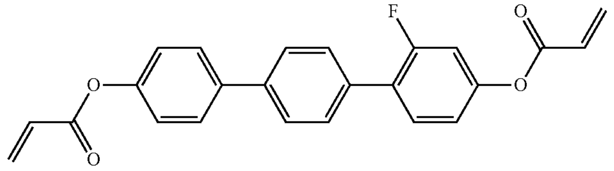 [SMILES: C=CC(=O)Oc1ccc(-c2ccc(-c3ccc(OC(=O)C=C)cc3F)cc2)cc1]
RM-69

TABLE G-continued
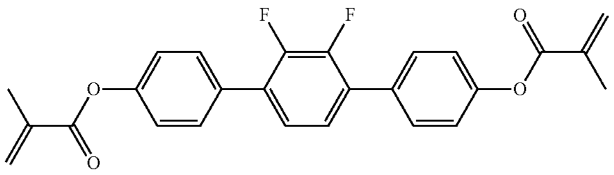 [SMILES: C=C(C)C(=O)Oc1ccc(-c2ccc(-c3ccc(OC(=O)C(=C)C)cc3)c(F)c2F)cc1]
RM-70
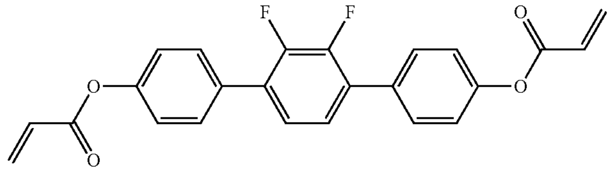 [SMILES: C=CC(=O)Oc1ccc(-c2ccc(-c3ccc(OC(=O)C=C)cc3)c(F)c2F)cc1]
RM-71
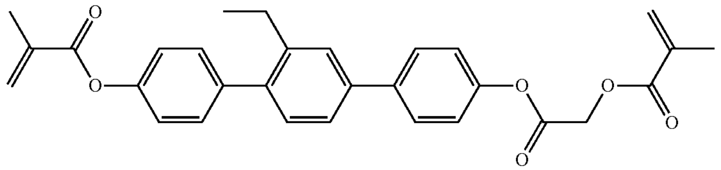 [SMILES: C=C(C)C(=O)OCC(=O)Oc1ccc(-c2ccc(-c3ccc(OC(=O)C(=C)C)cc3)c(CC)c2)cc1]
RM-72
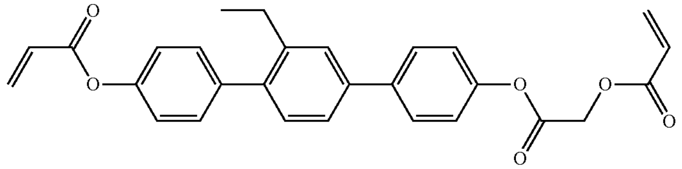 [SMILES: C=CC(=O)OCC(=O)Oc1ccc(-c2ccc(-c3ccc(OC(=O)C=C)cc3)c(CC)c2)cc1]
RM-73
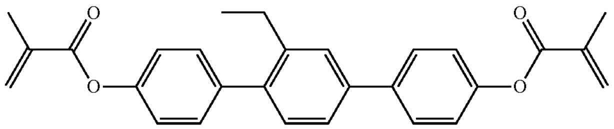 [SMILES: C=C(C)C(=O)Oc1ccc(-c2ccc(-c3ccc(OC(=O)C(=C)C)cc3)c(CC)c2)cc1]
RM-74
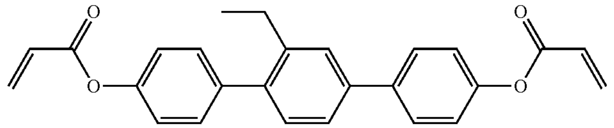 [SMILES: C=CC(=O)Oc1ccc(-c2ccc(-c3ccc(OC(=O)C=C)cc3)c(CC)c2)cc1]
RM-75
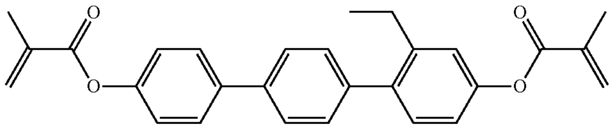 [SMILES: C=C(C)C(=O)Oc1ccc(-c2ccc(-c3ccc(OC(=O)C(=C)C)cc3CC)cc2)cc1]
RM-76
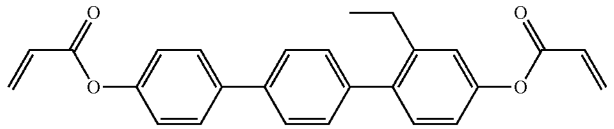 [SMILES: C=CC(=O)Oc1ccc(-c2ccc(-c3ccc(OC(=O)C=C)cc3CC)cc2)cc1]
RM-77
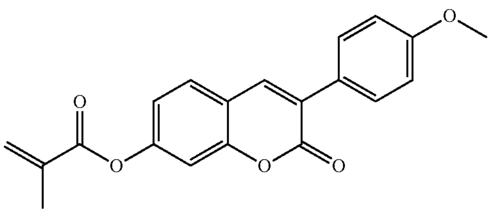 [SMILES: C=C(C)C(=O)Oc1ccc2cc(-c3ccc(OC)cc3)c(=O)oc2c1]
RM-78

TABLE G-continued
RM-79
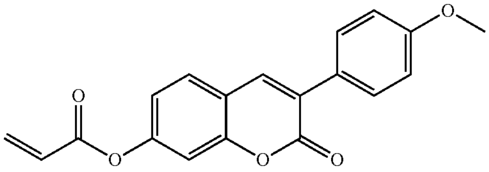 [SMILES: C=CC(=O)Oc1ccc2cc(-c3ccc(OC)cc3)c(=O)oc2c1]
RM-80
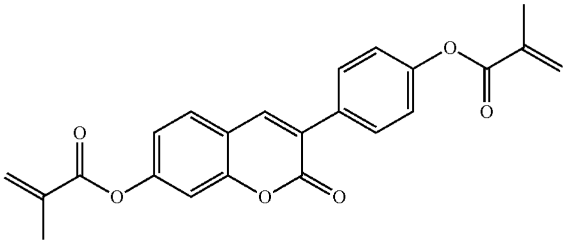 [SMILES: C=C(C)C(=O)Oc1ccc(-c2cc3ccc(OC(=O)C(=C)C)cc3oc2=O)cc1]
RM-81
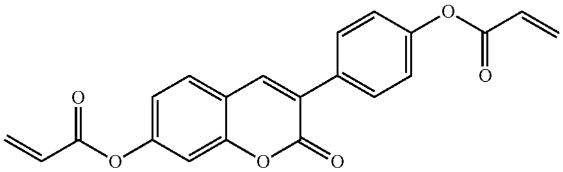 [SMILES: C=CC(=O)Oc1ccc(-c2cc3ccc(OC(=O)C=C)cc3oc2=O)cc1]
RM-82
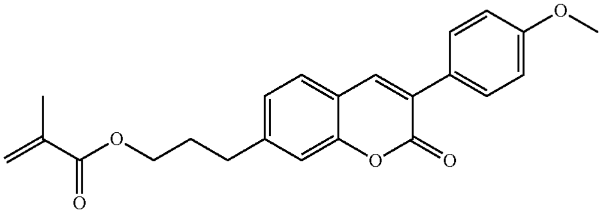 [SMILES: C=C(C)C(=O)OCCCc1ccc2cc(-c3ccc(OC)cc3)c(=O)oc2c1]
RM-83
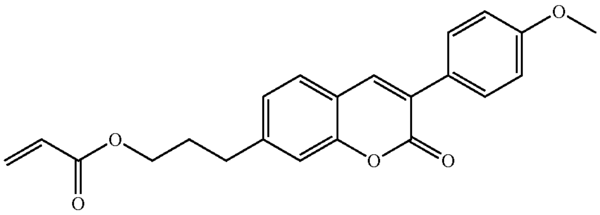 [SMILES: C=CC(=O)OCCCc1ccc2cc(-c3ccc(OC)cc3)c(=O)oc2c1]
RM-84
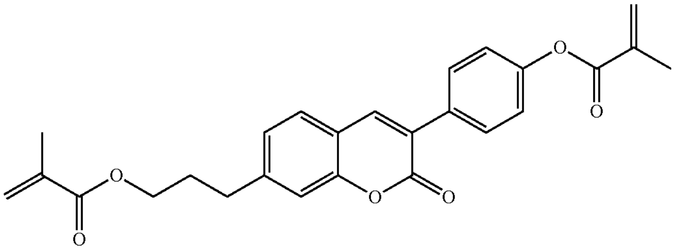 [SMILES: C=C(C)C(=O)OCCCc1ccc2cc(-c3ccc(OC(=O)C(=C)C)cc3)c(=O)oc2c1]
RM-85
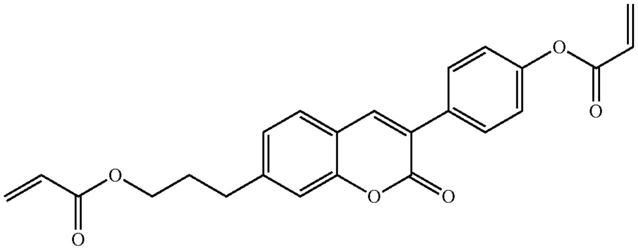 [SMILES: C=CC(=O)OCCCc1ccc2cc(-c3ccc(OC(=O)C=C)cc3)c(=O)oc2c1]

TABLE G-continued
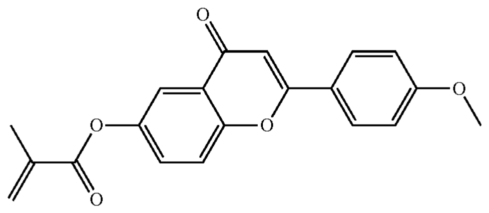 [SMILES: C=C(C)C(=O)Oc1ccc2oc(-c3ccc(OC)cc3)cc(=O)c2c1]
RM-86
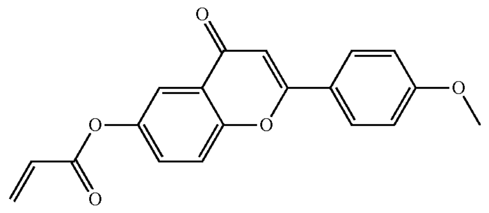 [SMILES: C=CC(=O)Oc1ccc2oc(-c3ccc(OC)cc3)cc(=O)c2c1]
RM-87
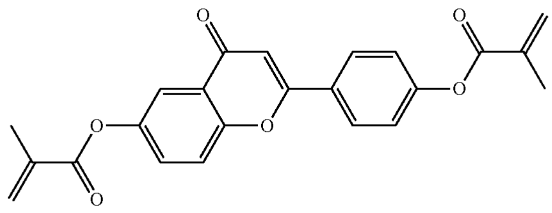 [SMILES: C=C(C)C(=O)Oc1ccc(-c2cc(=O)c3cc(OC(=O)C(=C)C)ccc3o2)cc1]
RM-88
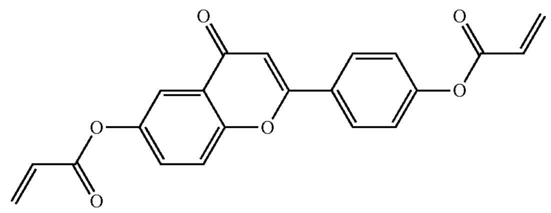 [SMILES: C=CC(=O)Oc1ccc(-c2cc(=O)c3cc(OC(=O)C=C)ccc3o2)cc1]
RM-89
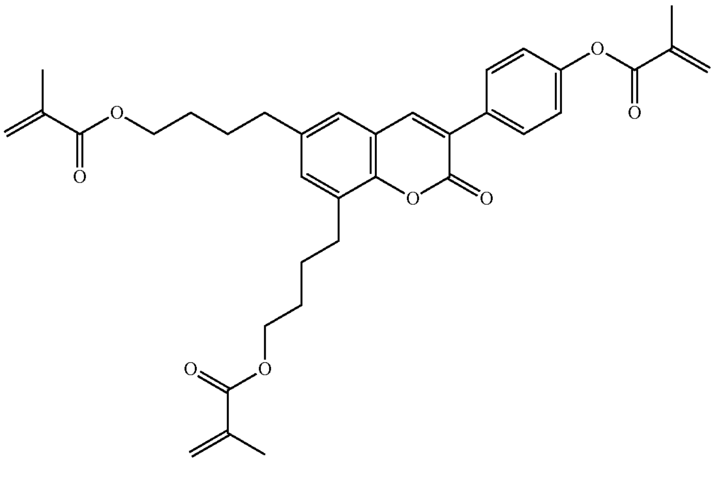 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90

TABLE G-continued
RM-91
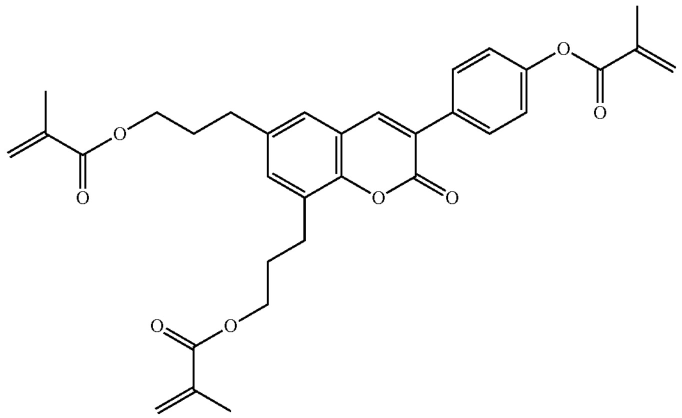 [SMILES: C=C(C)C(=O)OCCCc1cc(CCCOC(=O)C(=C)C)c2oc(=O)c(-c3ccc(OC(=O)C(=C)C)cc3)cc2c1]
RM-92
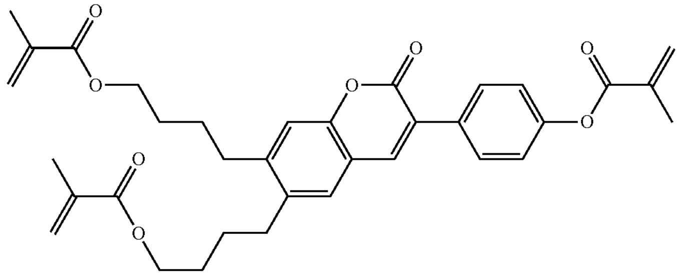 [SMILES: C=C(C)C(=O)OCCCCc1cc2cc(-c3ccc(OC(=O)C(=C)C)cc3)c(=O)oc2cc1CCCCOC(=O)C(=C)C]
RM-93
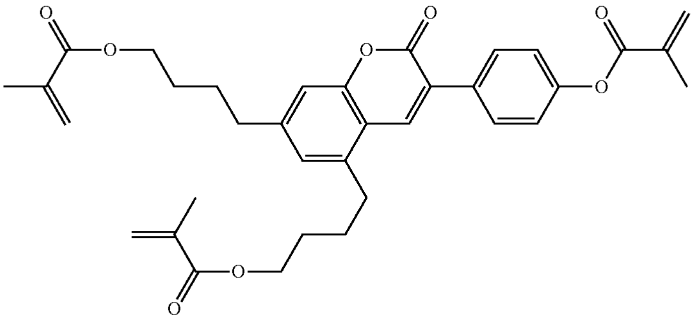 [SMILES: C=C(C)C(=O)OCCCCc1cc(CCCCOC(=O)C(=C)C)c2cc(-c3ccc(OC(=O)C(=C)C)cc3)c(=O)oc2c1]
RM-94
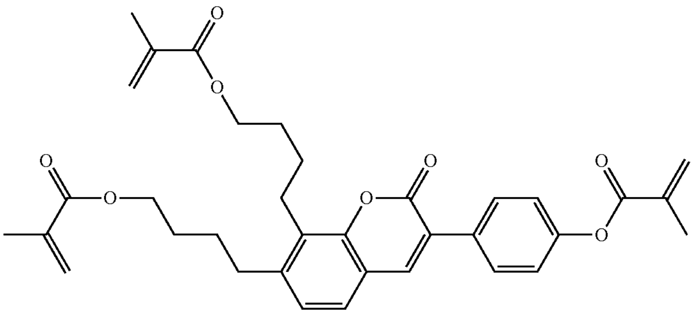 [SMILES: C=C(C)C(=O)OCCCCc1ccc2cc(-c3ccc(OC(=O)C(=C)C)cc3)c(=O)oc2c1CCCCOC(=O)C(=C)C]
RM-95
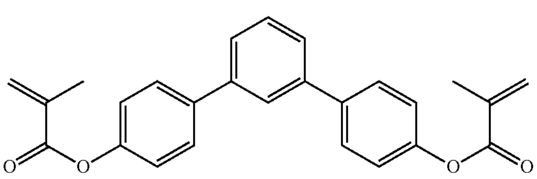 [SMILES: C=C(C)C(=O)Oc1ccc(-c2cccc(-c3ccc(OC(=O)C(=C)C)cc3)c2)cc1]

TABLE G-continued
RM-96
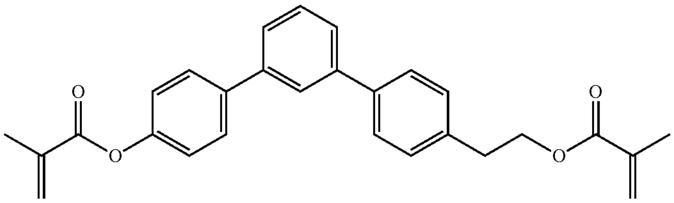 [SMILES: C=C(C)C(=O)OCCc1ccc(-c2cccc(-c3ccc(OC(=O)C(=C)C)cc3)c2)cc1]
RM-97
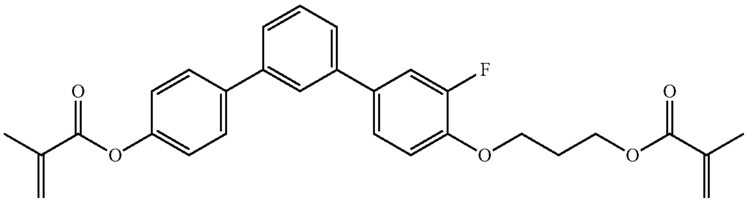 [SMILES: C=C(C)C(=O)OCCCOc1ccc(-c2cccc(-c3ccc(OC(=O)C(=C)C)cc3)c2)cc1F]
RM-98
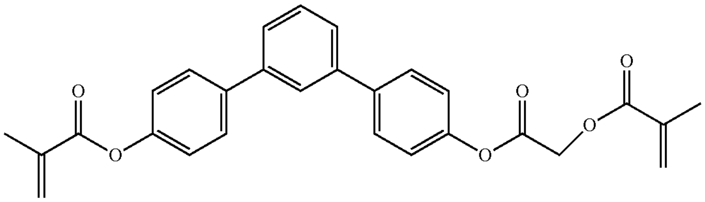 [SMILES: C=C(C)C(=O)OCC(=O)Oc1ccc(-c2cccc(-c3ccc(OC(=O)C(=C)C)cc3)c2)cc1]
RM-99
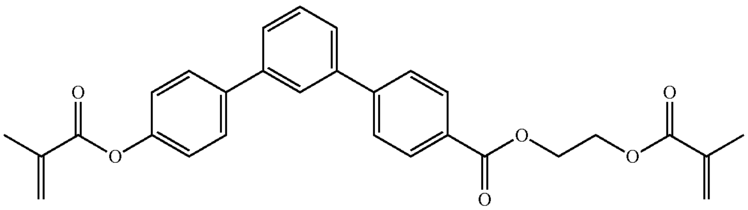 [SMILES: C=C(C)C(=O)OCCOC(=O)c1ccc(-c2cccc(-c3ccc(OC(=O)C(=C)C)cc3)c2)cc1]
RM-100
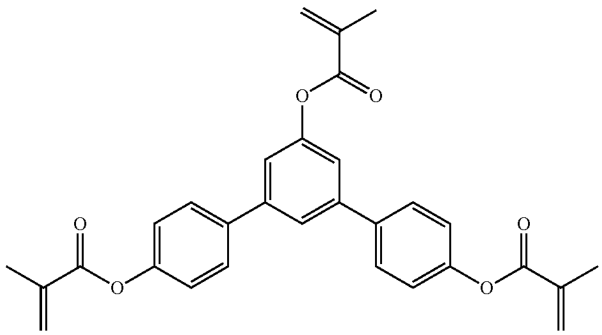 [SMILES: C=C(C)C(=O)Oc1ccc(-c2cc(OC(=O)C(=C)C)cc(-c3ccc(OC(=O)C(=C)C)cc3)c2)cc1]
RM-101
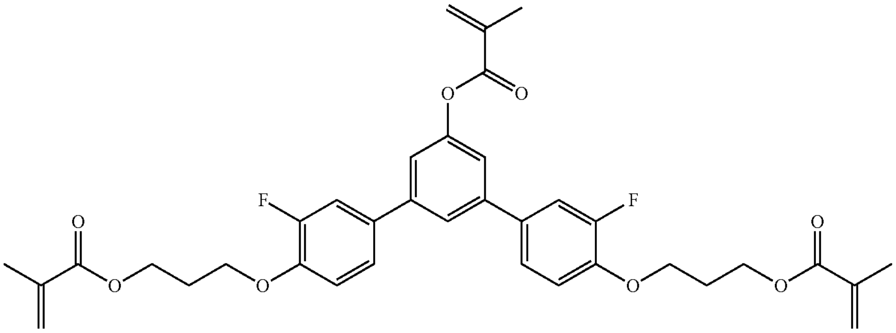 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

TABLE G-continued
RM-102
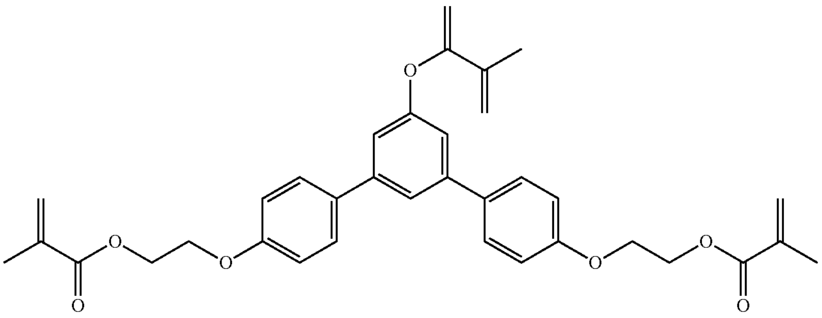 [SMILES: C=C(C)C(=C)Oc1cc(-c2ccc(OCCOC(=O)C(=C)C)cc2)cc(-c2ccc(OCCOC(=O)C(=C)C)cc2)c1]
RM-103
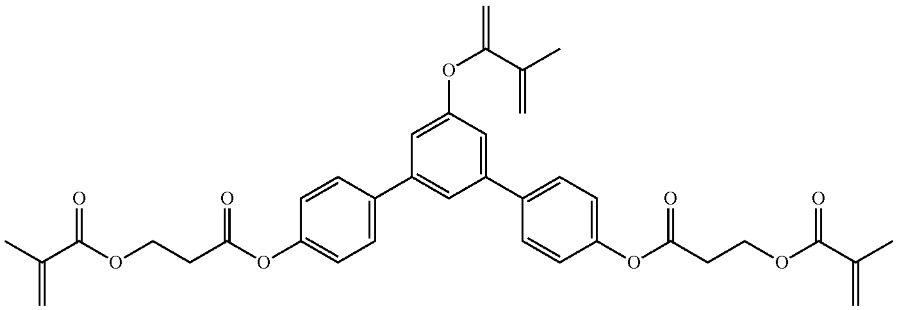 [SMILES: C=C(C)C(=C)Oc1cc(-c2ccc(OC(=O)CCOC(=O)C(=C)C)cc2)cc(-c2ccc(OC(=O)CCOC(=O)C(=C)C)cc2)c1]
RM-104
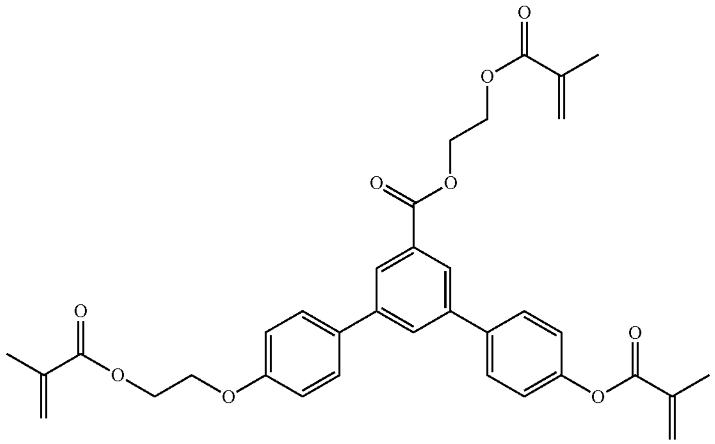 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
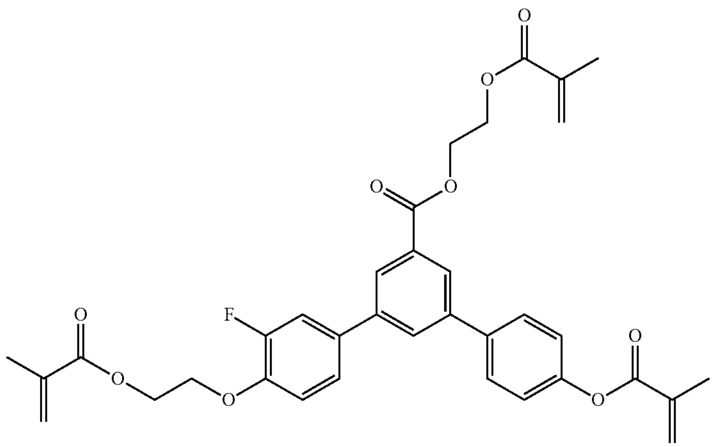 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

TABLE G-continued
RM-106
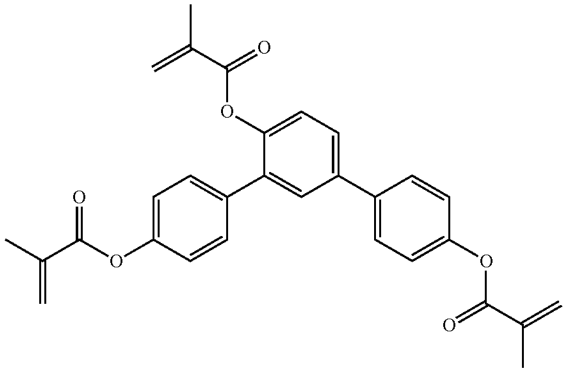 [SMILES: C=C(C)C(=O)Oc1ccc(-c2ccc(OC(=O)C(=C)C)c(-c3ccc(OC(=O)C(=C)C)cc3)c2)cc1]
RM-107
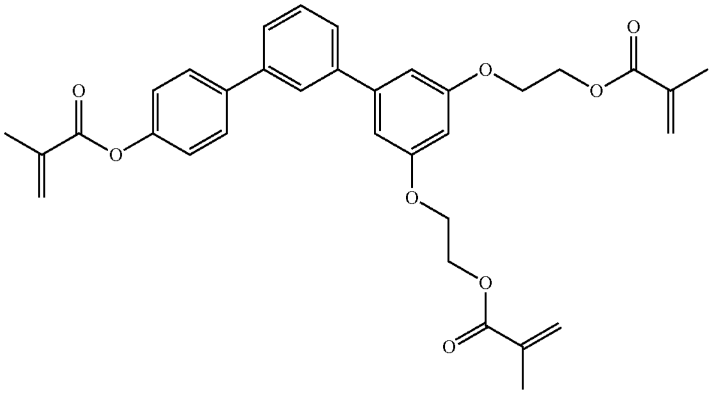 [SMILES: C=C(C)C(=O)OCCOc1cc(OCCOC(=O)C(=C)C)cc(-c2cccc(-c3ccc(OC(=O)C(=C)C)cc3)c2)c1]
RM-108
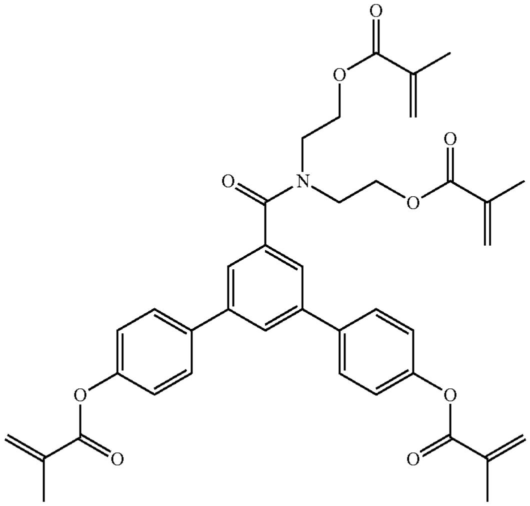 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
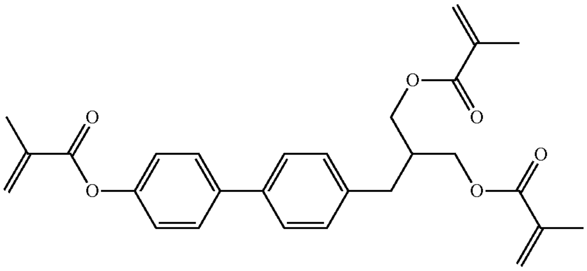 [SMILES: C=C(C)C(=O)OCC(COC(=O)C(=C)C)Cc1ccc(-c2ccc(OC(=O)C(=C)C)cc2)cc1]

TABLE G-continued
RM-110
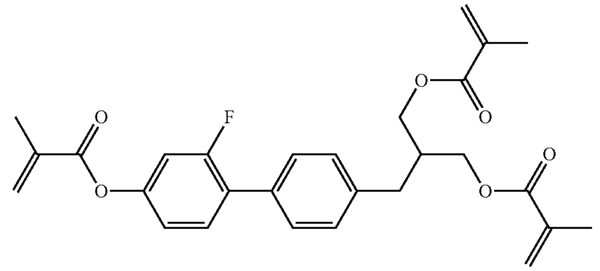 [SMILES: C=C(C)C(=O)OCC(COC(=O)C(=C)C)Cc1ccc(-c2ccc(OC(=O)C(=C)C)cc2F)cc1]
RM-111
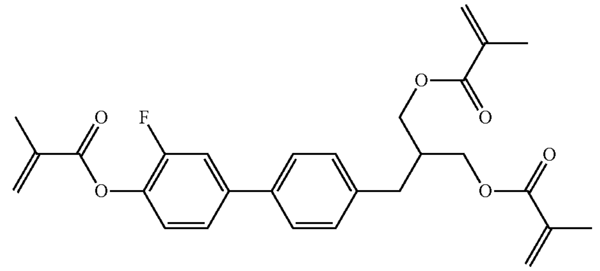 [SMILES: C=C(C)C(=O)OCC(COC(=O)C(=C)C)Cc1ccc(-c2ccc(OC(=O)C(=C)C)c(F)c2)cc1]
RM-112
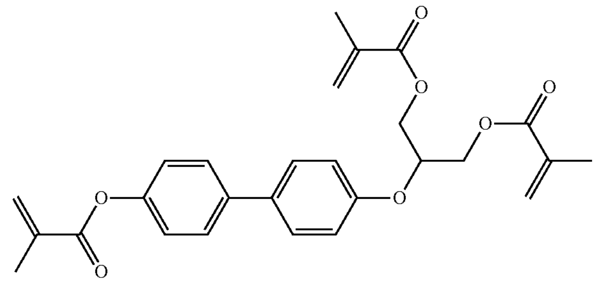 [SMILES: C=C(C)C(=O)OCC(COC(=O)C(=C)C)Oc1ccc(-c2ccc(OC(=O)C(=C)C)cc2)cc1]
RM-113
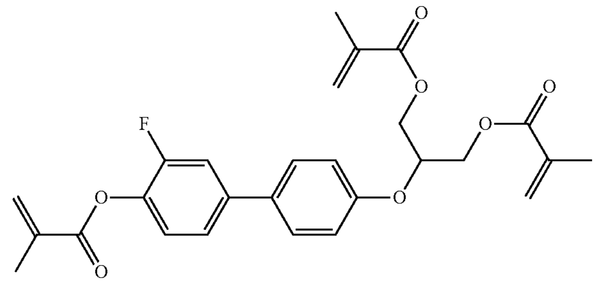 [SMILES: C=C(C)C(=O)OCC(COC(=O)C(=C)C)Oc1ccc(-c2ccc(OC(=O)C(=C)C)c(F)c2)cc1]
RM-114
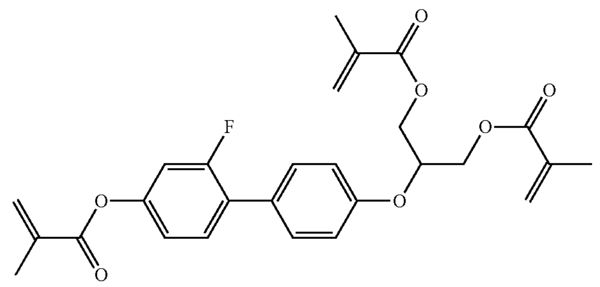 [SMILES: C=C(C)C(=O)OCC(COC(=O)C(=C)C)Oc1ccc(-c2ccc(OC(=O)C(=C)C)cc2F)cc1]

TABLE G-continued
RM-115
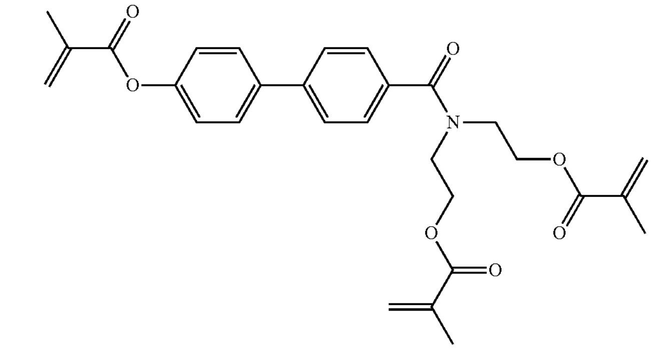 [SMILES: C=C(C)C(=O)OCCN(CCOC(=O)C(=C)C)C(=O)c1ccc(-c2ccc(OC(=O)C(=C)C)cc2)cc1]
RM-116
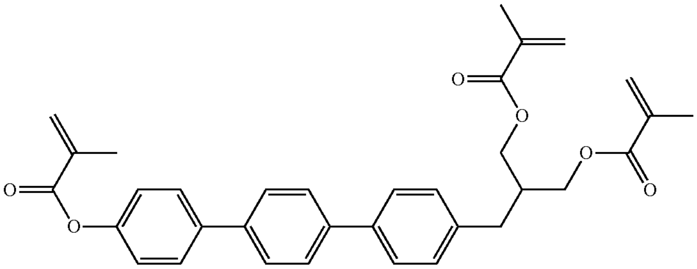 [SMILES: C=C(C)C(=O)OCC(COC(=O)C(=C)C)Cc1ccc(-c2ccc(-c3ccc(OC(=O)C(=C)C)cc3)cc2)cc1]
RM-117
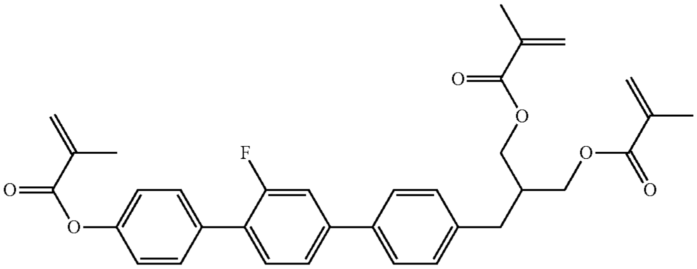 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
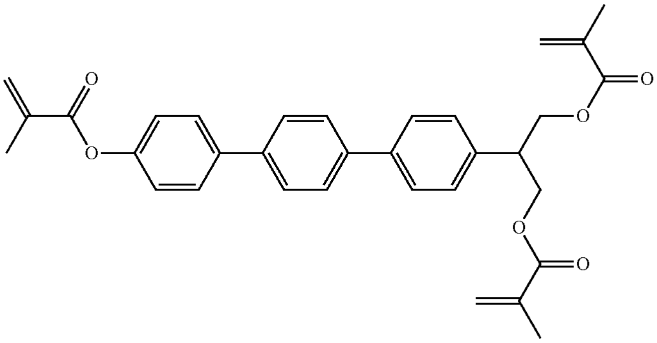 [SMILES: C=C(C)C(=O)OCC(COC(=O)C(=C)C)c1ccc(-c2ccc(-c3ccc(OC(=O)C(=C)C)cc3)cc2)cc1]
RM-119
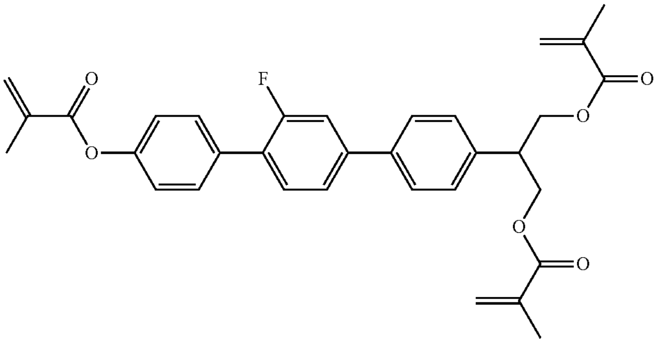 [SMILES: C=C(C)C(=O)OCC(COC(=O)C(=C)C)c1ccc(-c2ccc(-c3ccc(OC(=O)C(=C)C)cc3)c(F)c2)cc1]

TABLE G-continued
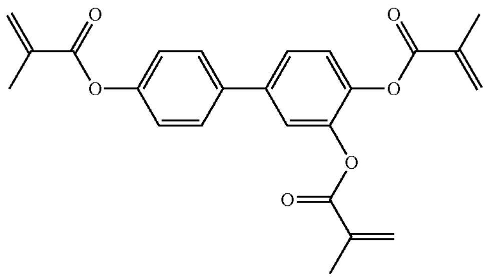 [SMILES: C=C(C)C(=O)Oc1ccc(-c2ccc(OC(=O)C(=C)C)c(OC(=O)C(=C)C)c2)cc1]
RM-120
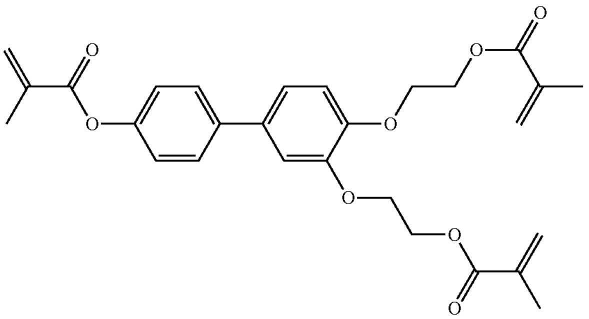 [SMILES: C=C(C)C(=O)OCCOc1ccc(-c2ccc(OC(=O)C(=C)C)cc2)cc1OCCOC(=O)C(=C)C]
RM-121
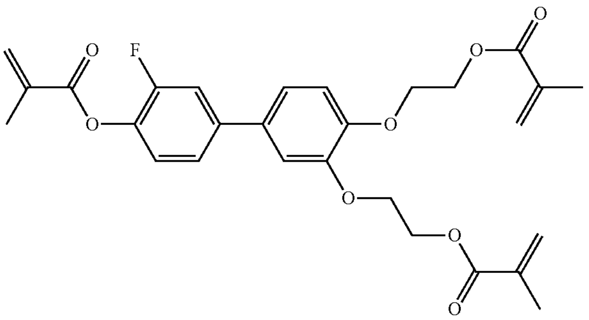 [SMILES: C=C(C)C(=O)OCCOc1ccc(-c2ccc(OC(=O)C(=C)C)c(F)c2)cc1OCCOC(=O)C(=C)C]
RM-122
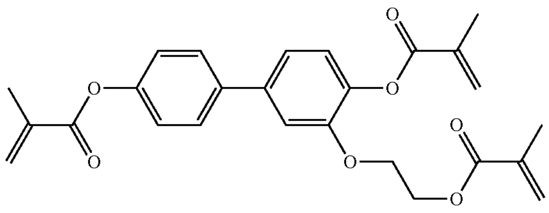 [SMILES: C=C(C)C(=O)OCCOc1cc(-c2ccc(OC(=O)C(=C)C)cc2)ccc1OC(=O)C(=C)C]
RM-123
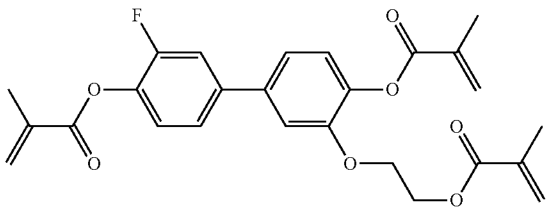 [SMILES: C=C(C)C(=O)OCCOc1cc(-c2ccc(OC(=O)C(=C)C)c(F)c2)ccc1OC(=O)C(=C)C]
RM-124

TABLE G-continued
RM-125
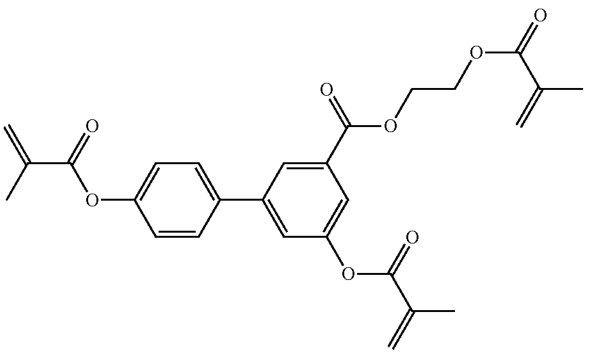 [SMILES: C=C(C)C(=O)OCCOC(=O)c1cc(OC(=O)C(=C)C)cc(-c2ccc(OC(=O)C(=C)C)cc2)c1]
RM-126
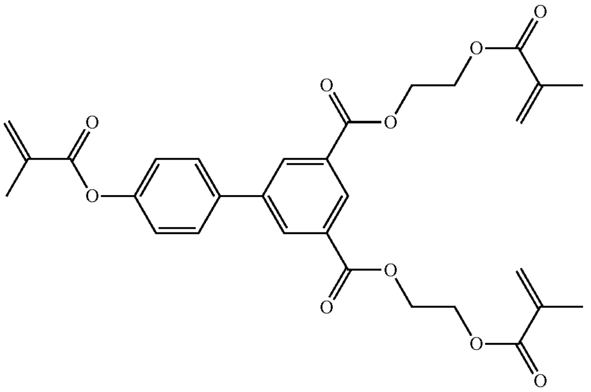 [SMILES: C=C(C)C(=O)OCCOC(=O)c1cc(C(=O)OCCOC(=O)C(=C)C)cc(-c2ccc(OC(=O)C(=C)C)cc2)c1]
RM-127
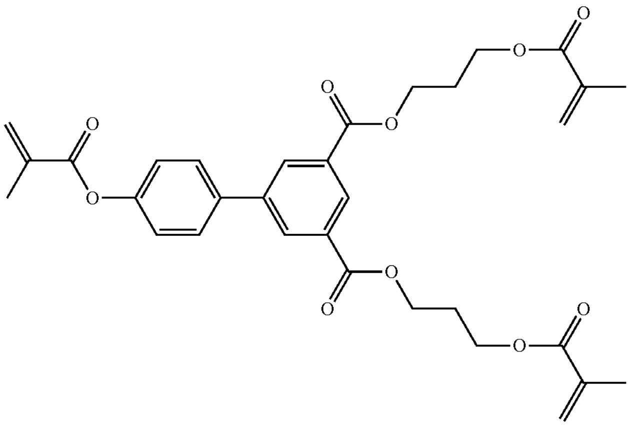 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
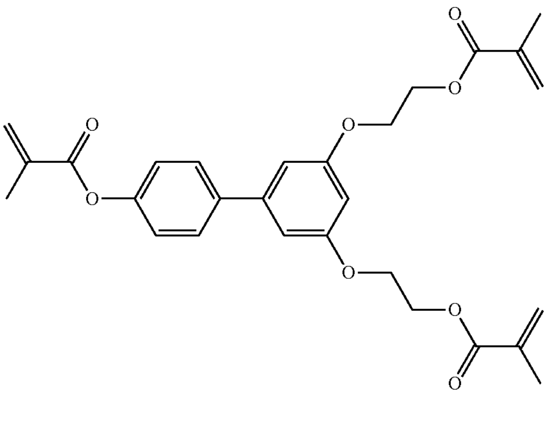 [SMILES: C=C(C)C(=O)OCCOc1cc(OCCOC(=O)C(=C)C)cc(-c2ccc(OC(=O)C(=C)C)cc2)c1]

TABLE G-continued
RM-129
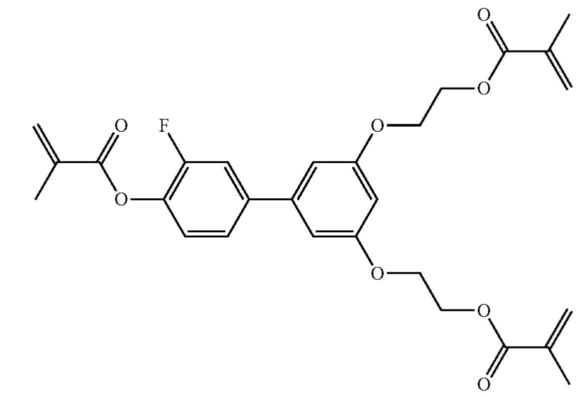 [SMILES: C=C(C)C(=O)OCCOc1cc(OCCOC(=O)C(=C)C)cc(-c2ccc(OC(=O)C(=C)C)c(F)c2)c1]
RM-130
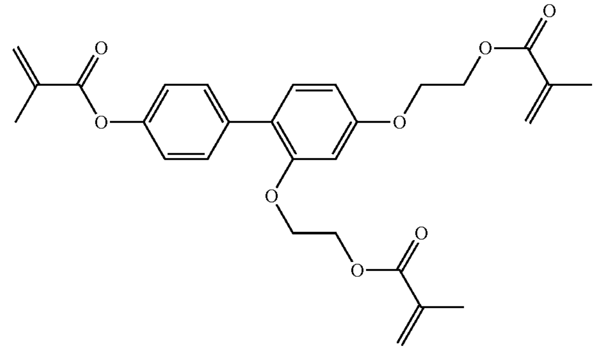 [SMILES: C=C(C)C(=O)OCCOc1ccc(-c2ccc(OC(=O)C(=C)C)cc2)c(OCCOC(=O)C(=C)C)c1]
RM-131
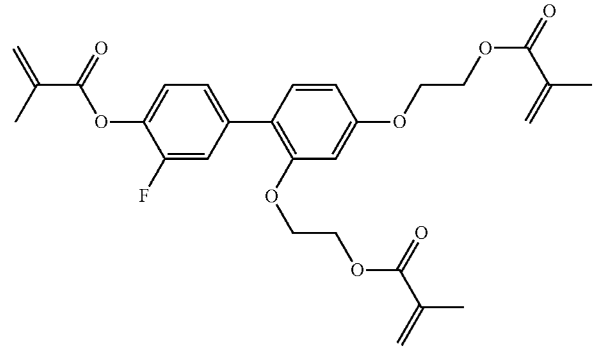 [SMILES: C=C(C)C(=O)OCCOc1ccc(-c2ccc(OC(=O)C(=C)C)c(F)c2)c(OCCOC(=O)C(=C)C)c1]
RM-132
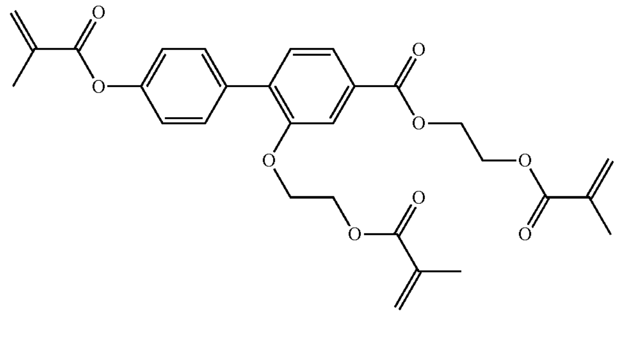 [SMILES: C=C(C)C(=O)OCCOC(=O)c1ccc(-c2ccc(OC(=O)C(=C)C)cc2)c(OCCOC(=O)C(=C)C)c1]

TABLE G-continued
RM-133
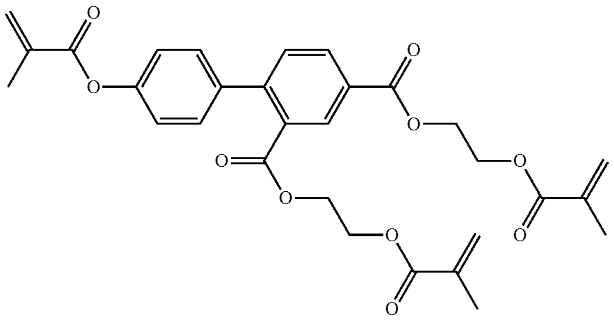 [SMILES: C=C(C)C(=O)OCCOC(=O)c1ccc(-c2ccc(OC(=O)C(=C)C)cc2)c(C(=O)OCCOC(=O)C(=C)C)c1]
RM-134
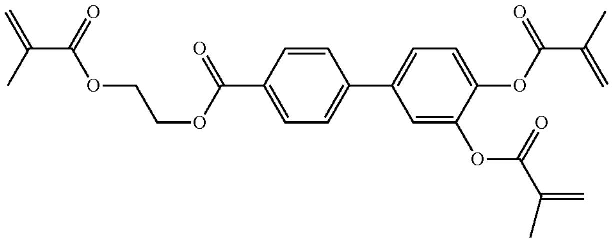 [SMILES: C=C(C)C(=O)OCCOC(=O)c1ccc(-c2ccc(OC(=O)C(=C)C)c(OC(=O)C(=C)C)c2)cc1]
RM-135
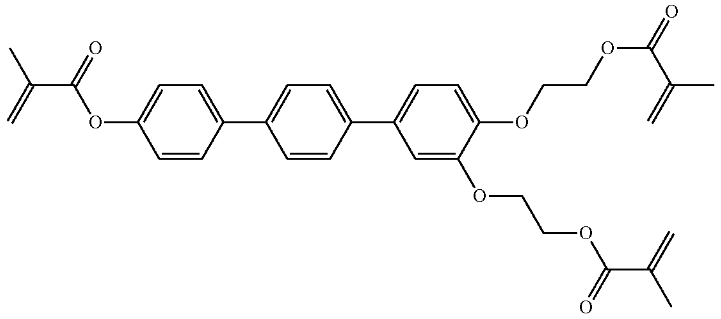 [SMILES: C=C(C)C(=O)OCCOc1ccc(-c2ccc(-c3ccc(OC(=O)C(=C)C)cc3)cc2)cc1OCCOC(=O)C(=C)C]
RM-136
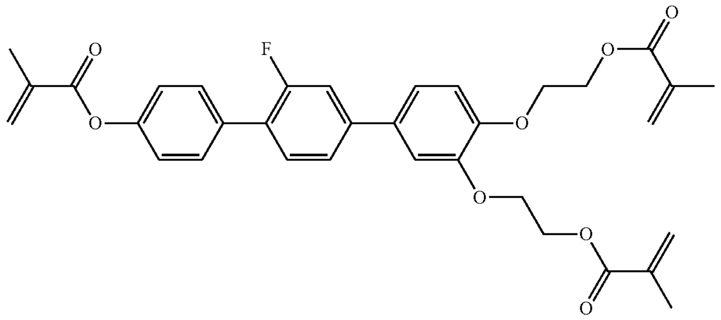 [SMILES: C=C(C)C(=O)OCCOc1ccc(-c2ccc(-c3ccc(OC(=O)C(=C)C)cc3)c(F)c2)cc1OCCOC(=O)C(=C)C]
RM-137
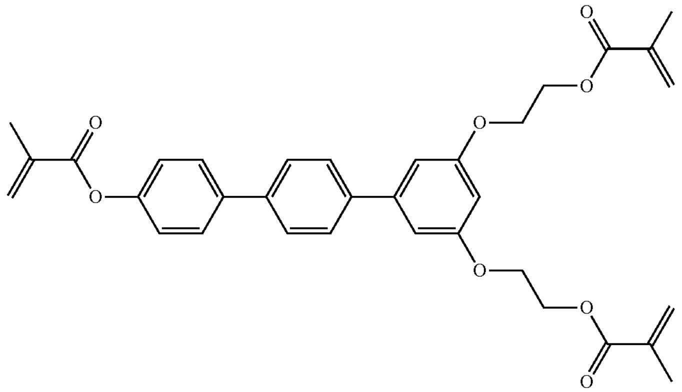 [SMILES: C=C(C)C(=O)OCCOc1cc(OCCOC(=O)C(=C)C)cc(-c2ccc(-c3ccc(OC(=O)C(=C)C)cc3)cc2)c1]

TABLE G-continued
RM-138
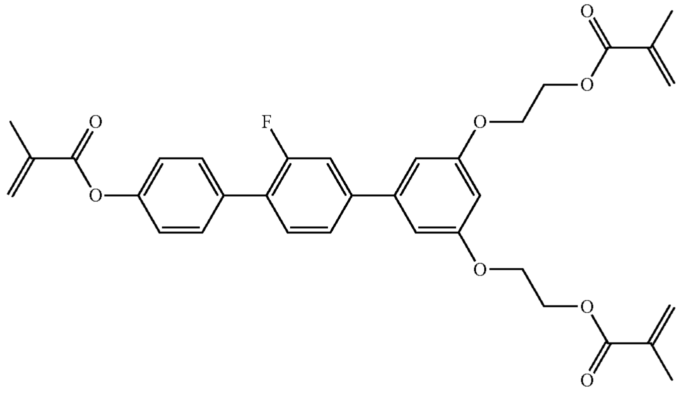 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-139
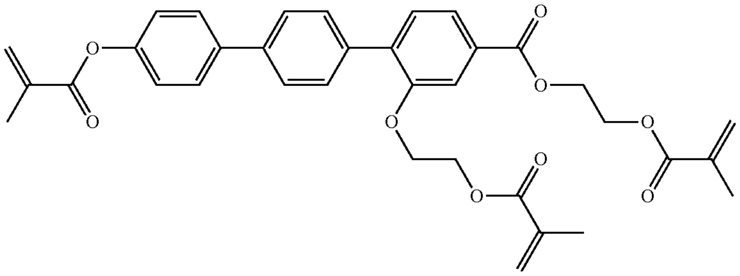 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
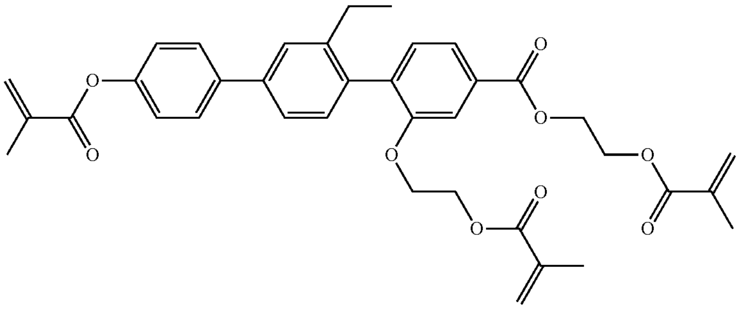 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-141
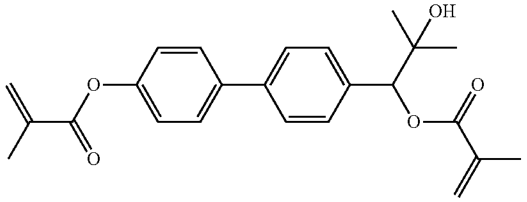 [SMILES: C=C(C)C(=O)Oc1ccc(-c2ccc(C(OC(=O)C(=C)C)C(C)(C)O)cc2)cc1]
RM-142
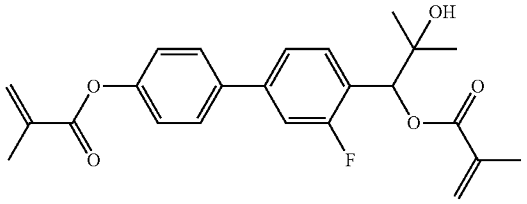 [SMILES: C=C(C)C(=O)Oc1ccc(-c2ccc(C(OC(=O)C(=C)C)C(C)(C)O)c(F)c2)cc1]
RM-143
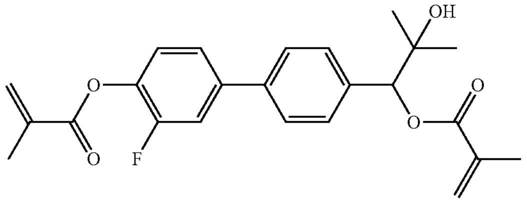 [SMILES: C=C(C)C(=O)Oc1ccc(-c2ccc(C(OC(=O)C(=C)C)C(C)(C)O)cc2)cc1F]

TABLE G-continued

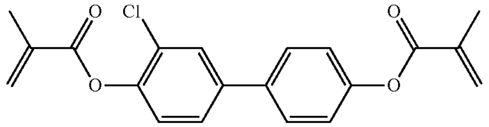 [SMILES: C=C(C)C(=O)Oc1ccc(-c2ccc(OC(=O)C(=C)C)c(Cl)c2)cc1]
RM-144

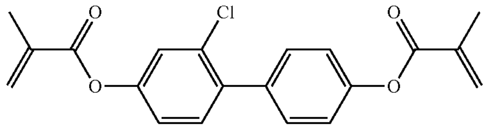 [SMILES: C=C(C)C(=O)Oc1ccc(-c2ccc(OC(=O)C(=C)C)cc2Cl)cc1]
RM-145

Table G shows illustrative reactive mesogenic compounds (RMs) which can be used in the liquid-crystal media in accordance with the present invention.

In a preferred embodiment, the liquid-crystalline media according to the invention comprise one or more polymerisable compounds, preferably selected from the polymerisable compounds of the formulae RM-1 to RM-143. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122 are particularly preferred.

TABLE H

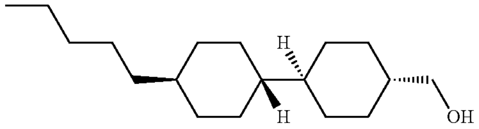 [SMILES: CCCCC[C@H]1CC[C@H]([C@H]2CC[C@H](CO)CC2)CC1]
SA-1

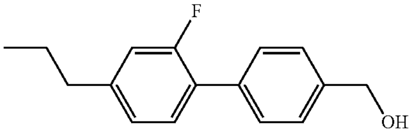 [SMILES: CCCc1ccc(-c2ccc(CO)cc2)c(F)c1]
SA-2

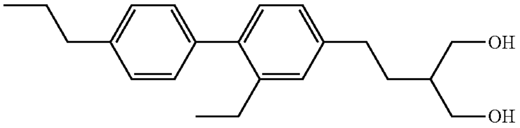 [SMILES: CCCc1ccc(-c2ccc(CCC(CO)CO)cc2CC)cc1]
SA-3

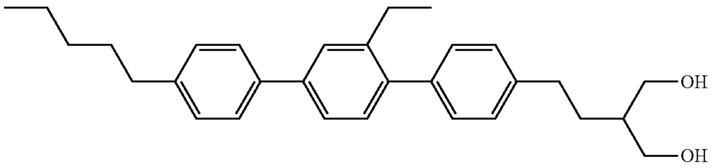 [SMILES: CCCCCc1ccc(-c2ccc(-c3ccc(CCC(CO)CO)cc3)c(CC)c2)cc1]
SA-4

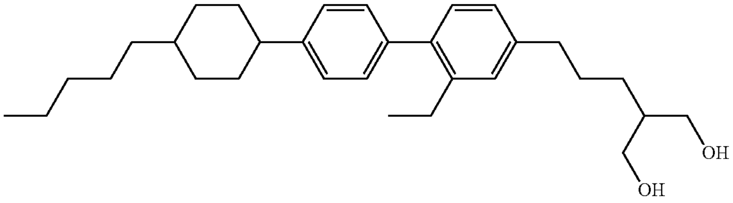 [SMILES: CCCCCC1CCC(c2ccc(-c3ccc(CCCC(CO)CO)cc3CC)cc2)CC1]
SA-5

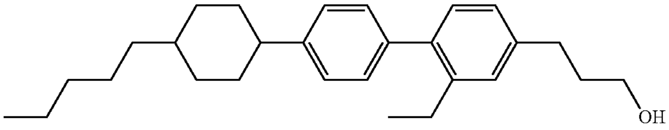 [SMILES: CCCCCC1CCC(c2ccc(-c3ccc(CCCO)cc3CC)cc2)CC1]
SA-6

TABLE H-continued
SA-7
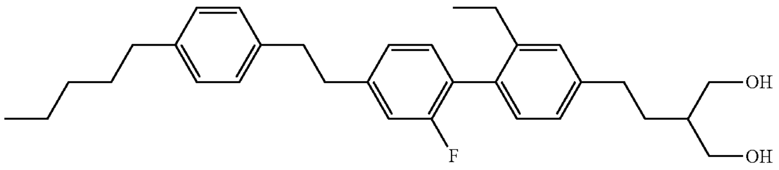 [SMILES: CCCCCc1ccc(CCc2ccc(-c3ccc(CCC(CO)CO)cc3CC)c(F)c2)cc1]
SA-8
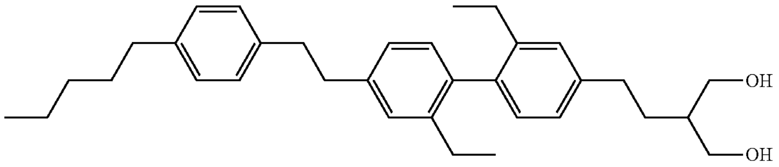 [SMILES: CCCCCc1ccc(CCc2ccc(-c3ccc(CCC(CO)CO)cc3CC)c(CC)c2)cc1]
SA-9
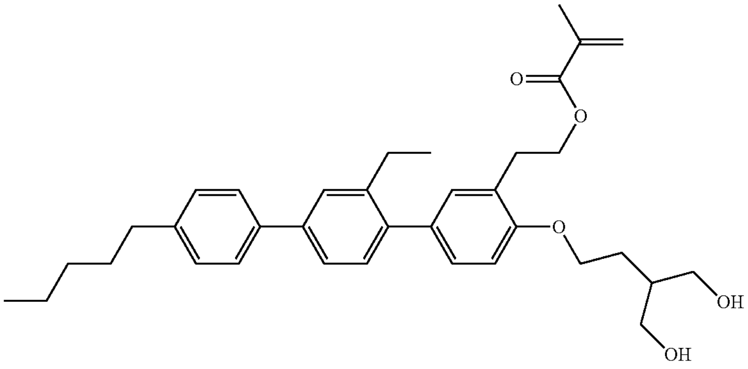 [SMILES: C=C(C)C(=O)OCCc1cc(-c2ccc(-c3ccc(CCCCC)cc3)cc2CC)ccc1OCCC(CO)CO]
SA-10
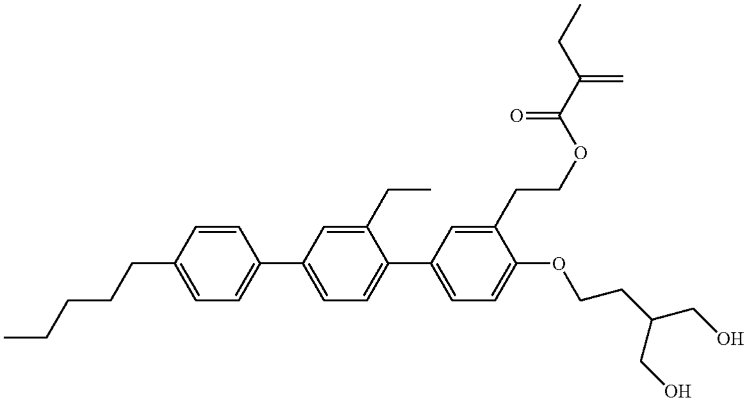 [SMILES: C=C(CC)C(=O)OCCc1cc(-c2ccc(-c3ccc(CCCCC)cc3)cc2CC)ccc1OCCC(CO)CO]
SA-11
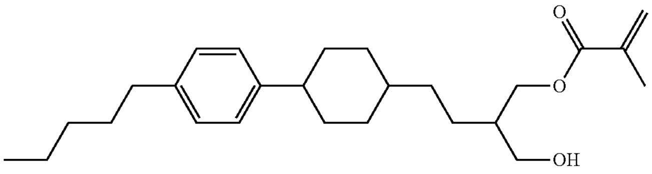 [SMILES: C=C(C)C(=O)OCC(CO)CCC1CCC(c2ccc(CCCCC)cc2)CC1]
SA-12
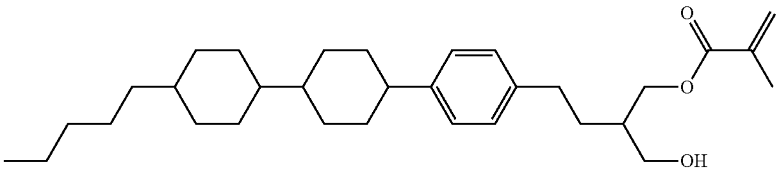 [SMILES: C=C(C)C(=O)OCC(CO)CCc1ccc(C2CCC(C3CCC(CCCCC)CC3)CC2)cc1]

TABLE H-continued
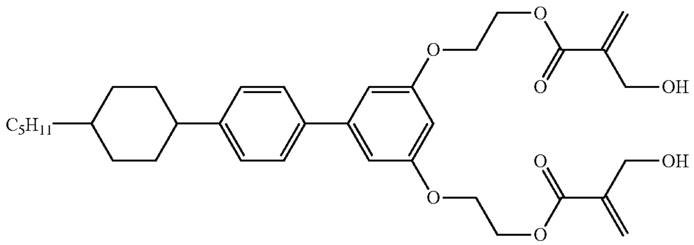
SA-13
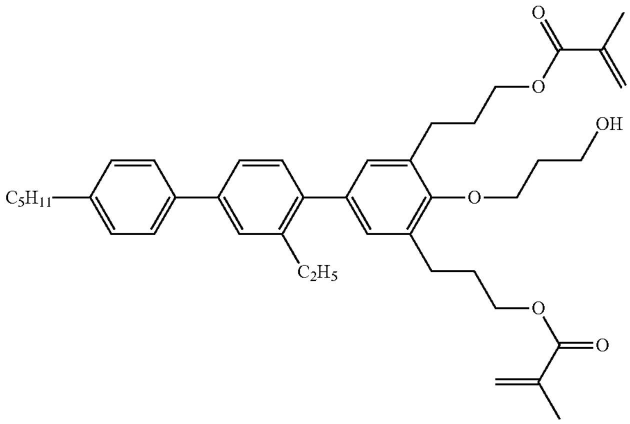
SA-14
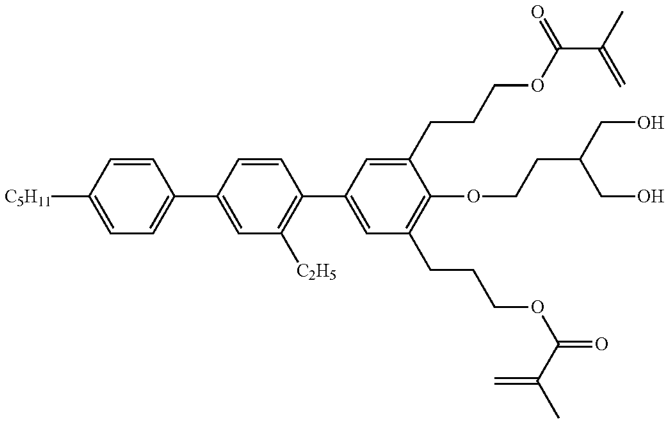
SA-15
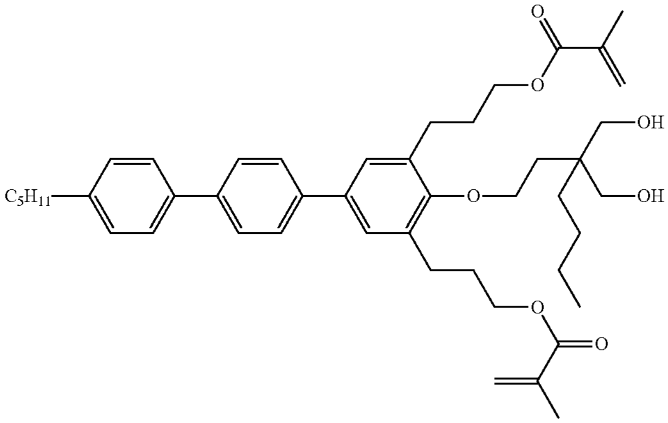
SA-16

TABLE H-continued
SA-17
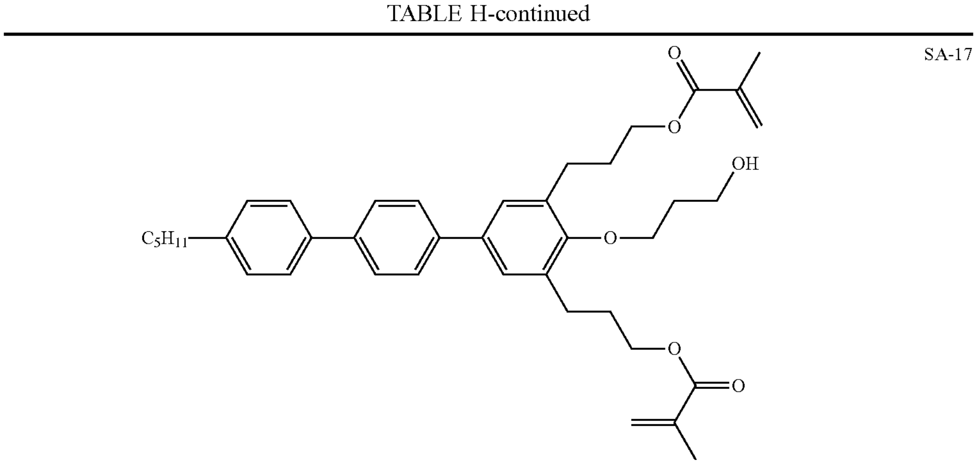
SA-18
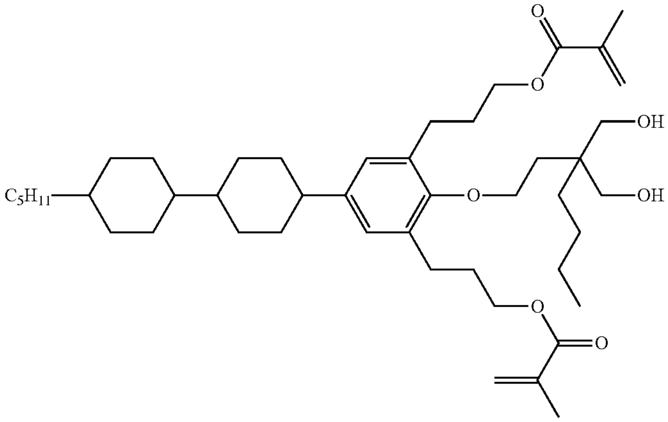
SA-19
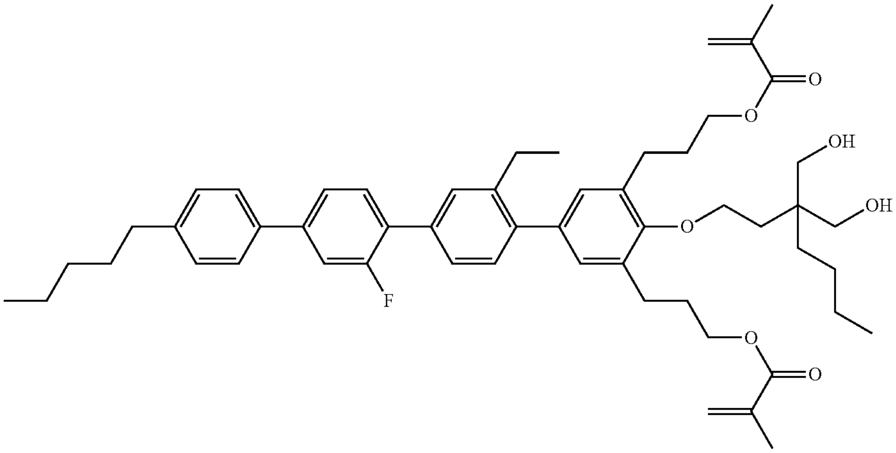 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]

TABLE H-continued
SA-20
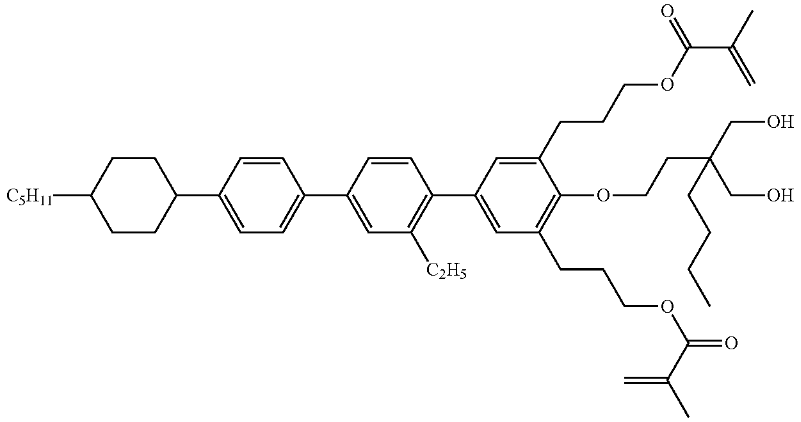
SA-21
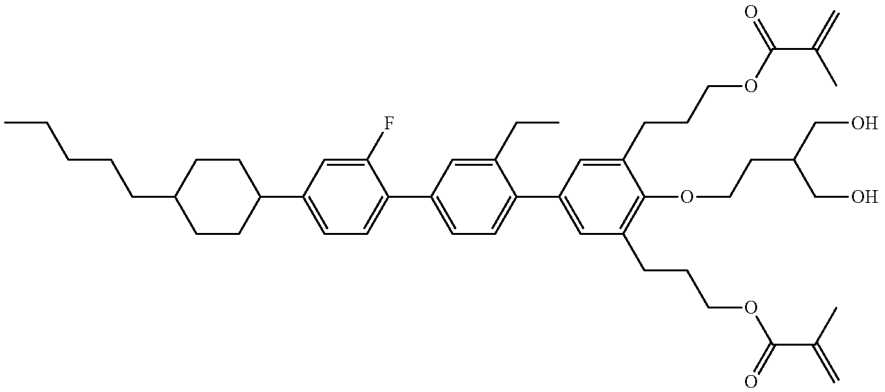 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-22
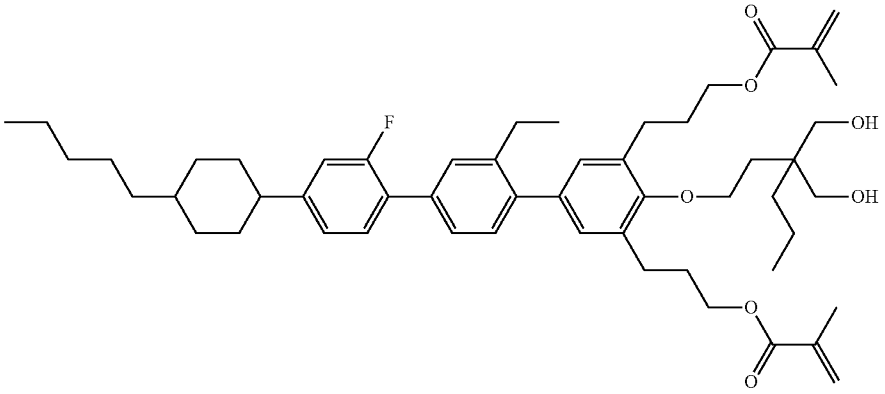
SA-23
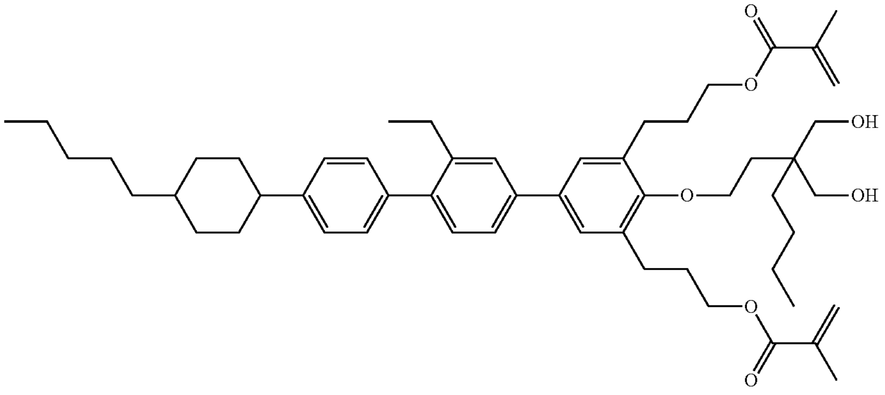 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]

TABLE H-continued
SA-24
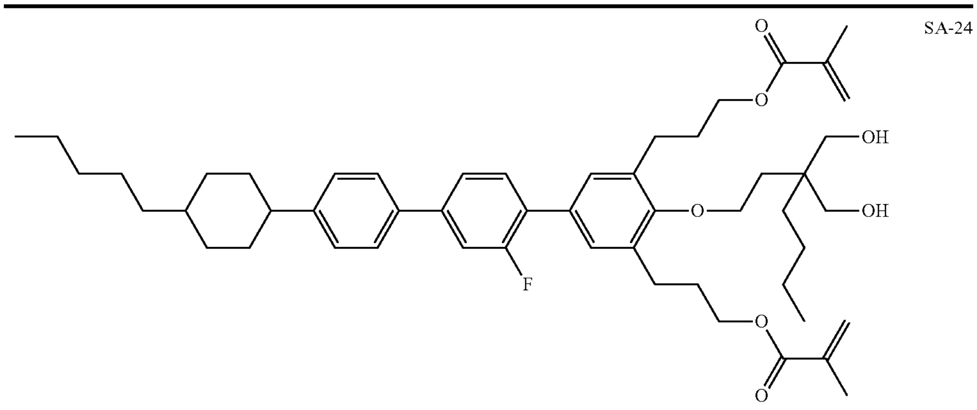
SA-25
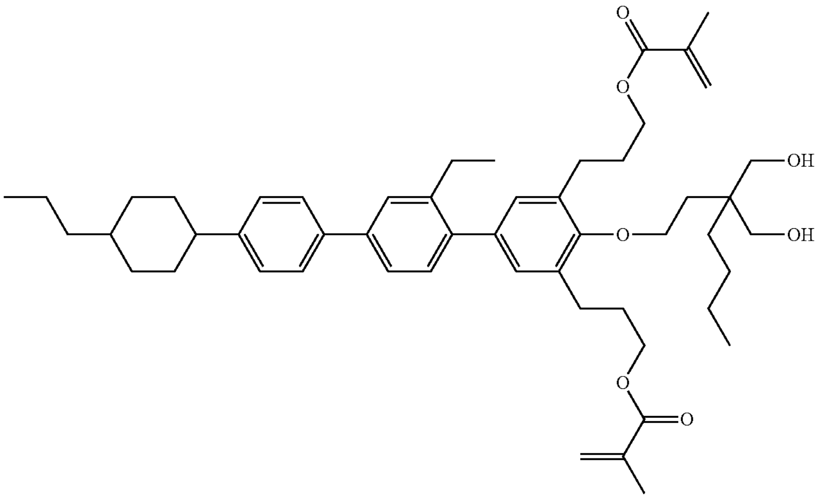 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-26
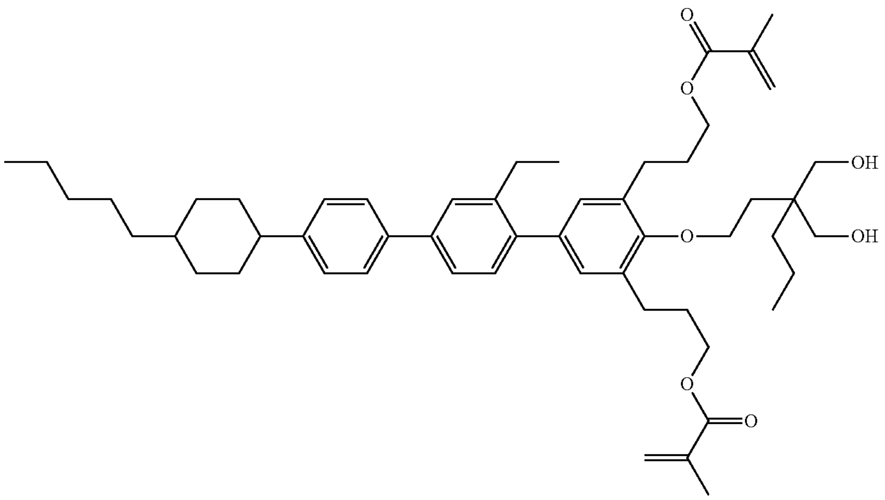 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]

TABLE H-continued
SA-27
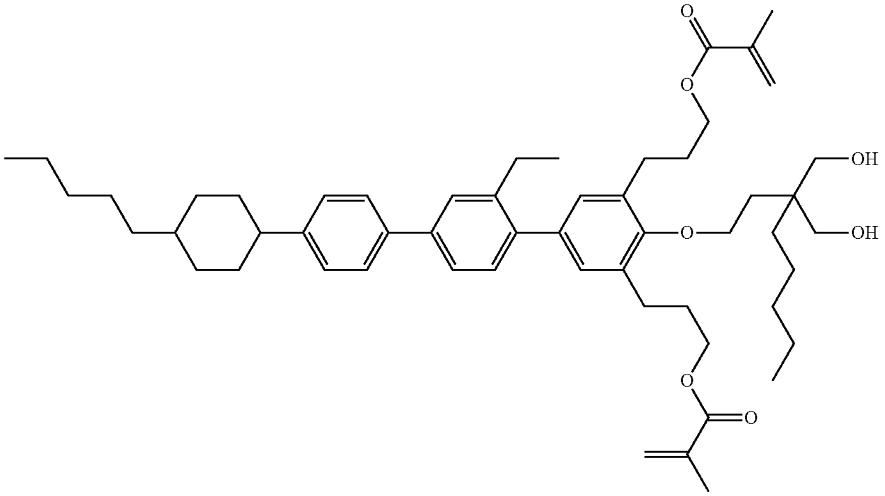 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-28
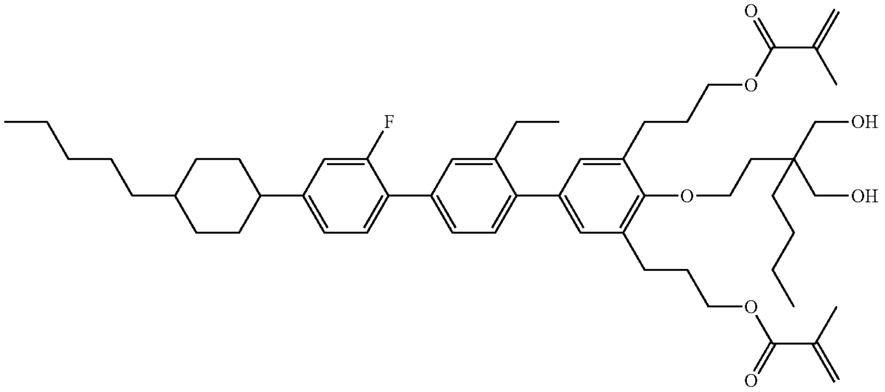 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-29
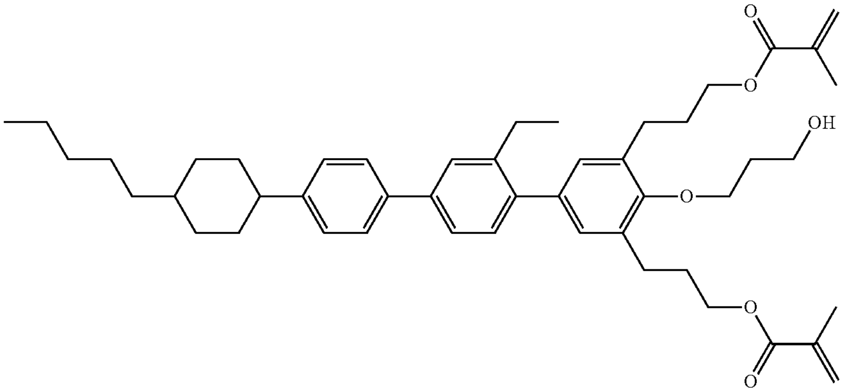 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-30
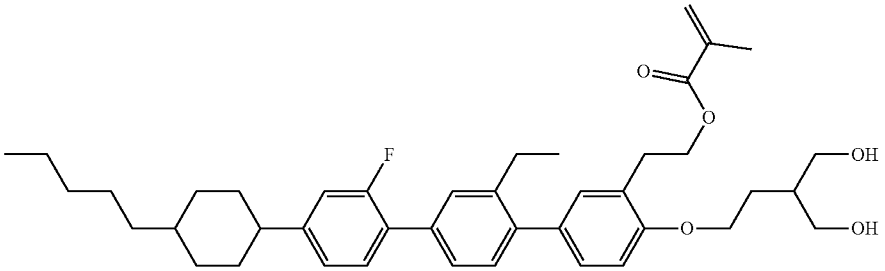 [SMILES: C=C(C)C(=O)OCCc1cc(-c2ccc(-c3ccc(C4CCC(CCCCC)CC4)cc3F)cc2CC)ccc1OCCC(CO)CO]

TABLE H-continued

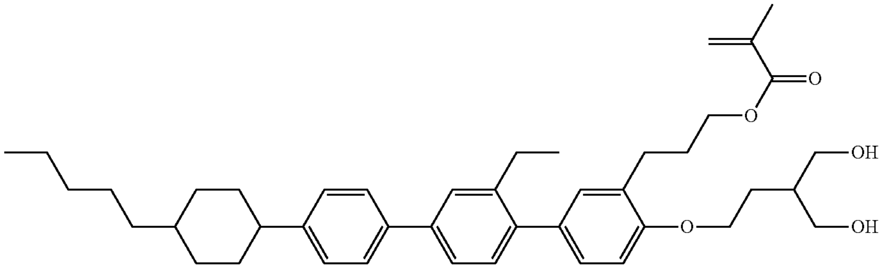 [SMILES: C=C(C)C(=O)OCCCc1cc(-c2ccc(-c3ccc(C4CCC(CCCCC)CC4)cc3)cc2CC)ccc1OCCC(CO)CO]

SA-31

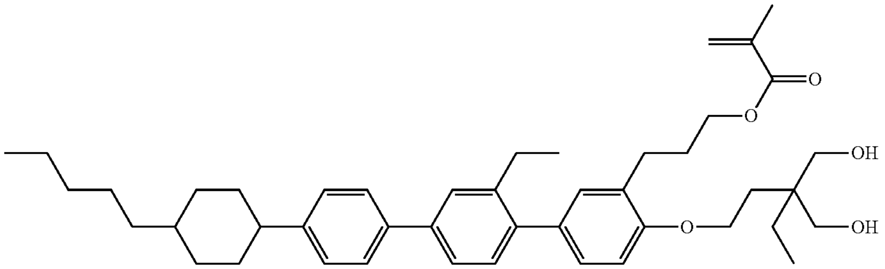 [SMILES: C=C(C)C(=O)OCCCc1cc(-c2ccc(-c3ccc(C4CCC(CCCCC)CC4)cc3)cc2CC)ccc1OCCC(CC)(CO)CO]

SA-32

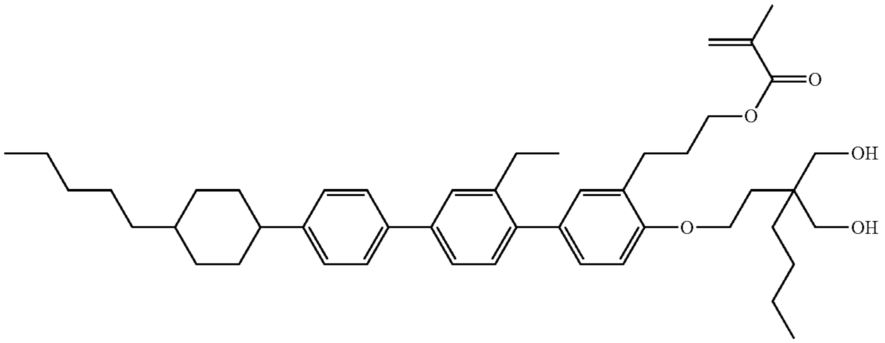 [SMILES: C=C(C)C(=O)OCCCc1cc(-c2ccc(-c3ccc(C4CCC(CCCCC)CC4)cc3)cc2CC)ccc1OCCC(CO)(CO)CCCC]

SA-33

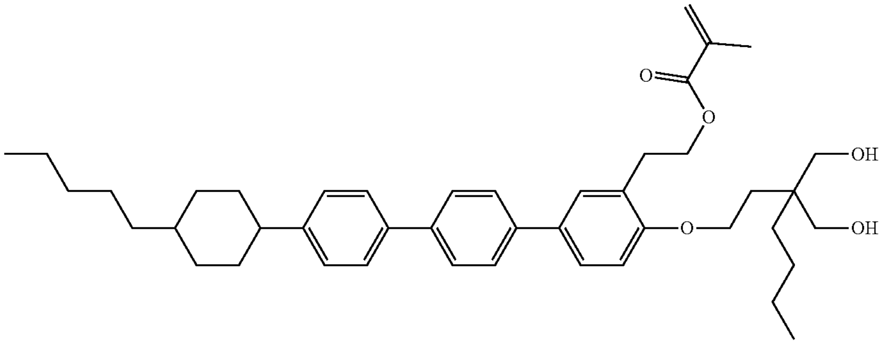 [SMILES: C=C(C)C(=O)OCCc1cc(-c2ccc(-c3ccc(C4CCC(CCCCC)CC4)cc3)cc2)ccc1OCCC(CO)(CO)CCCC]

SA-34

Table H shows self-alignment additives for vertical alignment which can be used in LC media for SA-VA and SA-FFS displays according to the present invention, optionally together with the polymerisable compounds, more preferably with the polymerisable compounds of formula M.

In a preferred embodiment, the LC media and SA-FFS and SA-HB-FFS displays according to the present invention comprise one or more SA additives selected from formulae SA-1 to SA-34, preferably from formulae SA-14 to SA-34, more preferably from formulae SA-20 to SA-28, most preferably of formula SA-20, in particular in combination with one or more RMs of formula M.

The following Examples are merely illustrative of the present invention and they should not be considered as limiting the scope of the invention in any way. The Examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

WORKING EXAMPLES

Unless indicated otherwise, parts or percent data denote parts by weight or percent by weight based on the mixture as a whole.

The symbols and abbreviations have the following meanings:

$V_0$ Freedericksz threshold voltage, capacitive [V] at 20° C., $V_{10}$ voltage [V] for 10% transmission, $n_e$ extraordinary refractive index measured at 20° C. and 589 nm, $n_o$ ordinary refractive index measured at 20° C. and 589 nm, Δn optical anisotropy measured at 20° C. and 589 nm, $\varepsilon_\perp$ dielectric susceptibility (or "dielectric constant") perpendicular to the longitudinal axes of the molecules at 20° C. and 1 kHz, $\varepsilon_\parallel$ dielectric susceptibility (or "dielectric constant") parallel to the longitudinal axes of the molecules at 20° C. and 1 kHz, Δε dielectric anisotropy at 20° C. and 1 kHz, cl.p. or T(N,I) clearing point [° C.], v flow viscosity measured at 20° C. [$mm^2 \cdot s^{-1}$], $\gamma_1$ rotational viscosity measured at 20° C. [mPa·s], $K_{11}$ elastic constant, "splay" deformation at 20° C. [pN], $K_{22}$ elastic constant, "twist" deformation at 20° C. [pN], $K_{33}$ elastic constant, "bend" deformation at 20° C. [pN], LTS low-temperature stability of the phase, determined in bulk, and VHR voltage holding ratio.

The term "threshold voltage" for the present invention relates to the capacitive threshold ($V_0$), unless explicitly indicated otherwise. In the Examples, as is generally usual, the optical threshold can also be indicated, for example for 10% relative contrast ($V_{10}$).

Examples and Comparative Examples

Comparative Mixture and Mixtures

The following nematic mixtures are prepared, wherein the host Mixtures and Mixtures comprise preferred compounds of formulae I-1, I-2 and I-3 as described herein.

The following compounds I-D, I-K, I-L, I-M, I-N, II-J, II-L and II-O respectively correspond to the compounds I-D, I-K, I-L, I-M and I-N and respectively the compounds of formulae II-J, II-L and II-O as specified and shown in the description above.

Comparative Mixture CM-1

| | | | |
|---|---|---|---|
| CDUQU-3-F | 5.0% | clearing point[° C.]: | 103 |
| CPGP-5-2 | 3.0% | Δn [589 nm, 20° C.]: | 0.1247 |
| DGUQU-4-F | 4.5% | $n_e$ [589 nm, 20° C.]: | 1.6151 |
| PGUQU-3-F | 5.0% | $n_o$ [589 nm, 20° C.]: | 1.4904 |
| PGUQU-4-F | 6.0% | Δε [1 kHz, 20° C.]: | 6.5 |
| CCP-3-OT | 3.0% | $\varepsilon_\parallel$ [1 kHz, 20° C.]: | 9.5 |
| CCP-V-1 | 8.5% | $\varepsilon_\perp$ [1 kHz, 20° C.]: | 3.0 |
| CCP-V2-1 | 10.0% | $\gamma_1$ [mPa s, 20° C.]: | 90 |
| PGP-2-2V | 11.0% | $K_1$ [pN, 20° C.]: | 17.9 |
| CC-3-2V1 | 7.0% | $K_3$ [pN, 20° C.]: | 18.6 |
| CC-3-V | 26.0% | LTS bulk [h, −20° C.]: | 264 |
| CC-3-V1 | 6.0% | | |
| PP-1-2V1 | 5.0% | | |
| Σ | 100.0% | | |

Mixture H-1

| | | | |
|---|---|---|---|
| CDUQU-3-F | 6.0% | clearing point [° C.]: | 89 |
| DGUQU-4-F | 8.0% | Δn [589 nm, 20° C.]: | 0.1242 |
| PGUQU-3-F | 8.0% | $n_e$ [589 nm, 20° C.]: | 1.6100 |
| CLP-3-T | 5.5% | $n_o$ [589 nm, 20° C.]: | 1.4858 |
| CLY-3-O2 | 9.0% | Δε [1 kHz, 20° C.]: | 6.2 |
| CPY-3-O2 | 9.5% | $\varepsilon_\parallel$ [1 kHz, 20° C.]: | 11.8 |

-continued

| | | | |
|---|---|---|---|
| B(S)-2O-O4 | 3.0% | $\varepsilon_\perp$ [1 kHz, 20° C.]: | 5.6 |
| B(S)-2O-O5 | 4.0% | $\gamma_1$ [mPa s, 20° C.]: | 105 |
| CC-3-V | 29.0% | $K_1$ [pN, 20° C.]: | 18.5 |
| CC-3-V1 | 8.0% | $K_3$ [pN, 20° C.]: | 17.8 |
| PP-1-2V1 | 10.0% | LTS bulk [h, −20° C.]: | 120 |
| Σ | 100.0% | | |

Mixture H-2

| | | | |
|---|---|---|---|
| CDUQU-3-F | 6.0% | clearing point [° C.]: | 89 |
| DGUQU-4-F | 8.0% | Δn [589 nm, 20° C.]: | 0.1240 |
| PGUQU-3-F | 8.0% | Δε [1 kHz, 20° C.]: | 6.3 |
| CLP-3-T | 5.5% | $\gamma_1$ [mPa s, 20° C.]: | 107 |
| CLY-3-O2 | 9.0% | | |
| CPY-3-O2 | 9.5% | | |
| compound I-L | 3.0% | | |
| B(S)-2O-O5 | 4.0% | | |
| CC-3-V | 29.0% | | |
| CC-3-V1 | 8.0% | | |
| PP-1-2V1 | 10.0% | | |
| Σ | 100.0% | | |

Mixture H-3

| | | | |
|---|---|---|---|
| CDUQU-3-F | 6.0% | clearing point [° C.]: | 88 |
| DGUQU-4-F | 8.0% | Δn [589 nm, 20° C.]: | 0.1235 |
| PGUQU-3-F | 8.0% | Δε [1 kHz, 20° C.]: | 6.4 |
| CLP-3-T | 5.5% | $\gamma_1$ [mPa s, 20° C.]: | 110 |
| CLY-3-O2 | 9.0% | | |
| CPY-3-O2 | 9.5% | | |
| compound I-L | 7.0% | | |
| CC-3-V | 29.0% | | |
| CC-3-V1 | 8.0% | | |
| PP-1-2V1 | 10.0% | | |
| Σ | 100.0% | | |

Mixture H-4

| | | | |
|---|---|---|---|
| CDUQU-3-F | 6.0% | clearing point [° C.]: | 88 |
| DGUQU-4-F | 8.0% | Δn [589 nm, 20° C.]: | 0.1237 |
| PGUQU-3-F | 8.0% | Δε [1 kHz, 20° C.]: | 6.5 |
| CLP-3-T | 5.5% | $\gamma_1$ [mPa s, 20° C.]: | 108 |
| CLY-3-O2 | 9.0% | | |
| CPY-3-O2 | 9.5% | | |
| compound I-D | 7.0% | | |
| CC-3-V | 29.0% | | |
| CC-3-V1 | 8.0% | | |
| PP-1-2V1 | 10.0% | | |
| Σ | 100.0% | | |

Mixture H-5

| | | | |
|---|---|---|---|
| CDUQU-3-F | 6.0% | clearing point [° C.]: | 92 |
| DGUQU-4-F | 8.0% | Δn [589 nm, 20° C.]: | 0.1223 |
| PGUQU-3-F | 8.0% | Δε [1 kHz, 20° C.]: | 6.6 |
| CLP-3-T | 5.5% | $\gamma_1$ [mPa s, 20° C.]: | 119 |
| CLY-3-O2 | 9.0% | | |
| CPY-3-O2 | 9.5% | | |
| compound I-K | 7.0% | | |
| CC-3-V | 29.0% | | |
| CC-3-V1 | 8.0% | | |
| PP-1-2V1 | 10.0% | | |
| Σ | 100.0% | | |

Mixture H-6

| | | | |
|---|---|---|---|
| CDUQU-3-F | 6.0% | clearing point [° C.]: | 88 |
| DGUQU-4-F | 8.0% | Δn [589 nm, 20° C.]: | 0.1237 |
| PGUQU-3-F | 8.0% | Δε [1 kHz, 20° C.]: | 6.4 |
| CLP-3-T | 5.5% | | |
| CLY-3-O2 | 9.0% | | |
| CPY-3-O2 | 9.5% | | |
| compound I-M | 7.0% | | |
| CC-3-V | 29.0% | | |
| CC-3-V1 | 8.0% | | |
| PP-1-2V1 | 10.0% | | |
| Σ | 100.0% | | |

Mixture H-7

| | | | |
|---|---|---|---|
| CDUQU-3-F | 6.0% | clearing point [° C.] | 89 |
| DGUQU-4-F | 8.0% | Δn [589 nm, 20° C.]: | 0.1240 |
| PGUQU-3-F | 8.0% | Δε [1 kHz, 20° C.]: | 6.5 |
| CLP-3-T | 5.5% | | |
| CLY-3-O2 | 9.0% | | |
| CPY-3-O2 | 9.5% | | |
| compound I-N | 7.0% | | |
| CC-3-V | 29.0% | | |
| CC-3-V1 | 8.0% | | |
| PP-1-2V1 | 10.0% | | |
| Σ | 100.0% | | |

Mixture H-8

| | | | |
|---|---|---|---|
| CDUQU-3-F | 6.0% | clearing point [° C.] | 84 |
| DGUQU-4-F | 8.0% | Δn [589 nm, 20° C.]: | 0.1230 |
| PGUQU-3-F | 8.0% | Δε [1 kHz, 20° C.]: | 6.2 |
| CLP-3-T | 5.5% | | |
| CLY-3-O2 | 9.0% | | |
| CPY-3-O2 | 9.5% | | |
| B-2O-O5 | 7.0% | | |
| CC-3-V | 29.0% | | |
| CC-3-V1 | 8.0% | | |
| PP-1-2V1 | 10.0% | | |
| Σ | 100.0% | | |

Mixture H-9

| | |
|---|---|
| compound II-J | 6.0% |
| DGUQU-4-F | 8.0% |
| PGUQU-3-F | 8.0% |
| CLP-3-T | 5.5% |
| CLY-3-O2 | 9.0% |
| CPY-3-O2 | 9.5% |
| B(S)-2O-O4 | 3.0% |
| B(S)-2O-O5 | 4.0% |
| CC-3-V | 29.0% |
| CC-3-V1 | 8.0% |
| PP-1-2V1 | 10.0% |
| Σ | 100.0% |

Mixture H-10

| | |
|---|---|
| CDUQU-3-F | 6.0% |
| compound II-O | 8.0% |
| PGUQU-3-F | 8.0% |
| CLP-3-T | 5.5% |
| CLY-3-O2 | 9.0% |
| CPY-3-O2 | 9.5% |
| compound I-L | 3.0% |
| B(S)-2O-O5 | 4.0% |

-continued

| | |
|---|---|
| CC-3-V | 29.0% |
| CC-3-V1 | 8.0% |
| PP-1-2V1 | 10.0% |
| Σ | 100.0% |

Mixture H-11

| | |
|---|---|
| CDUQU-3-F | 6.0% |
| DGUQU-4-F | 8.0% |
| compound II-L | 8.0% |
| CLP-3-T | 5.5% |
| CLY-3-O2 | 9.0% |
| CPY-3-O2 | 9.5% |
| B-2O-O5 | 7.0% |
| CC-3-V | 29.0% |
| CC-3-V1 | 8.0% |
| PP-1-2V1 | 10.0% |
| Σ | 100.0% |

Nematic mixtures M-1 to M-30 are prepared by respectively adding to the host Mixtures H-1 to H-8 one stabilizer or respectively two stabilizers from the preferred stabilizers ST-1 to ST-5 described herein as shown in Table 1 below.

For the mixtures CM-1, H-1 to H-8 and M-1 to M-30, the voltage holding ratio (VHR) is determined in cells having a planar alignment (using alignment layer AL-16301) at 60° C. using a driving frequency of 60 Hz and an applied voltage of 1 V and shown Table 1.

TABLE 1

| Mixture | Composition | VHR / % |
|---|---|---|
| CM-1 | | 99.6 |
| H-1 | | 92.9 |
| M-1 | 99.9% H-1, 0.1% ST-1 | 98.6 |
| M-2 | 99.9% H-1, 0.1% ST-2 | 98.7 |
| M-3 | 99.9% H-1, 0.1% ST-3 | 99.4 |
| M-4 | 99.8% H-1, 0.1% ST-1, 0.1% ST-4 | 98.6 |
| M-5 | 99.8% H-1, 0.1% ST-1, 0.1% ST-2 | 98.7 |
| M-6 | 99.8% H-1, 0.1% ST-1, 0.1% ST-5 | 98.6 |
| M-7 | 99.8% H-1, 0.1% ST-1, 0.1% ST-3 | 99.4 |
| M-8 | 99.8% H-1, 0.1% ST-2, 0.1% ST-3 | 99.4 |
| M-9 | 99.8% H-1, 0.1% ST-3, 0.1% ST-5 | 99.4 |
| H-2 | | 92.8 |
| M-10 | 99.9% H-2, 0.1% ST-1 | 98.5 |
| M-11 | 99.9% H-2, 0.1% ST-2 | 98.6 |
| M-12 | 99.9% H-2, 0.1% ST-3 | 99.3 |
| H-3 | | 92.6 |
| M-13 | 99.9% H-3, 0.1% ST-1 | 98.3 |
| M-14 | 99.9% H-3, 0.1% ST-2 | 98.5 |
| M-15 | 99.9% H-3, 0.1% ST-3 | 99.3 |
| H-4 | | 93.0 |
| M-16 | 99.9% H-4, 0.1% ST-1 | 98.6 |
| M-17 | 99.9% H-4, 0.1% ST-2 | 98.8 |
| M-18 | 99.9% H-4, 0.1% ST-3 | 99.5 |
| H-5 | | 93.5 |
| M-19 | 99.9% H-5, 0.1% ST-1 | 98.8 |
| M-20 | 99.9% H-5, 0.1% ST-2 | 98.9 |
| M-21 | 99.9% H-5, 0.1% ST-3 | 99.5 |
| H-6 | | 92.5 |
| M-22 | 99.9% H-6, 0.1% ST-1 | 98.2 |
| M-23 | 99.9% H-6, 0.1% ST-2 | 98.4 |
| M-24 | 99.9% H-6, 0.1% ST-3 | 99.2 |
| H-7 | | 92.0 |
| M-25 | 99.9% H-7, 0.1% ST-1 | 98.0 |
| M-26 | 99.9% H-7, 0.1% ST-2 | 98.2 |
| M-27 | 99.9% H-7, 0.1% ST-3 | 99.0 |
| H-8 | | 91.9 |

TABLE 1-continued

| Mixture | Composition | VHR / % |
|---|---|---|
| M-28 | 99.9% H-8, 0.1% ST-1 | 97.9 |
| M-29 | 99.9% H-8, 0.1% ST-2 | 98.1 |
| M-30 | 99.9% H-8, 0.1% ST-3 | 98.9 |

Compared to Comparative Mixture CM-1, mixtures H-1 to H-11 and M-1 to M-30 give advantageously improved transmittance in displays.

Mixtures M-1 to M-30 exhibit improved VHR values compared to the host Mixtures H-1 to H-8. For mixtures M-4 to M-9, wherein two stabilizers are comprised, an increase in the voltage holding ratio and the reliability can be suitably obtained.

The invention claimed is:

1. A liquid-crystal medium having a positive dielectric anisotropy and comprising at least two or more compounds of formula I-2-a I-2-a

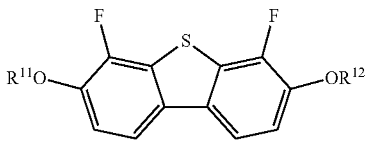

in which $R^{11}$ and $R^{12}$ identically or differently, denote an alkyl radical having 1 to 12 C atoms, at least two stabilizers selected from the group consisting of compounds of the formulae ST-a to ST-r ST-a

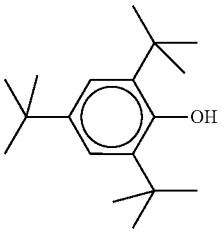

ST-b

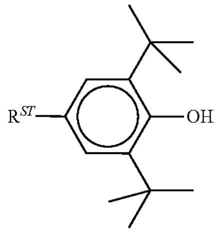

ST-c

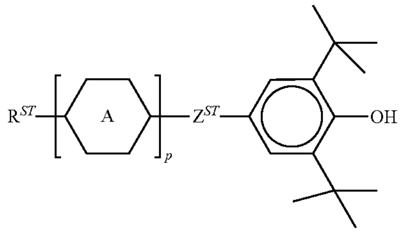

-continued

ST-d

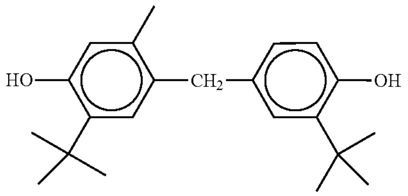

ST-e

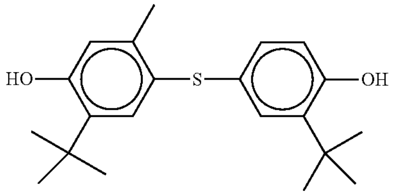

ST-f

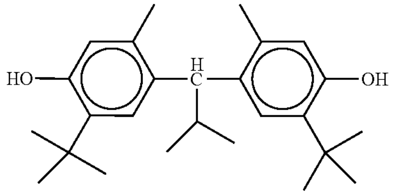

ST-g

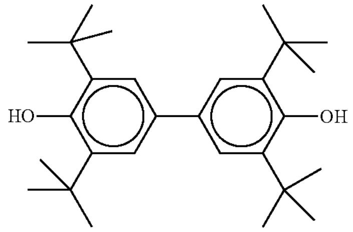

ST-h

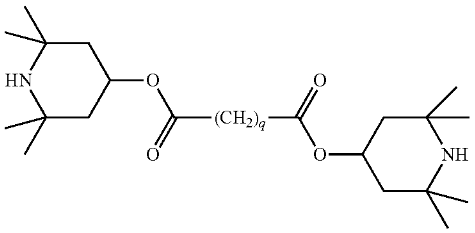

ST-i

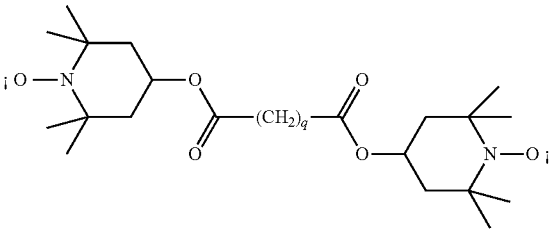

ST-j

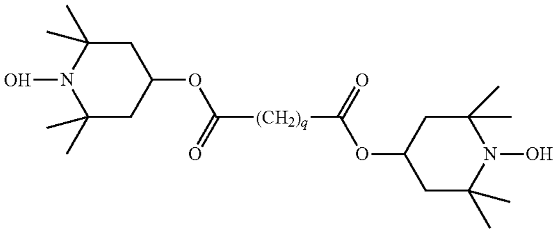

-continued

ST-k

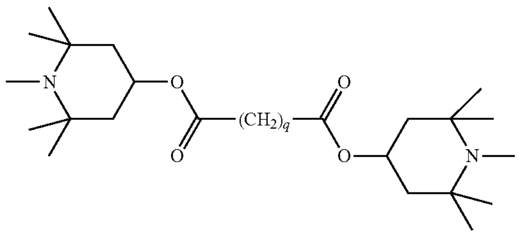

ST-l

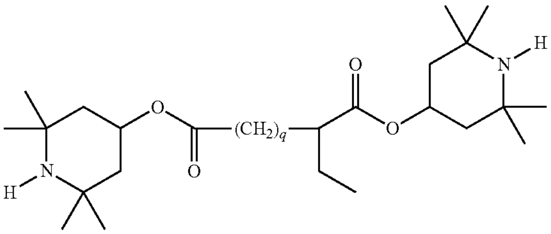

ST-m

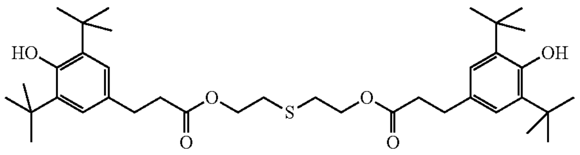

ST-n

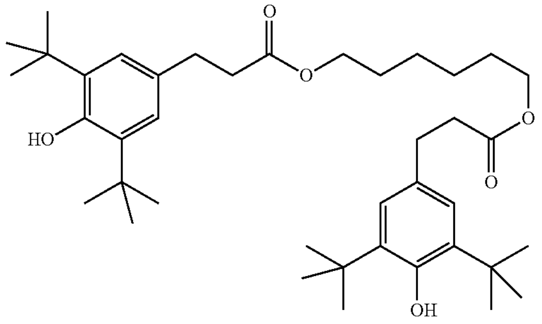

ST-o

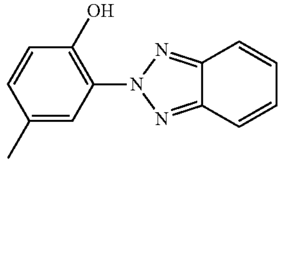

-continued

ST-p

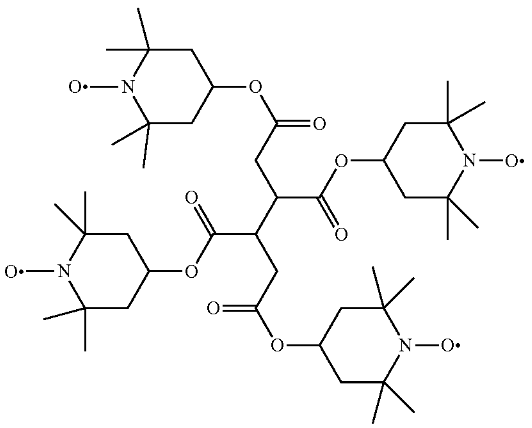

ST-q

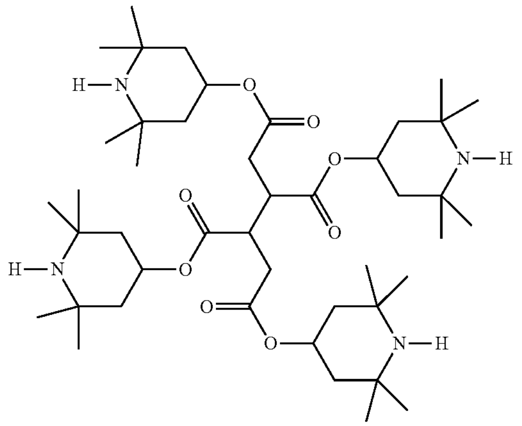

ST-r

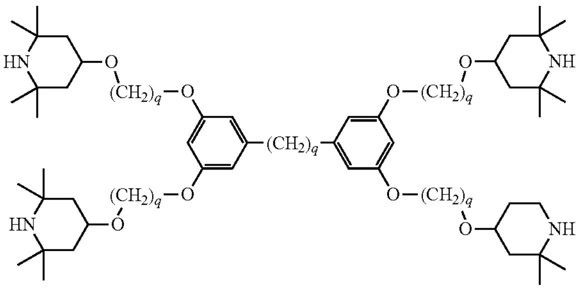

in which $R^{ST}$ denotes H, an alkyl or alkoxy radical having 1 to 15 C atoms, where, in addition, one or more $CH_2$ groups in these radicals may each be replaced, independently of one another, by —C≡C—, —$CF_2O$—, —$OCF_2$—, —CH═CH—, -◇-, -◇◇-, —O—, —CO—O— or —O—CO— in such a way that O atoms are not linked directly to one another, and in which, in addition, one or more H atoms may each be replaced by halogen,

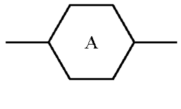 denotes 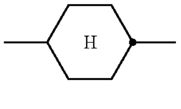 ,

-continued
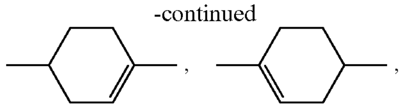
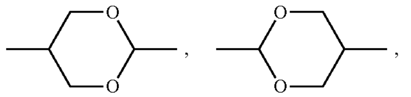
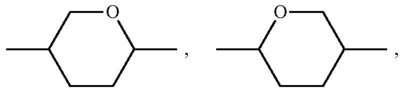
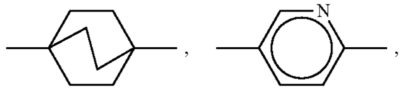
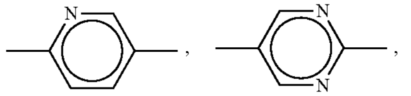
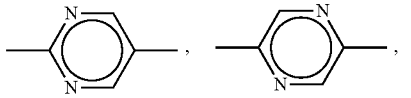
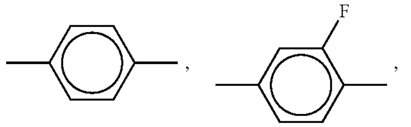
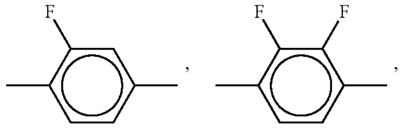
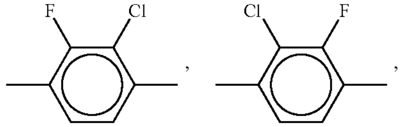
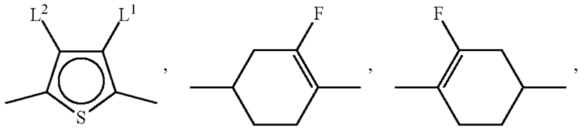
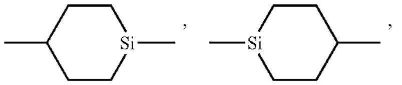
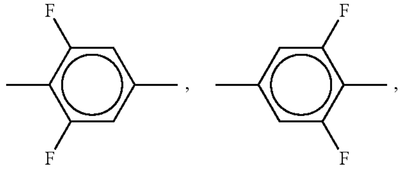
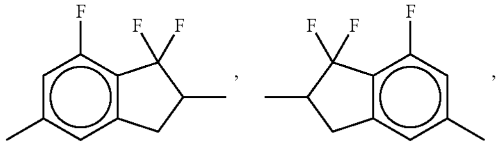
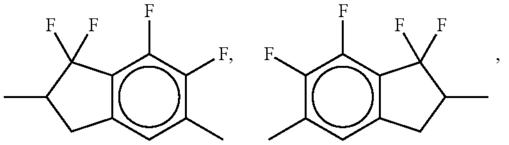
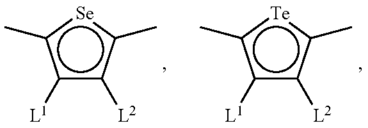
-continued
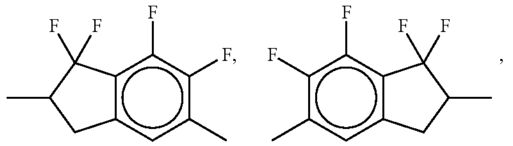
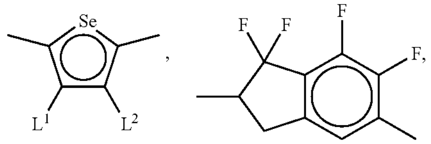
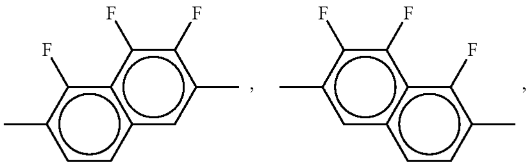
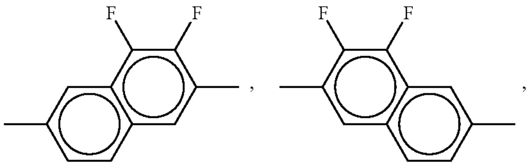
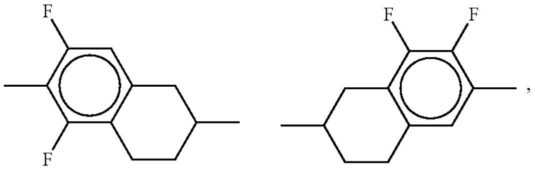
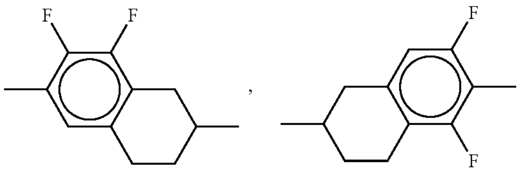
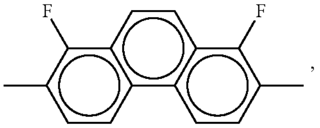
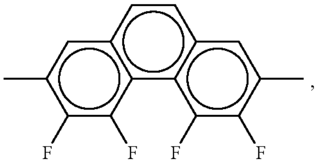
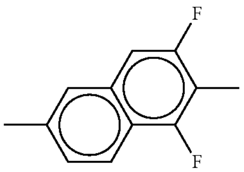
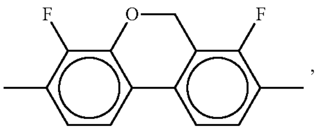
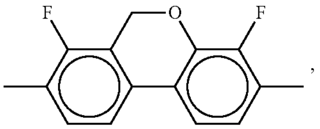

-continued

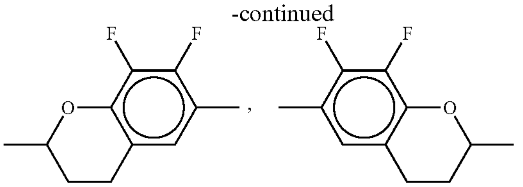

or

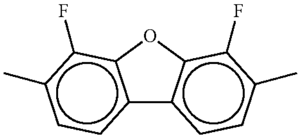

$Z^{ST}$ denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CF_3$ or $CHF_2$, p denotes 1 or 2, and q denotes 1, 2, 3, 4, 5, 6, 7, 8, 9 or 10; and wherein the medium comprises at least one compound of formula II-B, at least one compound of formula II-C, and at least one compound of formula II-D, the at least one compound of formula II-B, at least one compound of formula II-C, and at least one compound of formula II-D being collectively present in a total amount of at least 15% by weight; and

II-B

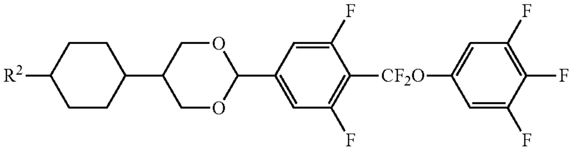

II-C

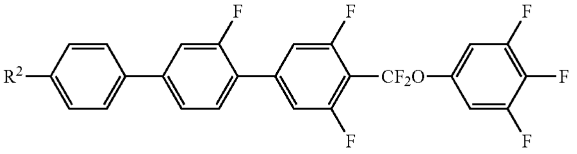

II-D

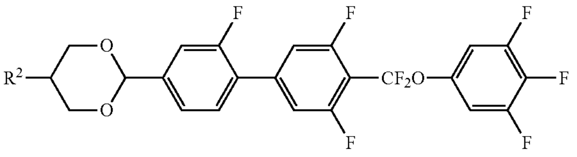

in which $R^2$ denotes alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, in which optionally one or more $CH_2$ groups, independently of one another, may be replaced by

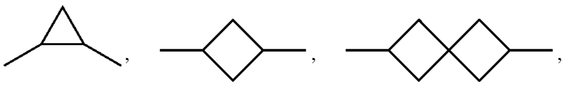

-continued

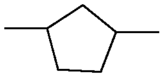

or

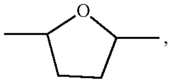

one or more compounds of formula VI-1 in a total amount of at least 10% by weight:

VI-1

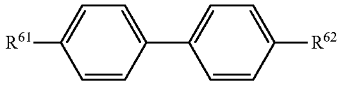

in which $R^{61}$ and $R^{62}$ independently of each other, denote alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms; and wherein the medium comprises one or more compounds of formula III-1:

III-1

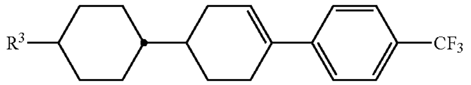

in which $R^3$ denotes alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, in which optionally one or more $CH_2$ groups, independently of one another, may be replaced by

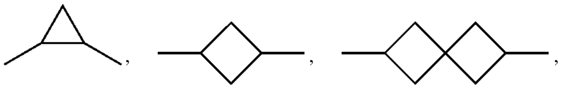

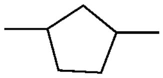

or

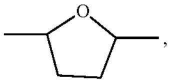

one or more compounds of Formula Y2-10 in a total amount of at least 1% by weight to 15% by weight:

Y2-10

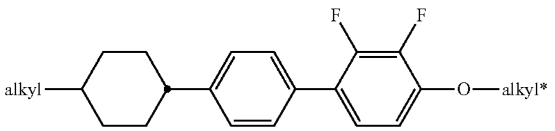

in which alkyl and alkyl* each, independently of one another, denote a straight-chain alkyl radical having 1-6 C atoms.

2. The liquid-crystal medium according to claim 1, further comprising one or more compounds selected from the group of compounds of formulae I-1 and I-3

I-1

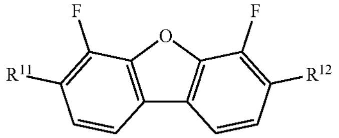

I-3

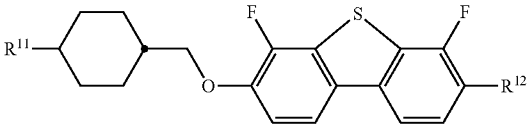

in which $R^{11}$ and $R^{12}$ identically or differently, denote H, an alkyl or alkoxy radical having 1 to 15 C atoms, in which one or more $CH_2$ groups in these radicals are optionally replaced, independently of one another, by —C≡C—, —$CF_2$O—, —O$CF_2$—, —CH═CH—,

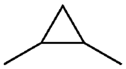,
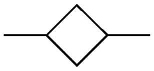,
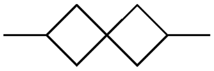,
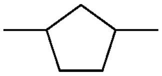,
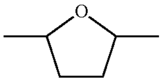,

—O—, —CO—O— or —O—CO— in such a way that O atoms are not linked directly to one another, and in which one or more H atoms may be replaced by halogen.

3. The liquid-crystal medium according to claim 1, wherein $R^{11}$ and $R^{12}$ denote, identically or differently, a straight-chain alkoxy radical having 1 to 7 C atoms.

4. The liquid-crystal medium according to claim 1, wherein the medium comprises one or more compounds of formula IV

IV

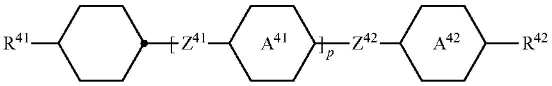

in which $R^{41}$ and $R^{42}$ independently of each other, denote alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms,

 and 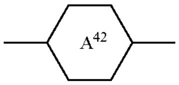, on each occurrence, identically or differently, denote

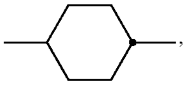, 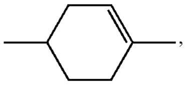,

-continued

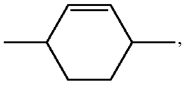, 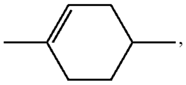,

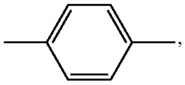, 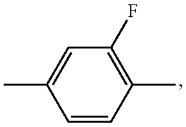,

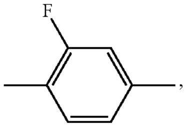, 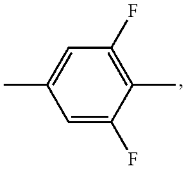,

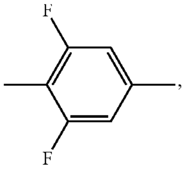, or 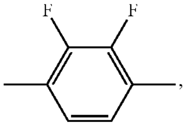, $Z^{41}$, $Z^{42}$ on each occurrence, identically or differently, denote —$CH_2CH_2$—, —COO—, trans-CH═CH—, trans-CF═CF—, —$CH_2$O—, —$CF_2$O—, —C≡C— or a single bond, preferably a single bond, and p is 0, 1 or 2, preferably is 0.

5. The liquid-crystal medium according to claim 1, wherein the medium comprises one or more compounds of formula IV-1

IV-1

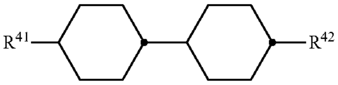

in which $R^{41}$ and $R^{42}$ independently of each other, denote alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

6. The liquid-crystal medium according to claim 1, wherein the medium comprises one or more compounds selected from the group of compounds of formulae Y1 and LY

Y1

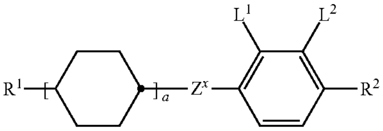

Y2

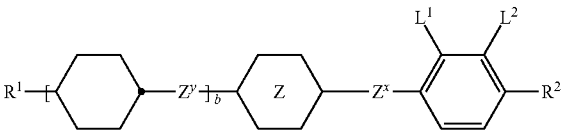

-continued

LY

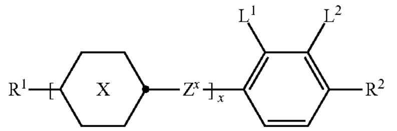

in which $R^1$, $R^2$ independently of each other, denote a straight-chain, branched or cyclic alkyl or alkoxy radical that is unsubstituted or halogenated and has 1 to 15 C atoms, where, in addition, one or more $CH_2$ groups in these radicals may each be replaced, independently of one another, by $-C\equiv C-$, $-CFO-$, $-CH=CH-$, a and x identically or differently, are 1 or 2.

7. The liquid-crystal medium according to claim 1, wherein the medium comprises one or more compounds selected from the compounds ST-1, ST-2 and ST-3

ST-1

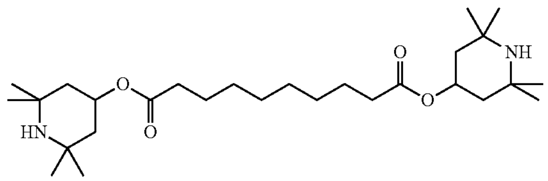

ST-2

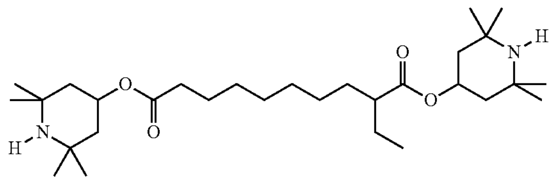

ST-3

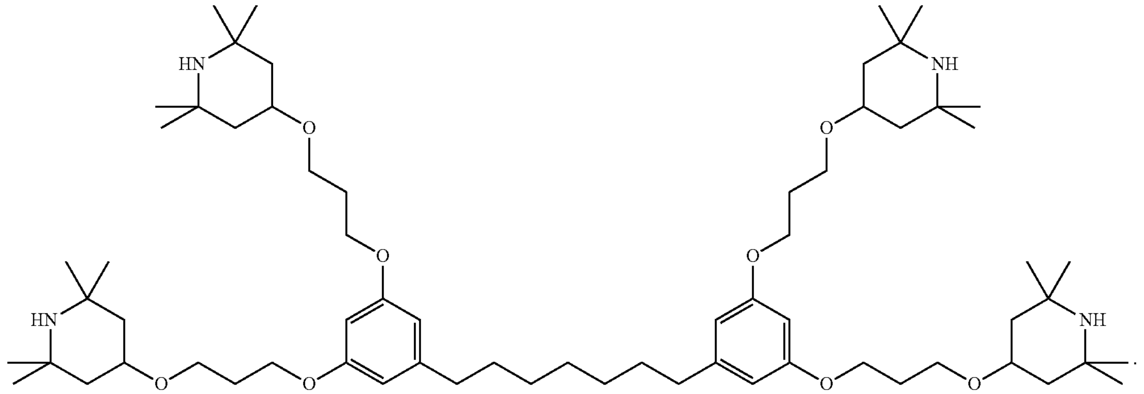

8. The liquid-crystal medium according to claim 1, wherein the medium has a dielectric anisotropy in the range of from +5.0 to +8.0.

9. TN, PS-TN, STN, TN-TFT, OCB, IPS, PS-IPS, FFS, HB-FFS, PS-HB-FFS, SA-HB-FFS, polymer stabilised SA-HB-FFS, positive VA and positive PS-VA displays, light shutters, switchable windows, or 3D applications comprising the liquid crystal medium of claim 1.

10. A liquid-crystal display comprising a liquid-crystal medium according to claim 1.

11. The liquid-crystal display according to claim 10, wherein the display is a TN, PS-TN, STN, TN-TFT, OCB, IPS, PS-IPS, FFS, HB-FFS, PS-HB-FFS, SA-HB-FFS, polymer stabilised SA-HB-FFS, positive VA or positive PS-VA display.

12. The liquid-crystal medium according to claim 7, wherein the medium comprises at least two or more stabilizers selected from the compounds of formulae ST-1 and ST-3

ST-1
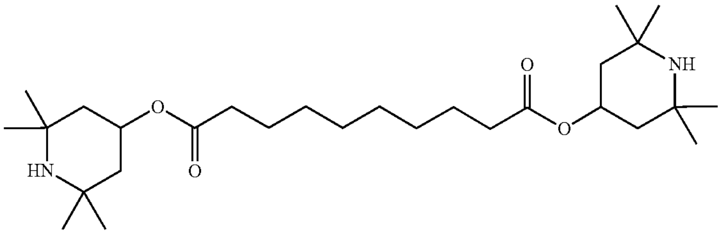
ST-3
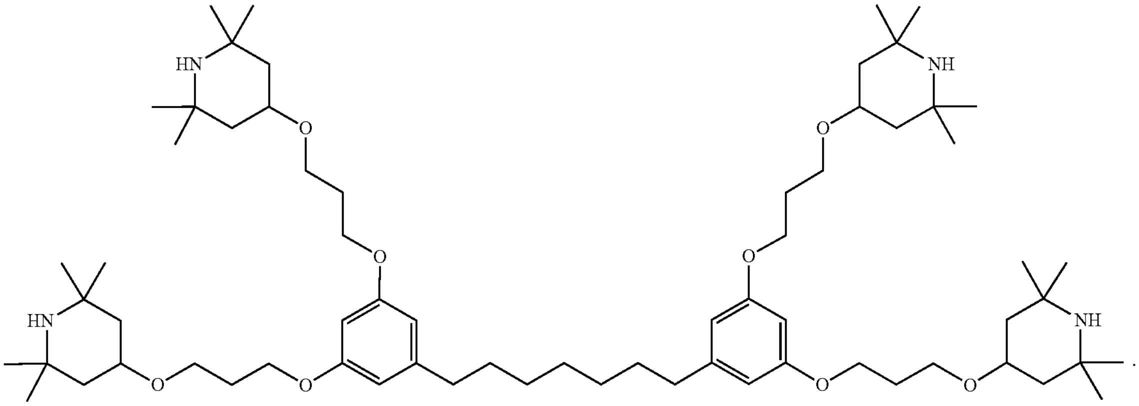
13. The liquid-crystal medium according to claim 12, wherein the at least two or more stabilizers selected from the compounds of formulae ST-1 and ST-3 are present in the medium at 0.1% by weight to 0.2% by weight.
14. The liquid-crystal medium according to claim 1, wherein the at least two or more stabilizers are selected from the compounds of formulae: ST-h, ST-l and ST-r.
* * * * *